United States Patent
DeVault et al.

(10) Patent No.: US 9,457,316 B2
(45) Date of Patent: Oct. 4, 2016

(54) METHOD FOR CONTROLLING COMPOUNDS AND CONDITIONS IN A WET FLUE GAS DESULFURIZATION (WFGD) UNIT

(71) Applicant: Babcock & Wilcox Power Generation Group, Inc., Barberton, OH (US)

(72) Inventors: Richard F DeVault, Barberton, OH (US); Paul J Williams, Akron, OH (US); Sandy P Ulbricht, Diamond, OH (US); Shannon R Brown, Doylestown, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 133 days.

(21) Appl. No.: 13/832,065

(22) Filed: Mar. 15, 2013

(65) Prior Publication Data

US 2014/0017119 A1     Jan. 16, 2014

Related U.S. Application Data

(60) Provisional application No. 61/671,007, filed on Jul. 12, 2012.

(51) Int. Cl.
| | | |
|---|---|---|
| *B01D 53/50* | (2006.01) | |
| *B01D 53/34* | (2006.01) | |
| *B01D 53/64* | (2006.01) | |

(52) U.S. Cl.
CPC .............. *B01D 53/50* (2013.01); *B01D 53/346* (2013.01); *B01D 53/501* (2013.01); *B01D 53/64* (2013.01); *B01D 2251/106* (2013.01); *B01D 2251/20* (2013.01); *B01D 2251/206* (2013.01)

(58) Field of Classification Search
None
See application file for complete search history.

(56) References Cited

U.S. PATENT DOCUMENTS

| | | | | |
|---|---|---|---|---|
| 2,307,929 | A * | 1/1943 | Joyce, Jr. ............ | C01B 21/1454 423/386 |
| 2009/0130013 | A1* | 5/2009 | Higgins ................... | 423/242.1 |
| 2010/0061909 | A1* | 3/2010 | Kawamura et al. ..... | 423/243.02 |

FOREIGN PATENT DOCUMENTS

| | | | |
|---|---|---|---|
| CN | 100496672 | C * | 6/2009 |
| EP | 1106237 | B1 * | 10/2004 |
| WO | WO 2012176635 | A1 * | 12/2012 |

OTHER PUBLICATIONS

Translation of EP 1106237 accessed Apr. 10, 2015.*
Translation of WO 2012176635 accessed Apr. 10, 2015.*
Translation of CN 100496672 accessed Apr. 10, 2015.*

* cited by examiner

*Primary Examiner* — Duane Smith
*Assistant Examiner* — Phillip Shao
(74) *Attorney, Agent, or Firm* — Eric Marich

(57) ABSTRACT

The present invention relates generally to the field of emissions control and, in particular to a new and useful method and/or system by which to control various types of corrosion and/or precipitation issues in at least a portion of a wet flue gas desulfurization (WFGD) scrubber system. In one embodiment, the method and/or system of the present invention relies on the supply of at least one reducing agent to the slurry of a wet flue gas desulfurization scrubber to lower the oxidation reduction potential in the absorber slurry contained within the wet flue gas desulfurization scrubber. In still another embodiment, the method and/or system of the present invention control the oxidation-reduction potential in at least one bleed stream of an absorber slurry, filtrate, and/or solution from a wet flue gas desulfurization scrubber.

33 Claims, 40 Drawing Sheets

US 9,457,316 B2

METHOD FOR CONTROLLING COMPOUNDS AND CONDITIONS IN A WET FLUE GAS DESULFURIZATION (WFGD) UNIT

RELATED APPLICATION DATA

This patent application claims priority to U.S. Provisional Patent Application No. 61/671,007 filed Jul. 12, 2012 and titled "Method for Controlling Compounds and Conditions in a Wet Flue Gas Desulfurization (WFGD) Unit." The complete text of this application is hereby incorporated by reference as though fully set forth herein in its entirety.

FIELD AND BACKGROUND OF THE INVENTION

1. Field of the Invention

The present invention relates generally to the field of emissions control and, in particular to a new and useful method and/or system by which to control various types of corrosion and/or precipitation issues in at least a portion of a wet flue gas desulfurization (WFGD) scrubber system. In one embodiment, the method and/or system of the present invention relies on the supply of at least one reducing agent to the slurry of a wet flue gas desulfurization scrubber to lower the oxidation reduction potential in the absorber slurry contained within the wet flue gas desulfurization scrubber. In still another embodiment, the method and/or system of the present invention control the oxidation-reduction potential in at least one bleed stream of an absorber slurry, filtrate, and/or solution from a wet flue gas desulfurization scrubber.

2. Description of the Related Art

A variety of $SO_2$ control processes and technologies are in use and others are in various stages of development. Commercialized processes include wet, semidry (slurry spray with drying) and completely dry processes. The wet flue gas desulfurization (WFGD) scrubber is the dominant worldwide technology for the control of $SO_2$ from utility power plants, with approximately 85 percent of the installed capacity, although the dry flue gas desulfurization (DFGD) systems are also used for selected lower sulfur applications.

Wet scrubbing processes are often categorized by reagent and other process parameters. The primary reagent used in wet scrubbers is limestone. However, any alkaline reagent can be used, especially where site-specific economics provide an advantage. Other common reagents are lime (CaO), magnesium enhanced lime (MgO and CaO), ammonia ($NH_3$), and sodium carbonate ($Na_2CO_3$).

A number of the wet processes are also classified as either non-regenerable or regenerable systems. In non-regenerable systems, the reagent in the scrubber is consumed to directly generate a byproduct containing the sulfur, such as gypsum. In regenerable systems, the spent reagent is regenerated in a separate step to renew the reagent material for further use and to produce a separate byproduct, such as elemental sulfur. The dominant limestone and lime reagent systems used today are non-regenerable. In many cases the regenerable systems have been retrofitted with non-regenerable limestone or lime reagent systems to reduce costs and improve unit availability.

As known to those of skill in the art, the most common WFGD absorber module is the spray tower design (see, e.g., *Steam/its generation and use,* 41st Edition, Kitto and Stultz, Eds., Copyright 2005, The Babcock & Wilcox Company, Barberton, Ohio, U.S.A., particularly Chapter 35—Sulfur Dioxide Control, the text of which is hereby incorporated by reference as though fully set forth herein). In the most common WFGD set-up the flue gas enters the side of the spray tower at approximately its midpoint and exits through a transition at the top. The upper portion of the module (absorption zone) provides for the scrubbing of the flue gas to remove the $SO_2$ while the lower portion of the module serves as an integral slurry reaction tank (also frequently referred to as the recirculation tank (or absorber recirculation tank) and oxidation zone) to complete the chemical reactions to produce gypsum. The self-supporting absorber towers typically range in diameter from 20 feet to 80 feet (6 meters to 24 meters) and can reach 150 feet (46 meters) in height. In some designs, the lower reaction tank is flared downward to provide a larger diameter tank for larger slurry inventory and longer retention time. Other key components include the slurry recirculation pumps, interspatial spray headers and nozzles for slurry injection, moisture separators to minimize moisture carryover, oxidizing air injection system, slurry reaction tank agitators to prevent settling, and the perforated tray to enhance $SO_2$ removal performance. An exemplary illustration of a WFGD is shown in FIG. 1.

It has been found that when higher concentrations (generally above about 150 ppm) of one or more very strong oxidizers such as persulfate, permanganate, manganate, ozone hypochlorite, chlorate, nitric acid, iodine, bromine, chlorine, fluorine, or combinations of any two or more thereof that exist, or are formed, in a recirculation tank (or absorber recirculation tank—ART) slurry and/or solution, coupled with at a minimum a thermodynamically favorable pH and oxidation-reduction potential (ORP) in the wet scrubber, soluble manganese ($Mn^{2+}$) forms $Mn_xO_y$ precipitate and impacts upon the nature, the amount and/or the conditions of mercury re-emission and selenium emission from a WFGD system. FIG. 2A is a Pourbaix diagram for manganese. At any point on the diagram it will give the thermodynamically most stable (and theoretically most abundant) form of that element at a given potential and pH condition. Of particular interest is the region for $MnO_2$. The diagram shows that formation of $MnO_2$ is favored as E(V) (i.e., ORP) increases in the pH range 5 to 6, the typical operating pH range for a wet scrubber. Note that approximately 200 mV must be subtracted from the y-axis to compare E(V) to measured ORP readings where a saturated Ag/AgCl reference electrode is used. Also of interest are the Pourbaix diagrams for mercury and selenium (see FIGS. 2B and 2C, respectively) as these elements and their various compounds and/or ionic species also need to be controlled in order to address various mercury reemission and selenium emission issues.

Also, it has been found that a portion of the precipitated $Mn_xO_y$ tends to collect on the walls of a wet scrubber below the liquid line in the lower half of the recirculation tank. When and where $Mn_xO_y$ collects on the wet scrubber walls made from Alloy 2205 (UNS S32205, a duplex stainless steel alloy), corrosion pitting has been observed to occur beneath the deposit. While not wishing to be bound to any one theory, a possible explanation for the corrosion mechanism is the $Mn_xO_y$ creates a galvanic cell with the wall alloy causing corrosion. In separate bench-scale corrosion experiments the presence of manganese dioxide ($MnO_2$) has been shown to enhance corrosion but the creation of a galvanic cell not actually been proven.

Furthermore, in some instances it is also desirable to control the formation of various acidic ions that form in the presence of persulfate ions as they will react in the presence of calcium cations to form calcium sulfate and the corresponding halogen gas. This halogen gas will then further react in the slurry, or solution, of the ART to form, respectively, hypochlorite ions, hypobromite ions, and/or hypoiodite ions as illustrated by the exemplary equations below.

$$S_2O_8^{2-}+2Cl^-+2Ca^{2+}\rightarrow 2CaSO_4+Cl_2$$

$$S_2O_8^{2-}+2Br^-+2Ca^{2+}\rightarrow 2CaSO_4+Br_2$$

$$S_2O_8^{2-}+2I^-+2Ca^{2+}\rightarrow 2CaSO_4+I_2$$

$$Cl_2+H_2O\rightarrow 2H^++Cl^-+ClO^-$$

$$Br_2+H_2O\rightarrow 2H^++Br^-+BrO^-$$

$$I_2+H_2O\rightarrow 2H^++I^-+IO^-$$

While not wishing to be bound to any one theory, the formation of hypochlorite ions, hypobromite ions, and/or hypoiodite ions is believed to negatively impact the pH and the ORP in the slurry, or solution, of an ART.

Given the above, a need exists in the art for a method and/or system by which to control manganese-based precipitates, as well as other corrosion related and/or unwanted precipitates, in the recirculation tank (or absorber recirculation tank—ART) of a wet flue gas desulfurization (WFGD) system. Additionally, a need exists in the art for a method and/or system that while permitting, or enabling, the achievement of one or more of the afore-mentioned goals, such a method and/or system will not adversely impact the amount, or type, of selenium and/or mercury in an environment typical of a WFGD. Furthermore, a need exists for a method and/or system that permits control of the oxidation-reduction potential in a bleed stream of an absorber slurry, filtrate, and/or solution from a wet flue gas desulfurization scrubber.

SUMMARY OF THE INVENTION

The present invention relates generally to the field of emissions control and, in particular to a new and useful method and/or system by which to control various types of corrosion and/or precipitation issues in at least a portion of a wet flue gas desulfurization (WFGD) scrubber system. In one embodiment, the method and/or system of the present invention relies on the supply of at least one reducing agent to the slurry of a wet flue gas desulfurization scrubber to lower the oxidation reduction potential in the absorber slurry contained within the wet flue gas desulfurization scrubber. In still another embodiment, the method and/or system of the present invention control the oxidation-reduction potential in at least one bleed stream of an absorber slurry, filtrate, and/or solution from a wet flue gas desulfurization scrubber.

Accordingly, one aspect of the present invention is drawn to a method for controlling the oxidation-reduction potential in a recirculation tank, or absorber recirculation tank, of a wet flue gas desulfurization system, the method comprising the steps of: (i) supplying at least one reducing agent to a slurry, or solution, portion of the recirculation tank, or absorber recirculation tank, or at least one bleed stream therefrom; and (ii) permitting the at least one reducing agent to react with one or more oxidizing compounds and/or ions present in the slurry, or solution, portion of the recirculation tank, or absorber recirculation tank or at least one bleed stream therefrom, so as to achieve a reduction in the oxidation-reduction potential of the recirculation tank, or absorber recirculation tank, in the at least one bleed stream therefrom, or in a combination of the recirculation tank, or absorber recirculation tank, and the at least one bleed stream therefrom.

In yet another aspect of the present invention, there is provided a method for controlling the oxidation-reduction potential in a recirculation tank, or absorber recirculation tank, of a wet flue gas desulfurization system, the method comprising the steps of: (a) supplying at least one reducing agent to a slurry, or solution, portion of the recirculation tank, or absorber recirculation tank; (b) permitting the at least one reducing agent to react with one or more oxidizing compounds and/or ions present in the slurry, or solution, portion of the recirculation tank, or absorber recirculation tank, so as to achieve a reduction in the oxidation-reduction potential of the recirculation tank, or absorber recirculation tank; and (c) permitting the at least one reducing agent further to control, prevent, or eliminate the precipitation of manganese from soluble manganese present in the slurry, or solution, of the recirculation tank, or absorber recirculation tank, of a wet flue gas desulfurization system via the control of the oxidation-reduction potential in the slurry, or solution, of the recirculation tank, or absorber recirculation tank, of a wet flue gas desulfurization system.

In yet another aspect of the present invention, there is provided a method for controlling the oxidation-reduction potential in a recirculation tank, or absorber recirculation tank, of a wet flue gas desulfurization system, the method comprising the steps of: (I) supplying at least one reducing agent to a slurry, or solution, portion of the recirculation tank, or absorber recirculation tank; (II) permitting the at least one reducing agent to react with one or more oxidizing compounds and/or ions present in the slurry, or solution, portion of the recirculation tank, or absorber recirculation tank, so as to achieve a reduction in the oxidation-reduction potential of the recirculation tank, or absorber recirculation tank; (III) permitting the at least one reducing agent further to control, prevent, or eliminate the precipitation of manganese from soluble manganese present in the slurry, or solution, of the recirculation tank, or absorber recirculation tank, of a wet flue gas desulfurization system via the control of the oxidation-reduction potential in the slurry, or solution, of the recirculation tank, or absorber recirculation tank, of a wet flue gas desulfurization system; and (IV) permitting the at least one reducing agent to control mercury re-emission in wet flue gas desulfurization system via the control of the oxidation-reduction potential in the in the slurry, or solution, of the recirculation tank, or absorber recirculation tank, of a wet flue gas desulfurization system.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
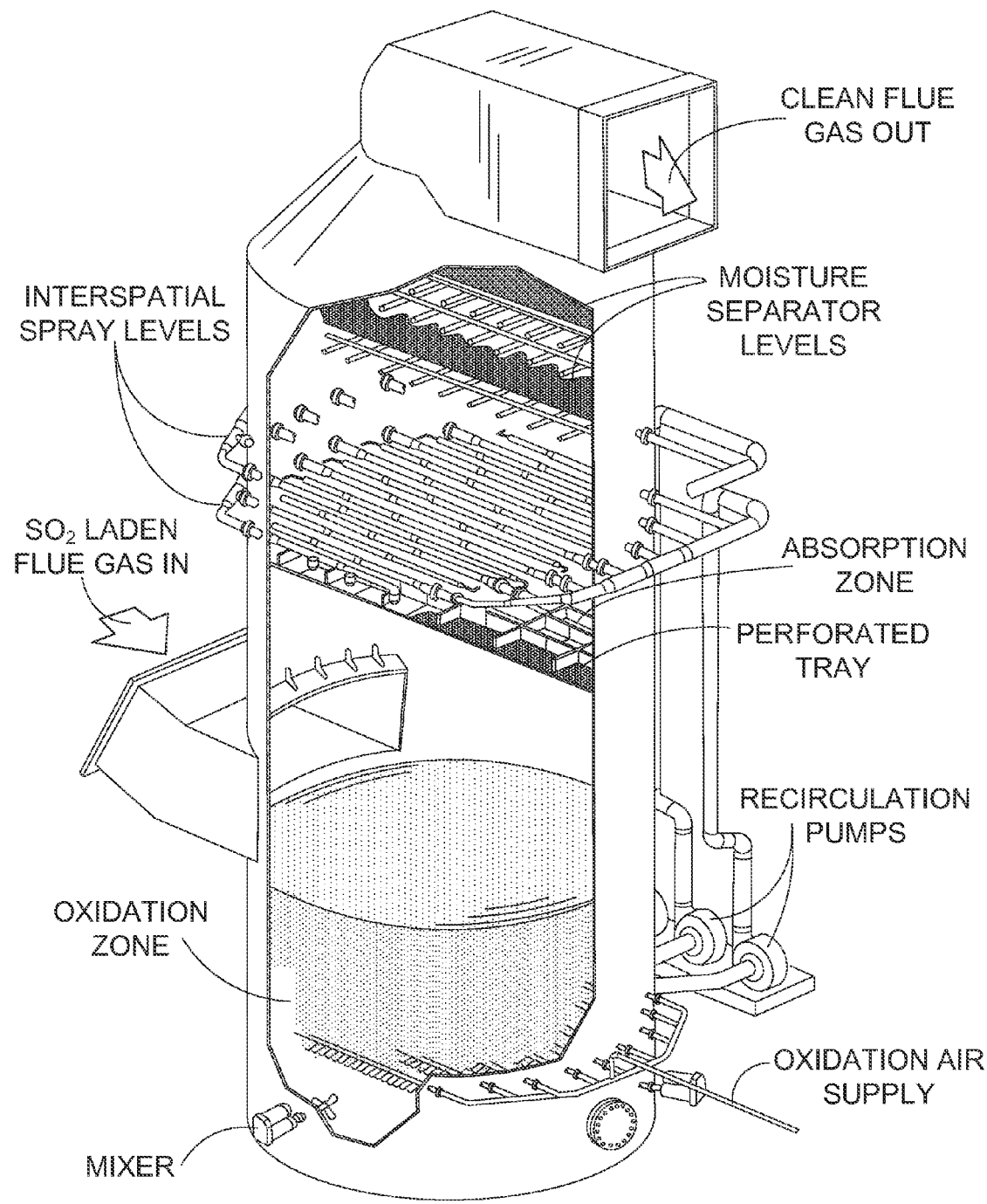
FIG. 1 is an illustration of an exemplary WFGD.
Figure 2A:
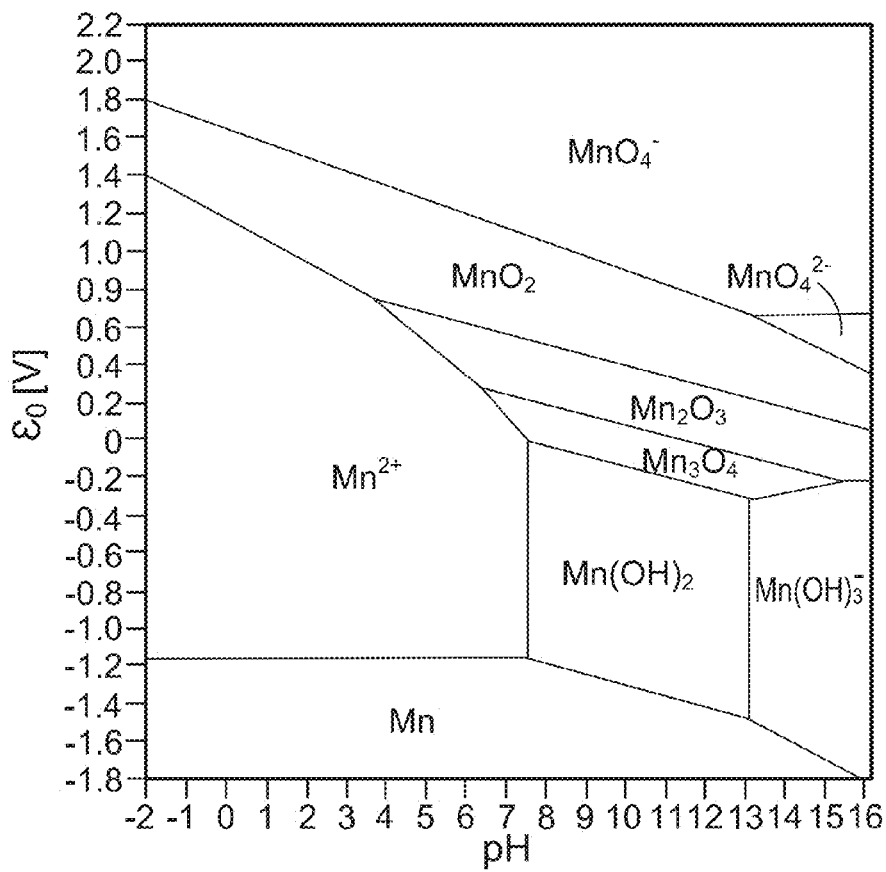
FIG. 2A is a Pourbaix diagram for manganese.
Figure 2C:
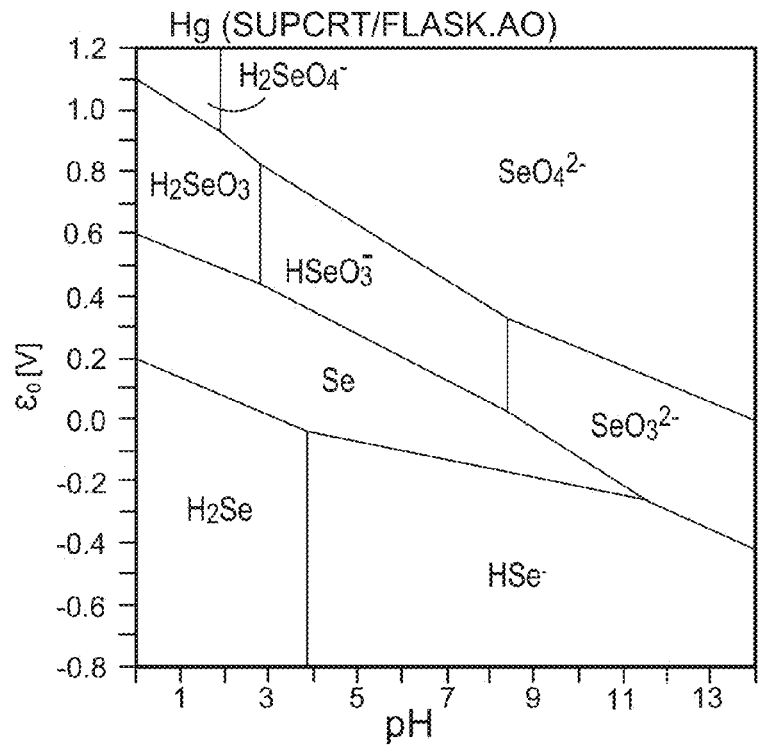
FIG. 2C is a Pourbaix diagram for selenium.
Figure 2B:
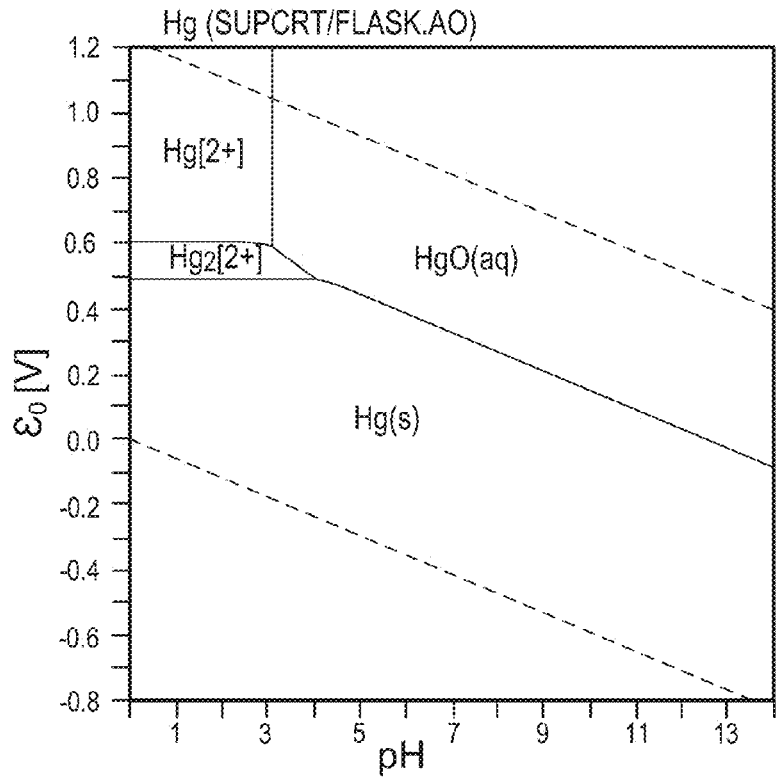
FIG. 2B is a Pourbaix diagram for mercury.

While the present invention will be described in terms of wet flue gas desulfurization scrubber system, the present invention is not limited thereto. Rather, the method and/or system of the present invention can be utilized in any situation where various corrosion and/or precipitation issues present themselves in an absorber recirculation tank environment.

As noted above, the present invention relates generally to the field of emissions control and, in particular to a new and useful method and/or system by which to control various types of corrosion and/or precipitation issues in at least a portion of a wet flue gas desulfurization (WFGD) scrubber system. In one embodiment, the method and/or system of the present invention relies on the supply of at least one reducing agent to the slurry of a wet flue gas desulfurization scrubber to lower the oxidation reduction potential in the absorber slurry contained within the wet flue gas desulfurization scrubber. In still another embodiment, the method and/or system of the present invention control the oxidation-reduction potential in at least one bleed stream of an absorber slurry, filtrate, and/or solution from a wet flue gas desulfurization scrubber.

As discussed above, it has been determined that a high oxidation-reduction potential (ORP) and concentration of one or more very strong oxidizers such as persulfate, permanganate, manganate, ozone hypochlorite, chlorate, nitric acid, iodine, bromine, chlorine, fluorine, or combinations of any two or more thereof, be they compounds or ions, in a wet scrubber's absorber recirculation tank (ART) causes precipitation of soluble manganese. While not wishing to be bound to any one theory, it is believed manganese dioxide precipitate ($MnO_2$) settling on the walls of the ART can create a galvanic cell leading to corrosion, or further enhancing the circumstances that cause corrosion. While not wishing to be bound to any one solution, one possible method to control, reduce and/or mitigate the ORP in an ART is to reduce the ORP by controlling, eliminating and/or reducing the concentration, or amount, of one or more oxidizing compounds and/or ions that exist in an ART. Such oxidizing compounds and/or ions include, but are not limited to, persulfate, permanganate, manganate, ozone hypochlorite, chlorate, nitric acid, iodine, bromine, chlorine, fluorine, or combinations of any two or more thereof. In another embodiment, the present invention seeks to control, reduce and/or mitigate the ORP in an ART is to reduce the ORP by controlling, eliminating and/or reducing the concentration, or amount, of persulfate (in the form of ions, etc.) that exist in, or are formed in, the ART of a WFGD. While the present invention is described in terms of corrosion that occurs in an ART formed from Alloy 2205 (UNS S32205, a duplex stainless steel alloy), the present invention is not limited thereto. Rather, corrosion can and does occur in a wide range of iron-based alloys and as such, the present invention applies to any situation where the ORP needs to be controlled in order to reduce, control and/or mitigate the corrosive nature of the environment in an ART. Here, as well as elsewhere in the specification and claims, the term "persulfate" is defined to include one or both of peroxodisulfate ions ($S_2O_8^{2-}$) or peroxomonosulfate ions ($SO_5^{2-}$). Accordingly, as used throughout the specification and claims the term "persulfate" includes both persulfate ions and other forms of the noted ionic compounds above regardless of whether such ions are bound in a chemical composition or in an ionic state because they are in solution.

In one embodiment, the present invention relates to the use of at least one reducing agent to control the ORP in an ART and/or one or more bleed streams therefrom. In one embodiment, the one or more reducing agents that are utilized in conjunction with a system and/or method of the present invention are designed to reduce the ORP in an ART and/or one or more bleed streams therefrom so as to control, eliminate and/or reduce the concentration, or amount, of persulfate that exist in, or are formed in, the ART of a WFGD. Additionally, also of interest is the fact that the ORP of the ART has a known effect on selenium speciation, manganese solubility, and mercury re-emission. Thus, in one instance the present invention is directed to a method and/or system that permits the control of, elimination of and/or reduction of the concentration, or amount, of persulfate that exist in, or are formed in, the ART of a WFGD. In some embodiments, the method and/or system of the present invention does not negatively impact the amount of selenium and/or mercury that is emitted and/or re-emitted from a WFGD.

In one embodiment, the at least one reducing agent of the present invention can be supplied in any suitable form to any suitable addition point of the ART and/or one or bleed streams therefrom. For example, in one embodiment, the at least one reducing agent of the present invention can be supplied in the form of a powder, an aqueous solution, a suspension, or any other suitable form that permits the at least one reducing agent of the present invention to be supplied to the slurry, or solution, of the ART and/or supplied to at least one bleed stream from the ART. As would be appreciated by those of skill in the art, suitable methods and equipment to supply the at least one reducing agent of the present invention to the ART or the at least one bleed stream therefrom are known in the art. For example, an aqueous solution containing one or more reducing agents of the present invention can supplied to the ART, or one or more bleed streams therefrom, can be supplied using any suitable method known in the art.

In one embodiment, the present invention seeks to reduce the amount of, or concentration of, persulfate in the ART and/or a bleed stream therefrom to a level below about 150 ppm, below about 125 ppm, below about 100 ppm, below about 75 ppm, below about 50 ppm, below about 25 ppm, or below about 10 ppm, or below about 5 ppm, or even below about 1 ppm. Here, as well as elsewhere in the specification and claims, individual numerical values and/or range limits can be combined to form new and/or undisclosed ranges. In another embodiment, the present invention seeks to reduce the amount of, or concentration of, any one or more oxidizing compounds and/or ions (e.g., persulfate, permanganate, manganate, ozone hypochlorite, chlorate, nitric acid, iodine, bromine, chlorine, fluorine, or combinations of any two or more thereof) in an ART and/or a bleed stream therefrom to a level below about 150 ppm, below about 125 ppm, below about 100 ppm, below about 75 ppm, below about 50 ppm, below about 25 ppm, or below about 10 ppm, or below about 5 ppm, or even below about 1 ppm. Here, as well as elsewhere in the specification and claims, individual numerical values and/or range limits can be combined to form new and/or undisclosed ranges.

In light of the above, in one embodiment the present invention relates to a method and/or system that supplies at least one reducing agent to the ART and/or at least one bleed stream therefrom in order to achieve a reduction in the ORP of the ART or the ORP in the bleed stream. As will be shown below, the lowering of the ORP in the ART and/or at least one bleed stream therefrom is at least partially due to the fact that the addition of one or more reducing agents to the ART and/or at least one bleed stream therefrom leads to a reduction in the amount of, or concentration of, one or more oxidizing compounds and/or ions (e.g., persulfate, permanganate, manganate, ozone hypochlorite, chlorate, nitric acid, iodine, bromine, chlorine, fluorine, or combinations of any two or more thereof) in solution thereby lowering the ORP in the ART and/or the ORP in at least one bleed stream therefrom so as to minimize precipitation of manganese compounds, favor the formation of selenite ion, and/or favor a reducing environment for a lower oxidation state for a transition metal ion, other metal or metalloid ion and other slurry constituents such as, but not limited to, various anionic species (e.g., arsenite and/or selenite).

However, in some embodiments, producing a less oxidizing environment in the ART, or at least one bleed stream therefrom, via the addition of at least one reducing agent can lead to an increase in the re-emission of mercury. Accordingly, some embodiments of the present invention simultaneously address the need for reducing the ORP in the ART and/or at least one bleed stream therefrom while at the same time controlling, limiting, mitigating and/or eliminating the amount of mercury that is re-emitted.

Also of interest, to the present invention, is the selectivity of the at least one reducing agents to controlling the ORP in the ART, and/or at least one bleed stream therefrom, rather than reacting with any excess oxidizing agents in the ART, or at least one bleed stream therefrom, that are mainly found in the forced oxidation air thereby causing competition with the at least one reducing agent. Such competition could result in the ORP of the ART, and/or the ORP of at least one bleed stream therefrom, remaining the same, or not falling as desired, thereby resulting in too low of a reduction, mitigation and/or elimination of the precipitation of manganese and the lack of an environment in the ART, or at least one bleed stream therefrom, that favors, at a desirable level, the formation of selenite ions.

Although not wishing to be limited to any one set of advantages, some of the factors considered for selection of a reducing agent are cost, safety and handling, and known precipitation, or side precipitation, reactions. Given this, in one embodiment the present invention is directed to the use of at least one reducing agent selected from sodium thiosulfate ($Na_2S_2O_3$), sodium sulfite ($Na_2SO_3$), iron (II) sulfate (also known as ferrous sulfate—$FeSO_4$), phosphorous acid ($H_3PO_3$), iron (II) ammonium sulfate (also known as ferrous ammonium sulfate—$(NH_4)_2Fe(SO_4)_2$), hydroxylamine hydrochloride (also known as hydroxylammonium chloride—$HONH_2.HCl$), hypophosphorous acid (HPA—$H_3PO_2$), or a combination of any two or more thereof, any three or more thereof, any four or more thereof, any five or more thereof, any six or more thereof, or a mixture of at least one form, or compound, of seven thereof. It should be noted that the at least one reducing agent of the present invention can be selected from any form of the compounds listed above. Since some of the compounds listed above have multiple hydration states (e.g., $FeSO_4$) it is possible that at least one or more items in the list of reducing agents above have multiple chemical compounds that are within the scope of the present invention. Accordingly, the list above includes both hydrated forms as well as anhydrous forms as the presence of bound water is not a deleterious factor for the method and/or system of the present invention.

Turning to each of the above-listed reducing agents, an exemplary electrochemical reaction for each reducing agent in the presence of an exemplary oxidizing compound and/or ion, persulfate ion (e.g., peroxodisulfate ions ($S_2O_8^{2-}$), will be discussed herein. It should be understood that although the reactions discussed below utilize persulfate, and specifically peroxodisulfate ions ($S_2O_8^{2-}$, the present invention is not limited thereto. Rather, suitable reactions utilizing the one or more reducing agents discussed below can occur with other oxidizing agents compounds and/or ions (e.g., peroxomonosulfate ions ($SO_5^{2-}$) persulfate, permanganate, manganate, ozone hypochlorite, chlorate, nitric acid, iodine, bromine, chlorine, fluorine, or combinations of any two or more thereof) as well. Unless otherwise stated, the reactions discussed below take place in an aqueous medium located in an ART where at least about 65 weight percent of the medium is water, at least about 70 weight percent of the medium is water, at least about 75 weight percent of the medium is water, at least about 80 weight percent of the medium is water, or even at least about 85 weight percent of the medium is water with the remainder being a variety of suspended and/or dissolved solid compounds. In the case of the at least one bleed stream from the ART the medium that forms the bleed stream is at least about 65 weight percent water, at least about 70 weight percent water, at least about 75 weight percent water, at least about 80 weight percent water, or even at least about 85 weight percent water with the remainder being a variety of suspended and/or dissolved solid compounds. In still another embodiment, the at least one reducing agent of the present invention is added to a bleed stream after one or more treatments to remove at least one type of suspended solid and/or dissolved solid. Given this, the above ranges with regard to the amount of water in the bleed stream medium also apply to this embodiment. Here, as well as elsewhere in the specification and claims, individual numerical values and/or range limits can be combined to form new and/or undisclosed ranges.

The at least one reducing agent of the present invention is injected at any suitable position in a wet flue gas desulfurization (WFGD) unit. One non-limiting injection point for the at least one reducing agent of the present invention is in the wet flue gas desulfurization (WFGD) unit at the suction side of the recirculation pump using any suitable injection method known to those of skill in the art. Suitable injection methods include any known injection method for injecting an aqueous-based solution, where in the case of the present invention the aqueous-based solution contains at least one reducing agent. Additionally, the present invention is not limited to any one injection method and/or injection point. As would be apparent to those of skill in the art, the injection point and/or injection method will vary depending upon the nature, or type, of the WFGD unit, the plant on which the WFGD unit is installed, etc.

In one embodiment, the at least one reducing agent of the present invention is a solution of sodium thiosulfate ($Na_2S_2O_3$) that reacts with persulfate ions according to the following chemical reaction in aqueous solution:

$$S_2O_8^{2-}+2S_2O_3^{2-}\rightarrow 2SO_4^{2-}+S_4O_6^{2-} \qquad E=2.09\ V.$$

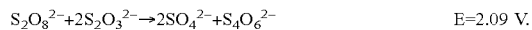

$Na_2S_2O_3$ also reduces the hypochlorite anion (the anion in bleach) and in doing so becomes oxidized to sulfate. While not wishing to be bound to any one theory, hypochlorite ions are believed to form when high concentrations of persulfate are present in the ART because persulfate can oxidize chloride to chlorine. In one embodiment, the ratio of the sodium thiosulfate ($Na_2S_2O_3$) reducing agent utilized to control the ORP in the ART and/or the ORP in at least one bleed stream therefrom is about 0.5 moles of sodium thiosulfate ($Na_2S_2O_3$) per mole of persulfate ions, or about 0.75 moles of sodium thiosulfate ($Na_2S_2O_3$) per mole of persulfate ions, or about one (1) mole of sodium thiosulfate ($Na_2S_2O_3$) per mole of persulfate ions, or about 1.25 moles of sodium thiosulfate ($Na_2S_2O_3$) per mole of persulfate ions, or about 1.5 moles of sodium thiosulfate ($Na_2S_2O_3$) per mole of persulfate ions, or about 1.75 moles of sodium thiosulfate ($Na_2S_2O_3$) per mole of persulfate ions, or about two (2) moles of sodium thiosulfate ($Na_2S_2O_3$) per mole of persulfate ions, or about 2.25 moles of sodium thiosulfate ($Na_2S_2O_3$) per mole of persulfate ions, or even about 2.5 moles of sodium thiosulfate ($Na_2S_2O_3$) per mole of persulfate ions. Here, as well as elsewhere in the specification and claims, individual numerical values and/or range limits can be combined to form new and/or undisclosed ranges. In another embodiment, the amount of the sodium thiosulfate ($Na_2S_2O_3$) reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In still another embodiment, the at least one reducing agent of the present invention is a solution of sodium sulfite ($Na_2SO_3$) that reacts with persulfate ions according to the following chemical reaction:

$$SO_3^{2-}+H_2O+S_2O_8^{2-}+2e^-\rightarrow SO_4^{2-}+2H^++2e^-+2SO_4^{2-} \qquad E=2.94\ V.$$

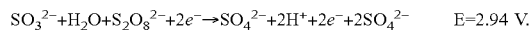

As can be seen from the electrical potentials of the reactions detailed herein, the above chemical reaction has the second highest electrochemical potential of the reducing agents of the present invention. In one embodiment, the ratio of the sodium sulfite ($Na_2SO_3$) reducing agent utilized to control the ORP in the ART and/or the ORP in at least one bleed stream therefrom is about 0.5 moles of sodium sulfite ($Na_2SO_3$) per mole of persulfate ions, or about 0.75 moles of sodium thiosulfate ($Na_2S_2O_3$) per mole of persulfate ions, or about one (1) mole of sodium sulfite ($Na_2SO_3$) per mole of persulfate ions, or about 1.25 moles of sodium sulfite ($Na_2SO_3$) per mole of persulfate ions, or about 1.5 moles of sodium sulfite ($Na_2SO_3$) per mole of persulfate ions, or about 1.75 moles of sodium sulfite ($Na_2SO_3$) per mole of persulfate ions, or about two (2) moles of sodium sulfite ($Na_2SO_3$) per mole of persulfate ions, or about 2.25 moles of sodium sulfite ($Na_2SO_3$) per mole of persulfate ions, or even about 2.5 moles of sodium sulfite ($Na_2SO_3$) per mole of persulfate ions. Here, as well as elsewhere in the specification and claims, individual numerical values and/or range limits can be combined to form new and/or undisclosed ranges. In another embodiment, the amount of the sodium sulfite ($Na_2SO_3$) reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In still another embodiment, the at least one reducing agent of the present invention is a solution of iron (II) sulfate (or ferrous sulfate—$FeSO_4$) at a concentration of 5 weight percent where the solution has a pH of at least about 2.0, at least about 3.0 or at least about 4.0, or at least about 5.0, or even at least about 6.0, and if necessary is buffered to achieve the desired pH level. Here, as well as elsewhere in the specification and claims, individual numerical values and/or range limits can be combined to form new and/or undisclosed ranges. In addition to any injection point contemplated above, the solution of ferrous sulfate can be added to the cooling water flowing through the tubes of a turbine condenser. In this embodiment, the solution of ferrous sulfate forms a corrosion-resistant protective coating on the inside of the one or more tubes of the turbine condenser. While not wishing to be bound to any one theory, it is believed that the ferrous ion undergoes a change to the ferric ion. The oxidation of solutions of iron (II) is pH dependent, occurring much favorably at high pHs. That is, a pH of at least about 4.0, at least about 5.0, or even at least about 6.0. The chemical reaction with persulfate proceeds as the following:

$$S_2O_8^{2-}+2Fe^{2+}\rightarrow 2SO_4^{2-}+2Fe^{3+} \qquad E=2.78\ V.$$

In one embodiment, the ratio of the iron (II) sulfate reducing agent utilized to control the ORP in the ART and/or the ORP in at least one bleed stream therefrom is about 0.5 moles of iron (II) sulfate per mole of persulfate ions, or about 0.75 moles of iron (II) sulfate per mole of persulfate ions, or about one (1) mole of iron (II) sulfate per mole of persulfate ions, or about 1.25 moles of iron (II) sulfate per mole of persulfate ions, or about 1.5 moles of iron (II) sulfate per mole of persulfate ions, or about 1.75 moles of iron (II) sulfate per mole of persulfate ions, or about two (2) moles of iron (II) sulfate per mole of persulfate ions, or about 2.25 moles of iron (II) sulfate per mole of persulfate ions, or even about 2.5 moles of iron (II) sulfate per mole of persulfate ions. Here, as well as elsewhere in the specification and claims, individual numerical values and/or range limits can be combined to form new and/or undisclosed ranges. In another embodiment, the amount of the iron (II) sulfate reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In still another embodiment, the at least one reducing agent of the present invention is a solution of phosphorous acid ($H_3PO_3$). The most important use of phosphorous acid is the production of phosphonates which are used in water treatment. Phosphorous acid is a powerful reducing agent. When treated with a cold solution of mercuric chloride, a white precipitate of mercury (I) chloride forms:

$$H_3PO_3 + 2HgCl_{2(aq)} + H_2O \rightarrow Hg_2Cl_{2(s)} + H_3PO_4 + 2HCl.$$

Mercurous chloride is reduced further by phosphorous acid to elemental mercury on heating or on standing per the following reaction:

$$H_3PO_3 + Hg_2Cl_{2(s)} + H_2O \rightarrow 2Hg + H_3PO_4 + 2HCl.$$

Phosphorous acid reacts with and is changed to phosphoric acid upon reaction with a persulfate ion as shown below:

$$H_3PO_3 + S_2O_8^{2-} + H_2O \rightarrow H_3PO_4 + 2SO_4^{2-} + 2H^+ \qquad E=2.29 \text{ V}.$$

In one embodiment, the ratio of the phosphorous acid ($H_3PO_3$) reducing agent utilized to control the ORP in the ART and/or the ORP in at least one bleed stream therefrom is about 0.5 moles of phosphorous acid ($H_3PO_3$) per mole of persulfate ions, or about 0.75 moles of phosphorous acid ($H_3PO_3$) per mole of persulfate ions, or about one (1) mole of phosphorous acid ($H_3PO_3$) per mole of persulfate ions, or about 1.25 moles of phosphorous acid ($H_3PO_3$) per mole of persulfate ions, or about 1.5 moles of phosphorous acid ($H_3PO_3$) per mole of persulfate ions, or about 1.75 moles of phosphorous acid ($H_3PO_3$) per mole of persulfate ions, or about two (2) moles of phosphorous acid ($H_3PO_3$) per mole of persulfate ions, or about 2.25 moles of phosphorous acid ($H_3PO_3$) per mole of persulfate ions, or even about 2.5 moles of phosphorous acid ($H_3PO_3$) per mole of persulfate ions. Here, as well as elsewhere in the specification and claims, individual numerical values and/or range limits can be combined to form new and/or undisclosed ranges. In another embodiment, the amount of the phosphorous acid ($H_3PO_3$) reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In still another embodiment, the at least one reducing agent of the present invention is a solution of iron (II) ammonium sulfate (also known as ferrous ammonium sulfate—$(NH_4)_2Fe(SO_4)_2$ or $Fe(NH_4)_2(SO_4)_2$). Iron (II) ammonium sulfate can be utilized as a reagent in the BWRC Redox titration reaction to determine the amount of persulfate ions present in the ART slurry or solution. Iron (II) ammonium sulfate is much less affected by oxygen in the air than iron (II) sulfate. The ammonium ions make solutions of ferrous ammonium sulfate slightly acidic, which prevents this oxidation from occurring. The relevant equation for this reaction is:

$$4Fe^{2+} + O_2 + (4+2x)H_2O \rightleftharpoons 2Fe_2O_3 \cdot xH_2O + 8H^+.$$

The presence of protons keeps this equilibrium to the left, that is, the iron (II) side of the reaction. In one embodiment, the iron (II) ammonium sulfate reducing agent can be utilized in conjunction with the present invention. In one embodiment, the ratio of the iron (II) ammonium sulfate reducing agent utilized to control the ORP in the ART and/or the ORP in at least one bleed stream therefrom is about 0.5 moles of iron (II) ammonium sulfate per mole of persulfate ions, or about 0.75 moles of iron (II) ammonium sulfate per mole of persulfate ions, or about one (1) mole of iron (II) ammonium sulfate per mole of persulfate ions, or about 1.25 moles of iron (II) ammonium sulfate per mole of persulfate ions, or about 1.5 moles of iron (II) ammonium sulfate per mole of persulfate ions, or about 1.75 moles of iron (II) ammonium sulfate per mole of persulfate ions, or about two (2) moles of iron (II) ammonium sulfate per mole of persulfate ions, or about 2.25 moles of iron (II) ammonium sulfate per mole of persulfate ions, or even about 2.5 moles of iron (II) ammonium sulfate per mole of persulfate ions. Here, as well as elsewhere in the specification and claims, individual numerical values and/or range limits can be combined to form new and/or undisclosed ranges. In another embodiment, the amount of the iron (II) ammonium sulfate reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In still another embodiment, the at least one reducing agent of the present invention is a solution of hydroxylamine hydrochloride (also known as hydroxylammonium chloride—$NH_2OH \cdot HCl$), the hydrochloric acid salt of hydroxylamine. It should be noted that hydroxylamine is recognized as a mutagenic substance, moderately toxic and harmful to human, animals and plants. While not wishing to be bound to any one theory, the reaction with persulfate ions is believed to proceed as follows:

$$2NH_3OH^+ + S_2O_8^{2-} + 2e^- \rightarrow N_2 + 2H_2O + 4H^+ + 2e^- + 2SO_4^{2-} \qquad E=3.88 \text{ V}.$$

In one embodiment, the ratio of the hydroxylamine hydrochloride reducing agent utilized to control the ORP in the ART and/or the ORP in at least one bleed stream therefrom is about 0.5 moles of hydroxylamine hydrochloride per mole of persulfate ions, or about 0.75 moles of hydroxylamine hydrochloride per mole of persulfate ions, or about one (1) mole of hydroxylamine hydrochloride per mole of persulfate ions, or about 1.25 moles of hydroxylamine hydrochloride per mole of persulfate ions, or about 1.5 moles of hydroxylamine hydrochloride per mole of persulfate ions, or about 1.75 moles of hydroxylamine hydrochloride per mole of persulfate ions, or about two (2) moles of hydroxylamine hydrochloride per mole of persulfate ions, or about 2.25 moles of hydroxylamine hydrochloride per mole of persulfate ions, or even about 2.5 moles of hydroxylamine hydrochloride per mole of persulfate ions. Here, as well as elsewhere in the specification and claims, individual numerical values and/or range limits can be combined to form new and/or undisclosed ranges. In another embodiment, the amount of the hydroxylamine hydrochloride reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In still another embodiment, the at least one reducing agent of the present invention is a solution of hypophosphorous acid (HPA—$H_3PO_2$) is a powerful reducing agent, more so than phosphorous acid ($H_3PO_3$). HPA is usually supplied as a 50 percent solution. While not wishing to be bound to any one theory, the reaction with persulfate ions is believed to proceed as follows:

$$S_2O_8^{2-} + 2e^- + H_3PO_2 + H_2O \rightarrow 2SO_4^{2-} + H_3PO_3 + 2H^+ + 2e^- \qquad E=2.51 \text{ V}.$$

In one embodiment, the ratio of the hypophosphorous acid reducing agent utilized to control the ORP in the ART and/or the ORP in at least one bleed stream therefrom is about 0.5 moles of hypophosphorous acid per mole of persulfate ions, or about 0.75 moles of hypophosphorous acid per mole of persulfate ions, or about one (1) mole of hypophosphorous acid per mole of persulfate ions, or about 1.25 moles of hypophosphorous acid per mole of persulfate ions, or about 1.5 moles of hypophosphorous acid per mole of persulfate ions, or about 1.75 moles of hypophosphorous acid per mole of persulfate ions, or about two (2) moles of hypophosphorous acid per mole of persulfate ions, or about 2.25 moles of hypophosphorous acid per mole of persulfate ions, or even about 2.5 moles of hypophosphorous acid per mole of persulfate ions. Here, as well as elsewhere in the specification and claims, individual numerical values and/or range limits can be combined to form new and/or undisclosed ranges. In another embodiment, the amount of the hypophosphorous acid reducing agent utilized to control the ORP in the ART and/or the ORP in at least one bleed stream therefrom is in the range of half of the stoichiometric amount to three times the stoichiometric amount based upon the stoichiometric amount necessary to carry out the above persulfate reaction.

In another embodiment, any of the one or more reducing agents of the present invention can be combined with one or more compounds that permit the control of mercury re-emission. In one embodiment, such mercury re-emission control agent is a sodium hydrosulfide (NaHS) solution that can, for example, be injected in a wet flue gas desulfurization (WFGD) unit in the suction side of the recirculation pump using any suitable injection method known to those of skill in the art. The amount of mercury re-emission control agent varies from about 0.5 moles of sodium hydrosulfide (NaHS) per mole of mercury, or about 0.75 moles of sodium hydrosulfide (NaHS) per mole of mercury, or about one (1) mole of sodium hydrosulfide (NaHS) per mole of mercury, or about 1.25 moles of sodium hydrosulfide (NaHS) per mole of mercury, or about 1.5 moles of sodium hydrosulfide (NaHS) per mole of mercury, or about 1.75 moles of sodium hydrosulfide (NaHS) per mole of mercury, or about two (2) moles of sodium hydrosulfide (NaHS) per mole of mercury, or about 2.25 moles of sodium hydrosulfide (NaHS) per mole of mercury, or even about 2.5 moles of sodium hydrosulfide (NaHS) per mole of mercury. Here, as well as elsewhere in the specification and claims, individual numerical values and/or range limits can be combined to form new and/or undisclosed ranges. In another embodiment, the amount of the sodium hydrosulfide (NaHS) utilized to control mercury re-emission in the ART and/or the one or more bleed streams therefrom is in the range of half of the stoichiometric amount to three times the stoichiometric amount based upon the stoichiometric amount necessary to carry out the above persulfate reaction.

Given the above, each reducing agent is evaluated individually to determine its effectiveness at reacting with persulfate ions (or anions). A stock solution of one reducing agent is freshly prepared daily that contains a persulfate ion concentration of 1000 ppm in 10000 ppm chloride (from $CaCl_2$) and 5650 ppm soluble calcium. While not wishing to be bound to any one theory, it is believed that hypophosphorous acid (HPA—$H_3PO_2$), phosphorous acid ($H_3PO_3$), sodium hydrosulfide (NaHS) and sodium sulfite ($Na_2SO_3$) react in a 1 to 1 mole ratio with persulfate ions while the other reducing agents listed above react at a ratio of two moles reducing agent to one mole of persulfate ions. In one embodiment, the testing of the reducing agents of the present invention is conducted at an initial concentration of either 1000 or 2000 ppm, and as such is either in stoichiometric agreement, or stoichiometric excess, of the amount needed to chemically react with 1000 ppm of persulfate ions. The concentration of hydroxylamine hydrochloride tested, 344 ppm as $NH_2OH$, is the amount calculated as necessary to react two moles hydroxylamine with one mole of persulfate ions. Two concentrations of HPA are tested, 344 and 688 ppm, and represent one and two moles of $H_3PO_2$, respectively, reacting with one mole of persulfate ions.

Thirty gram samples are prepared, in duplicate, by weighing the appropriate amount of stock solution and reducing agent into individual 40 mL glass VOA vials. ORP, pH and persulfate ion concentration (starting near 1000 ppm or 5.2 mM) are determined using a control test solution (in this case the stock solution)), and for each Test Sample after addition of the reducing agent. Persulfate ion concentrations are determined by Redox titration after allowing the samples to sit for thirty minutes at ambient temperature. Based on the effectiveness of each reducing agent to chemically react with persulfate ions (or anions) some of the reducing agents of the present invention are subjected to additional testing. Also, under certain circumstances there may be some undesirable effects, like precipitation or corrosion potential considerations, where the decision is made not to utilize certain reducing agents of the present invention to control persulfate ions in the ART slurry and/or solution. Also, it was found that in order to properly evaluate effectiveness, some of the reducing agents need to be heated to 55° C. to react with persulfate ions. This issue should not be a problem in the application of the present invention as the slurry and/or solution present in the ART is generally at or above this temperature. Table 1 lists the results obtained from the initial screening of the eight reducing agents listed above. Each numbered control stock solution represents a different batch that are prepared fresh daily, and are used to prepare and evaluate the group of reducing agents following it. One concern that arises is that the persulfate ion concentration might decrease with time, and not accurately reflect just the reducing agent contribution in reducing the amount of persulfate ions by a suitable chemical reaction. This is the reason the persulfate ion concentration of the control stock solution is measured before and after testing for the first groups of reducing agents. Once it is established that the persulfate ion concentration is not changing during the test period, the persulfate ion concentration is measured for the control stock solution only after preparation.

The mole ratio of reducing agent to persulfate (actual) is calculated by taking the milliliters of excess standardized iodine solution measured by titration, beyond what is necessary to react with the given concentration of persulfate ions, and correcting the mole ratio used for evaluating each reducing agent.

Figure 3:
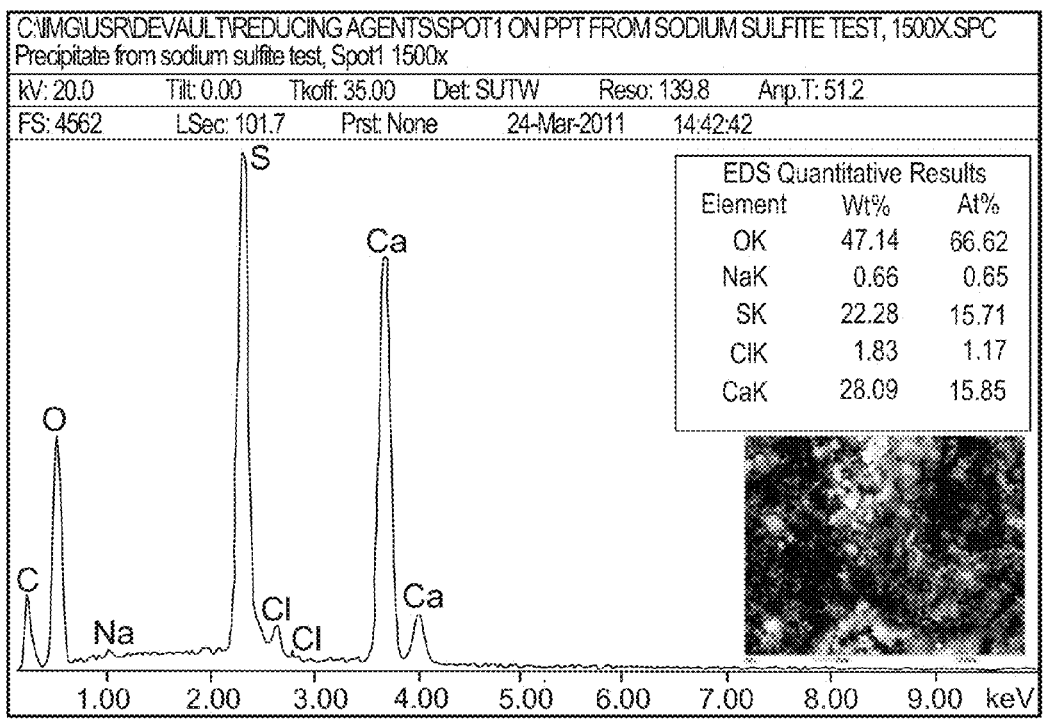
FIG. 3 is an SEM analysis at 1500× and an EDS analysis of the precipitate formed using a sodium sulfite solution.
Figure 4:
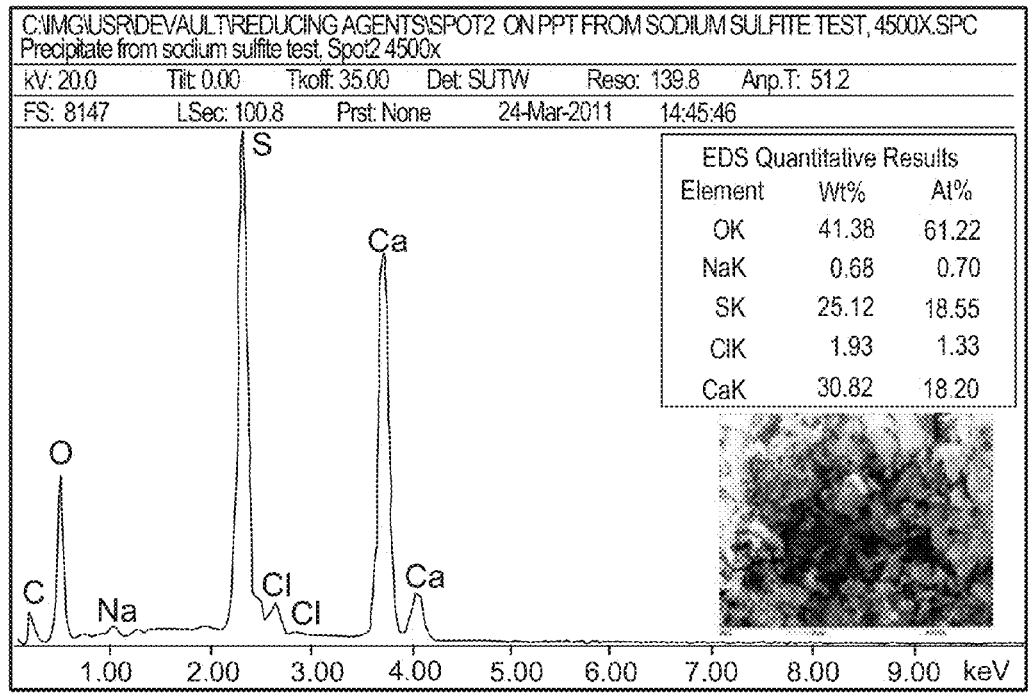
FIG. 4 is an SEM analysis at 4500× and an EDS analysis of the precipitate formed using a sodium sulfite solution.
Figure 5:
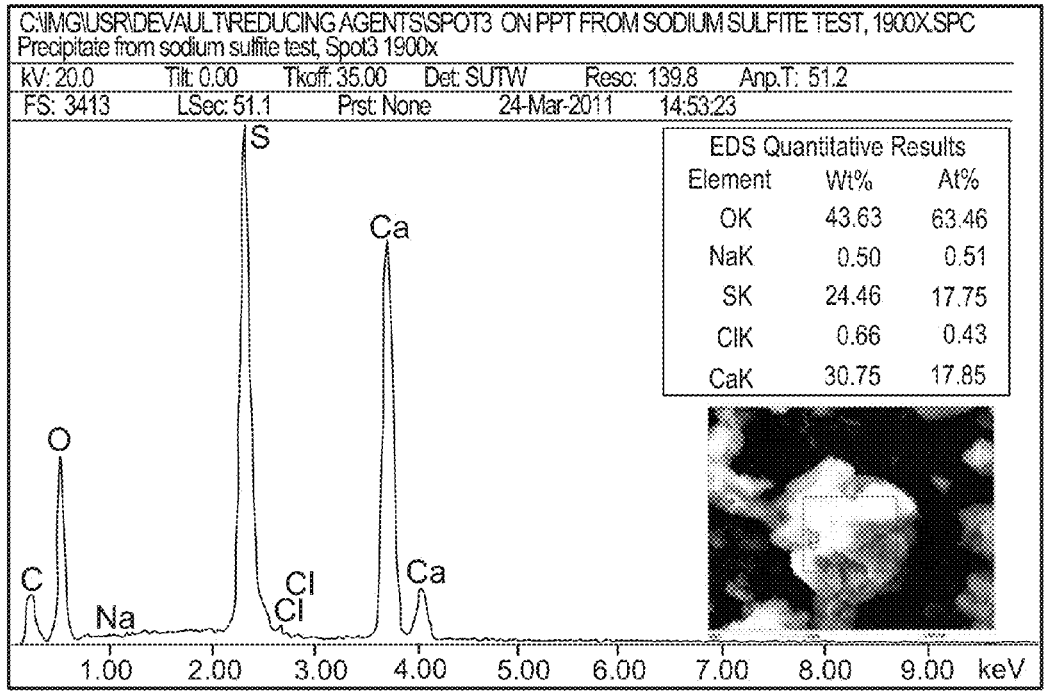
FIG. 5 is an SEM analysis at 1900× and an EDS analysis of the precipitate formed using a sodium sulfite solution.

Sodium Sulfite:

The concentration of sodium sulfite used for evaluation is 1000 ppm. Immediately, upon addition of sodium sulfite to the stock solution, a precipitate is observed. A portion of the precipitate is isolated for SEM/EDS analysis (see FIGS. 3 through 5). The crystals formed do not resemble gypsum crystals (see FIG. 5 versus 7 and 9). Their appearance is more sponge-like and is probably why $CaSO_3$ is more difficult to dewater than gypsum. The elemental composition obtained by EDS supports the idea that most probably the precipitate is $CaSO_3$. Even though the concentration of sodium sulfite added is well in excess of the theoretical amount necessary to react with 1000 ppm persulfate ions, there is still 720 ppm of unreacted persulfate left in the sample. Clearly, sodium sulfite may not be as good of a choice for a reducing agent in the realm of the present invention as the amount of sodium sulfite necessary to accomplish the stated goal of reducing the concentration of persulfate ions in the ART will be high because any soluble calcium that exists in the slurry and/or solution of the ART may react with the sodium sulfite.

TABLE 1

Initial Screening of Reducing Agent Candidates in 1000 ppm $S_2O_8^{2-}$ and 10000 ppm Cl (as $CaCl_2$) at 25° C.

| Reducing Agent | Con. (ppm) | ORP (mV) | pH | $S_2O_8^{2-}$ Titration (ppm $S_2O_8^{2-}$) | Mole Ratio Reducing Agent To Persulfate Theoretical | Mole Ratio Reducing Agent To Persulfate Actual | Comments | SEM/EDS Results |
|---|---|---|---|---|---|---|---|---|
| Control Stock Solution 1 | — | 455 | 5.28 | 1008 | — | — | — | — |
| Sodium Sulfite, $Na_2SO_3$ | 1000 | 257 | 5.83 | 720 | 1 | Ca Interference | White ppt. formed | $CaSO_3$ |
| Sodium Thiosulfate, $Na_2S_2O_3$, A | 2000 | 270 | 5.79 | 0 | 2 | 1.78 | — | — |
| Sodium Thiosulfate, $Na_2S_2O_3$, B | 2000 | 255 | 5.79 | 0 | 2 | 1.78 | — | — |
| Iron (II) Sulfate, $FeSO_4$, A | 2000 | 446 | 2.52 | 0 | 2 | 1.95 | Beige ppt. formed | $CaSO_4$ |
| Iron (II) Sulfate, $FeSO_4$, B | 2000 | 444 | 2.52 | 0 | 2 | 1.95 | Beige ppt. formed | $CaSO_4$ |
| Control Stock Solution 1 | — | — | — | 1008 | — | — | — | — |
| Phosphorous Acid, $H_3PO_3$, A | 1000 | 510 | 2.03 | 1008 | 1 | No reaction with persulfate | — | — |
| Phosphorous Acid, $H_3PO_3$, B | 1000 | 504 | 2.04 | 1008 | 1 | No reaction with persulfate | — | — |
| Sodium Hydrosulfide, NaHS, A | 1000 | −359 | 7.02 | 0 | 1 | 3.82 | White ppt. formed | S and $CaSO_4$ |
| Sodium Hydrosulfide, NaHS, B | 1000 | −359 | 6.96 | 0 | 1 | 3.82 | White ppt. formed | S and $CaSO_4$ |
| Ferrous Ammonium Sulfate, $Fe(NH_4)_2(SO_4)_2$, A | 2000 | 433 | 2.60 | 0 | 2 | 1.96 | Beige ppt. formed | $CaSO_4$ |
| Ferrous Ammonium Sulfate, $Fe(NH_4)_2(SO_4)_2$, B | 2000 | 432 | 2.60 | 0 | 2 | 1.96 | Beige ppt. formed | $CaSO_4$ |
| Control Stock Solution 1 Post | — | — | — | 1008 | — | — | — | — |
| Control Stock Solution 2 | — | 464 | 5.17 | 1032 | — | — | — | — |
| Sodium Thiosulfate, $Na_2S_2O_3$, A | 2000 | 271 | 5.70 | 0 | 2 | 1.78 | — | — |
| Sodium Thiosulfate, $Na_2S_2O_3$, B | 2000 | 281 | 5.56 | 0 | 2 | 1.78 | — | — |
| Iron (II) Sulfate, $FeSO_4$, A | 1000 | 484 | 2.47 | 0 | 2 | 2.00 | — | — |
| Iron (II) Sulfate, $FeSO_4$, B | 1000 | 483 | 2.46 | 0 | 2 | 2.00 | — | — |
| Ferrous Ammonium Sulfate, $Fe(NH_4)_2(SO_4)_2$, A | 1000 | 474 | 2.49 | 0 | 2 | 2.00 | — | — |
| Ferrous Ammonium Sulfate, $Fe(NH_4)_2(SO_4)_2$, B | 1000 | 474 | 2.49 | 0 | 2 | 2.00 | — | — |
| Sodium Hydrosulfide, NaHS, A | 1000 | −373 | 6.86 | 0 | — | — | — | — |
| Sodium Hydrosulfide, NaHS, B | 882 | −352 | 6.83 | 0 | — | — | — | — |
| Control Stock Solution 2 Post | — | — | — | 1032 | — | — | — | — |
| Control Stock Solution 3 | — | 547 | 4.87 | 1056 | — | — | — | — |
| Hydroxylamine Hydrochloride, $NH_2OH \cdot HCl$, A | 724 | 337 | 3.57 | 744[1] | 2 | 1.87 | — | — |
| Control Stock Solution 4[2] | — | — | — | 1032 | — | — | — | — |
| Hypophosphorous Acid, $H_3PO_2$, A | 344 | — | — | 1008[3] | 1 | Ca Interference | — | — |
| Hypophosphorous Acid, $H_3PO_2$, B | 344 | — | — | 1008[3] | 1 | Ca Interference | — | — |
| Hypophosphorous Acid, $H_3PO_2$, A | 688 | — | — | 1008 | 1 | Ca Interference | — | — |
| Hypophosphorous Acid, $H_3PO_2$, B | 688 | — | — | 1008 | 1 | Ca Interference | — | — |

[1] It is determined that the chemical reaction between hydroxylamine and persulfate is temperature dependent. At 55° C., the operating temperature of the ART, hydroxylamine is very effective at reacting with persulfate.
[2] The control stock solution to evaluate hypophosphorous acid is prepared using high purity deionized water instead of 10000 ppm chloride (5650 ppm Ca) with 1000 ppm persulfate.
[3] It is determined that the chemical reaction between HPA and persulfate is temperature dependent. At 55° C., the operating temperature of the ART, HPA is very effective at reacting with persulfate in high purity deionized water.

Sodium Thiosulfate:

The concentration of sodium thiosulfate used for evaluation is 2000 ppm. No precipitate is observed after addition of sodium thiosulfate to the stock solution. Also, compared to the control stock solution the ORP decreases (455 to 262 mV, average) and the pH increases (5.28 to 5.79, average) in duplicate test solutions. Sodium thiosulfate does an effective job at reacting with persulfate ions at room temperature. The actual mole ratio of sodium thiosulfate to persulfate ions is about 1.78, which is less than the theoretical mole ratio of 2.0. In some instances, the use of sodium thiosulfate as the reducing agent of the present invention may be weighed against the potential of sodium thiosulfate to inhibit oxidation in a wet scrubber. However, in some instances, it can be desirable to use sodium thiosulfate as the at least one reducing agent of the present invention.

Phosphorous Acid:

The concentration of phosphorous acid used for evaluation is 1000 ppm. No precipitate is observed after addition of phosphorous acid to the stock solution. Also, compared to the control stock solution, the ORP increases (455 to 507 mV, average) and the pH decreases (5.28 to 2.04, average) in the duplicate test solutions. Phosphorus acid does not react with persulfate ions at room temperature and requires the use of a catalyst such as iodine. In some instances it may be possible that the phosphorus acid will react with any soluble calcium present in the slurry and/or solution of the ART. Accordingly, phosphorus acid as the reducing agent of the present invention may need, in certain circumstances, to be utilized at a higher concentration to counteract the presence of any calcium ions in solution in the slurry and/or solution of the ART.

Figure 6:
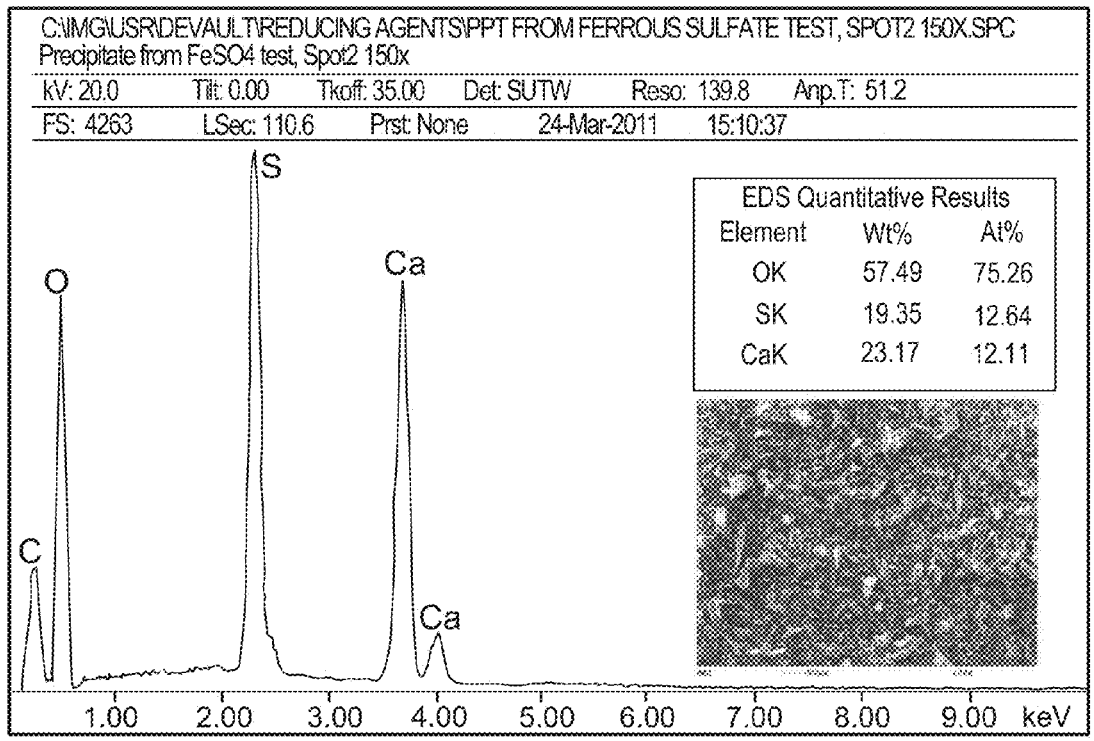
FIG. 6 is an SEM analysis at 150× and an EDS analysis of the precipitate formed using an iron (II) sulfate solution.
Figure 7:
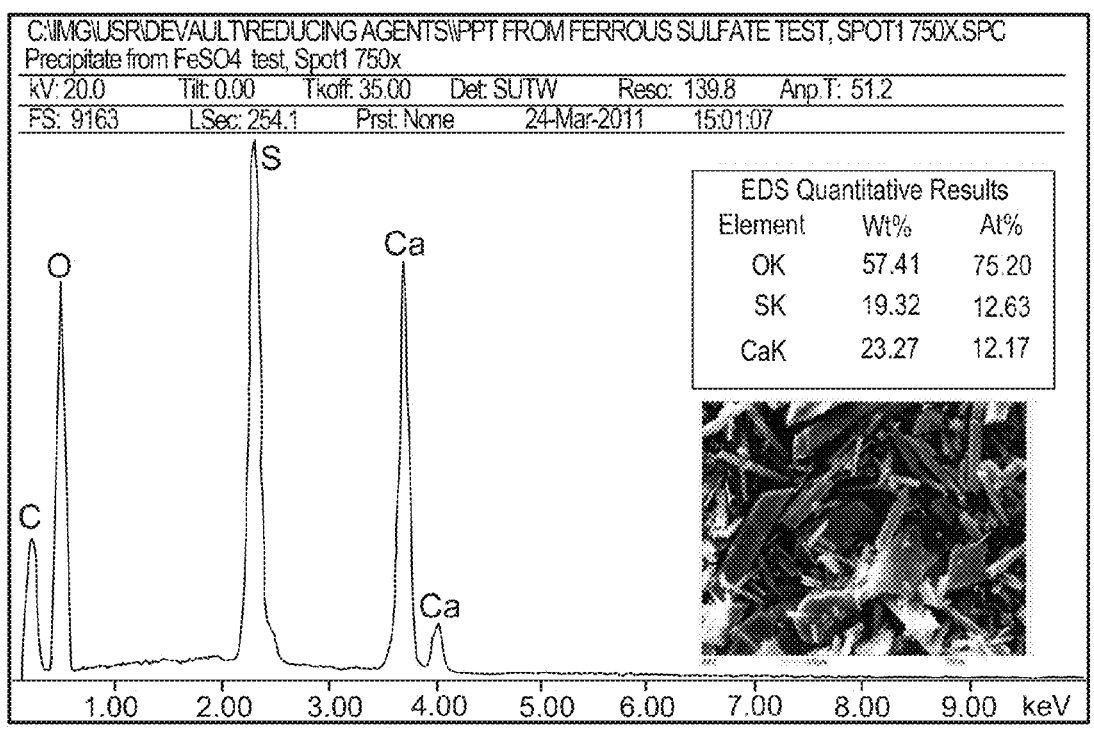
FIG. 7 is an SEM analysis at 750× and an EDS analysis of the precipitate formed using an iron (II) sulfate solution.

Iron (II) Sulfate:

Two concentrations, 1000 and 2000 ppm, of iron (II) sulfate are used for evaluation. No precipitate is observed after addition of iron (II) sulfate to the stock solution at 1000 ppm, but at 2000 ppm an immediate precipitate is observed. A portion of the precipitate is isolated for SEM/EDS analysis (see FIGS. 6 and 7). The crystals formed appear to be gypsum crystals (see FIG. 7). The elemental composition obtained by EDS supports the idea that the precipitate is $CaSO_4 \cdot 2H_2O$. Iron (II) sulfate does an effective job at reacting with persulfate ions at room temperature. The actual mole ratios of iron (II) sulfate to persulfate ions using 1000 and 2000 ppm iron (II) are 2.00 and 1.95, respectively. Both of these values are very close to the theoretical mole ratio of 2.0. Compared to the control stock solution the ORP remains fairly constant (455 to 445 mV, average (2000 ppm)-464 to 484 mV, average (1000 ppm)) and the pH decreases (5.28 to 2.52, average (2000 ppm)-5.17 to 2.46, average (1000 ppm)) in the duplicate test solutions. Corrosion studies have shown that the addition of ferric ion ($Fe^{3+}$) to test solutions may lead to an increase in open circuit potentials and the likelihood of accelerated corrosion rates. Also, ORP increases in the test solutions where ferric ion (iron (III) ion) additions are made. While not wishing to be bound to any one theory, this may explain why the ORP does not decrease in the test solutions because ferric ions are being produced. Even though ferrous sulfate is effective at reacting with persulfate ions, such a reducing agent may be undesirable in certain circumstances due to the likelihood of accelerated corrosion rates due to the production of ferric ions.

Iron (II) Ammonium Sulfate:

The results obtained for iron (II) ammonium sulfate (or ferrous ammonium sulfate—$(NH_4)_2Fe(SO_4)_2$ or $Fe(NH_4)_2(SO_4)_2$) are similar to the ferrous sulfate results, and iron (II) ammonium sulfate is used as a control reducing agent for the Redox titration method in this study.

Figure 8:
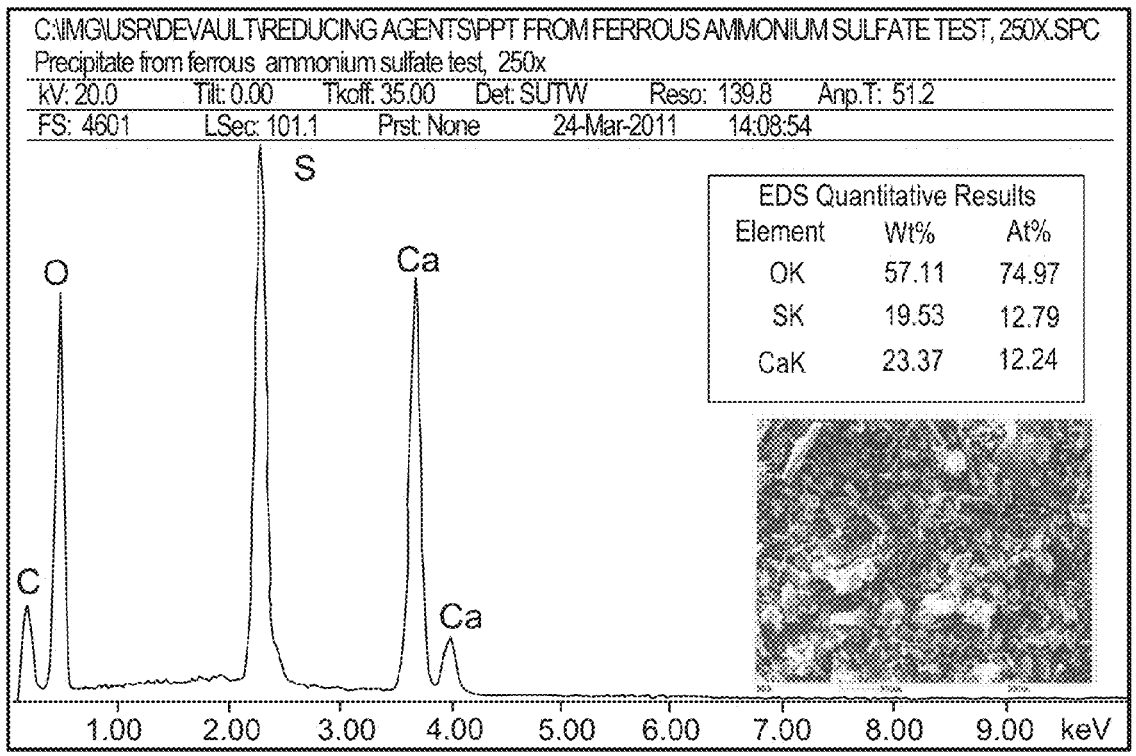
FIG. 8 is an SEM analysis at 250× and an EDS analysis of the precipitate formed using an iron (II) ammonium sulfate solution.
Figure 9:
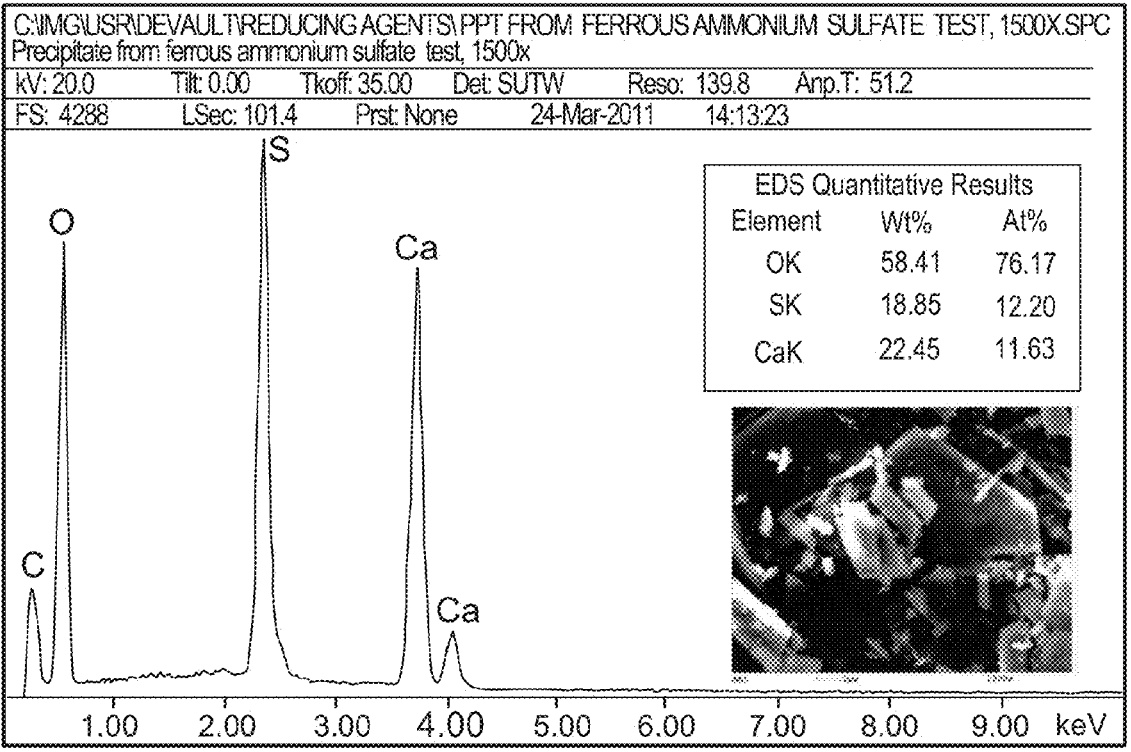
FIG. 9 is an SEM analysis at 1500× and an EDS analysis of the precipitate formed using an iron (II) ammonium sulfate solution.

Two concentrations, 1000 and 2000 ppm, of iron (II) ammonium sulfate (FAS) are used for evaluation. No precipitate is observed after addition of iron (II) ammonium sulfate to the stock solution at 1000 ppm, but at 2000 ppm an immediate precipitate is observed. A portion of the precipitate is isolated for SEM/EDS analysis (see FIGS. 8 and 9). The crystals formed appear to be gypsum crystals (see FIG. 9). The elemental composition obtained by EDS supports the idea that most probably the precipitate is $CaSO_4 \cdot 2H_2O$. Iron (II) ammonium sulfate does an effective job at reacting with persulfate ions at room temperature. The actual mole ratio of iron (II) ammonium sulfate to persulfate ions using 1000 and 2000 ppm iron (II) ammonium sulfate are 2.00 and 1.96, respectively. Both of these values are very close to the theoretical mole ratio of 2.0. Compared to the control stock solution the ORP remains fairly constant (455 to 432 mV, average (2000 ppm)-464 to 474 mV, average (1000 ppm)) and the pH decreases (5.28 to 2.60, average (2000 ppm)-5.17 to 2.49, average (1000 ppm)) in the duplicate test solutions.

Hypophosphorous Acid (HPA):

Two concentrations, 344 and 688 ppm, of HPA are used for evaluation. The concentrations represent one and two moles of HPA to react with one mole of persulfate ions. Initially, a control stock solution is prepared with just 1000 ppm of persulfate ions in highly pure water. No precipitate is observed at either concentration after addition of HPA to this stock solution. ORP and pH are not measured on the test solutions. HPA does not react with persulfate ions at room temperature. However, when Test Samples are heated to 55° C. for 15 hours the persulfate ion concentration decreases to near detection limits for both concentrations of the HPA solutions. Next, the control stock solution is adjusted to include 10000 ppm chloride and 5650 ppm soluble calcium, and an HPA solution at a concentration of 344 ppm is prepared and is heated to 55° C. The after heating test results show the persulfate concentration has been reduced from 912 ppm (control stock solution) to only 540 ppm. It is believed the addition of $CaCl_2$ to the control stock solution, specifically soluble calcium, influences the effectiveness of HPA to react with persulfate ions. Mainly, a portion of the phosphate reacts with the soluble calcium. No precipitate is observed after addition of HPA to this stock solution. Comparison of ORP and pH results show the ORP decreases in the control stock solution from 1069 mV to 830 mV (344 ppm test solution) and the pH from 2.92 to 1.86. It is important to note, as determined herein, that heating persulfate solutions to 55° C. instead of 80° C. does not appreciably destroy the persulfate ions as measured by Redox titration. Due to the fact that soluble calcium appears to be an interfering species and reacts with HPA, HPA may not be as effective if the amount of soluble calcium in the ART slurry and/or solution is high.

Figure 10:
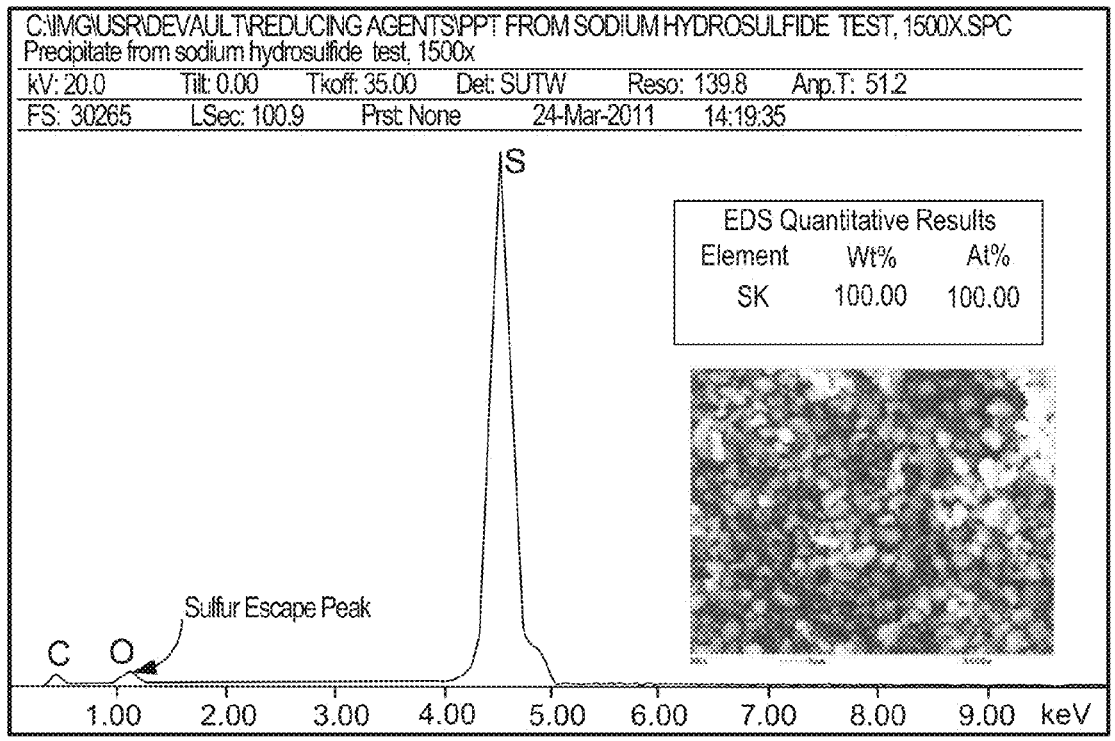
FIG. 10 is an SEM analysis at 1500× and an EDS analysis of the precipitate formed using a sodium hydrosulfide solution.
Figure 11:
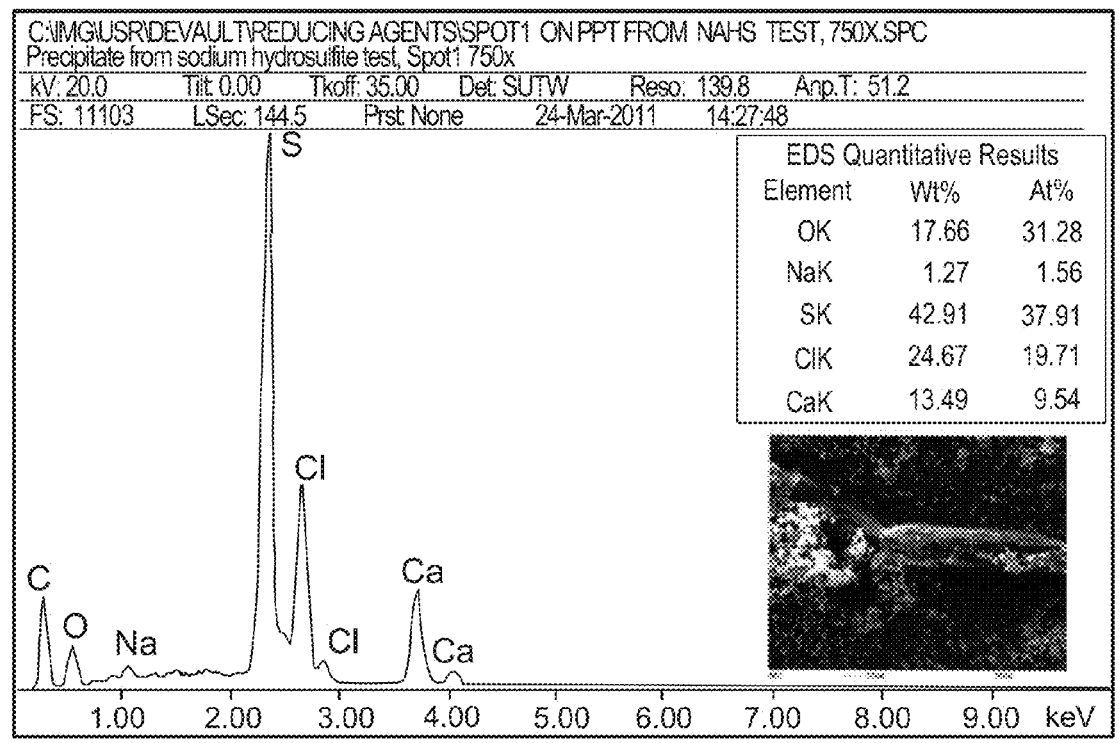
FIG. 11 is an SEM analysis at 750× and an EDS analysis, at Spot 1, of the precipitate formed using a sodium hydrosulfide solution.
Figure 12:
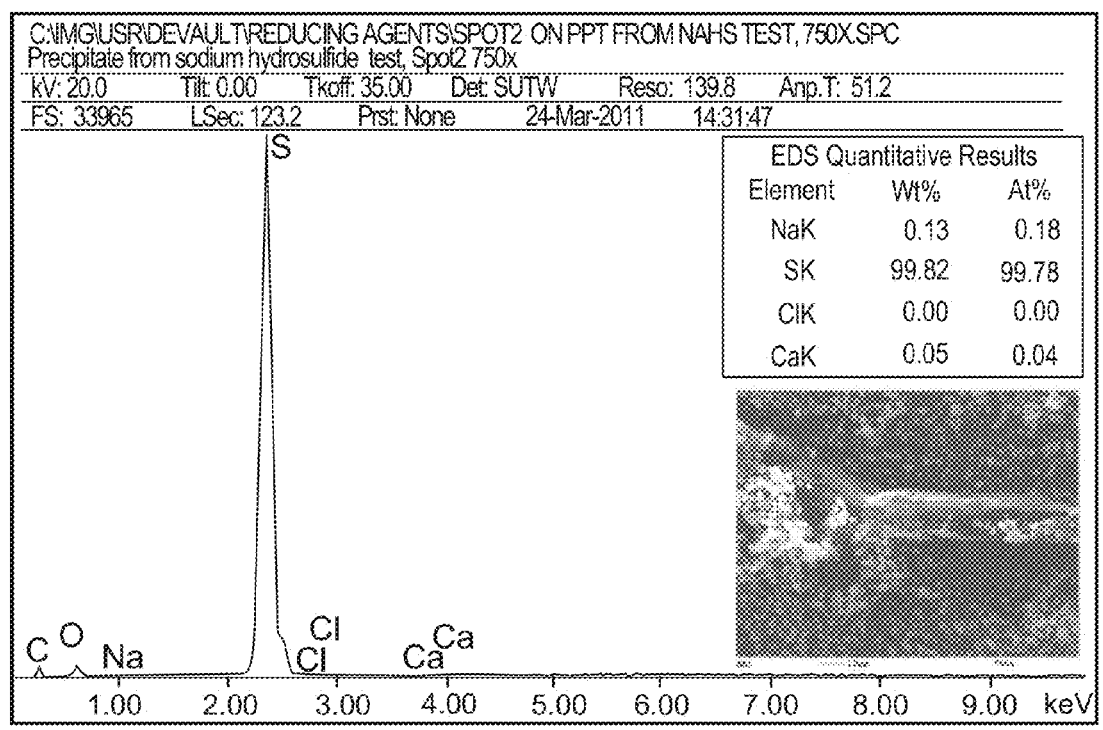
FIG. 12 is an SEM analysis at 750× and an EDS analysis, at Spot 2, of the precipitate formed using a sodium hydrosulfide solution.

Sodium Hydrosulfide:

The concentration of sodium hydrosulfide used for evaluation is 1000 ppm. Upon addition of sodium hydrosulfide to the stock solution a color change occurs from colorless to yellow. Then, after a couple of minutes a yellow precipitate forms. In time, the yellow precipitate changes to a white precipitate. Also, the smell of hydrogen sulfide ($H_2S$) can be sensed emanating from the test solutions. A portion of the white precipitate is isolated for SEM/EDS analysis (see FIGS. 10 through 12). The crystals formed appear to be elemental sulfur crystals (see FIG. 10). The elemental composition obtained by EDS supports the idea that the precipitate is most likely elemental sulfur. Also, in the chemical reaction between sodium hydrosulfide and persulfate ions elemental sulfur is predicted to form as a product. Sodium hydrosulfide does an effective job at reacting with persulfate ions at room temperature. However, the actual mole ratio of sodium hydrosulfide to persulfate ions using 1000 ppm sodium hydrosulfide is 3.82. This value is much higher compared to the theoretical mole ratio of 1.0. While not wishing to be bound to any one theory, one possible reason why the actual mole ratio is much higher than theoretical may be due to interaction of the sodium hydrosulfide with soluble calcium. Compared to the control stock solution the ORP decreases from 455 to −359 mV, average, and the pH increases from 5.28 to 6.98, average, in the duplicate test solutions. Sodium hydrosulfide produces the lowest ORP readings for any of the reducing agents tested, but it is found that the negative mV readings are due to dissolved $H_2S$ remaining in the test solutions. An ORP or millivolt reading became more positive with time as the dissolved $H_2S$ dissipates from the sample, especially, after heating at 55° C., which is the more applicable test environment. The heating results for sodium hydrosulfide are discussed below.

The initial screening results for sodium hydrosulfide shows it reacts with persulfate ions at room temperature but requires approximately four (4) times more reducing agent than is theoretically predicted. Also, a precipitate forms which is determined to be elemental sulfur. Still, sodium hydrosulfide as a reducing agent for use in conjunction with the present invention is advantageous in that it will react with oxidized mercury and precipitate HgS.

Hydroxylamine Hydrochloride (HAH):

The concentration of HAH (or hydroxylammonium chloride) used for evaluation is 724 ppm or 344 ppm as hydroxylamine, which is the chemical form that reacts with persulfate ions. No precipitate is observed after addition of HAH to the stock solution. Compared to the control stock solution the ORP decreases (547 to 337 mV, average) and the pH decreases (4.87 to 3.57, average) in the duplicate test solutions. At room temperature HAH does not react with persulfate ions very well. The measured persulfate concentration decreases from 1056 to 744 ppm. It is determined that the chemical reaction between HAH and persulfate is temperature dependent. At 55° C., the operating temperature of the ART, hydroxylamine is found to be very effective at reacting with persulfate. Based on the heating results the actual mole ratio of HAH to persulfate is 1.87, which is less than the theoretical mole ratio of 2.0. A more detailed discussion of the heating study results for HAH is discussed below.

HAH forms salts with acids, which are named by the analogy to the salts of the parent compound ammonia, "hydroxylammonium salts." HAH is produced by the following reaction:

$$NH_2OH + HCl \rightarrow [NH_3OH]^+Cl^-$$

Since HAH is less basic than ammonia, hydroxylammonium salts have a more strongly acidic reaction in aqueous solution ($pK_a$=5.8) than ammonium salts ($pK_a$=9.25). HAH has a $pK_a$ of 5.8 and can exist in a protonated form ($NH_3OH^+$) below that pH. HAH (oxidation state of nitrogen is −1) has a strong tendency to go to a higher oxidizing state, and therefore acts as a strong reducing agent:

$$2NH_3OH^+ \rightarrow N_2 + 2H_2O + 4H^+ + 2e^- \qquad E = -1.87 \text{ V.}$$

The initial screening results for HAH are favorable when heating the test solutions to 55° C.

Screening of Select Reducing Agents at Ambient and Heated Conditions Using Both Synthetic Test Solution and 2010 Filtrate:

In the next screening test stage ART filtrate preserved from 2010 is used in addition to synthetic stock solution. The concentration of persulfate is measured at just above 1000 ppm in the 2010 ART Filtrate sample. The reducing agents selected for this task are sodium hydrosulfide and HAH because these two compounds are believed to be the most effective at removing a desired amount of persulfate at the lowest possible concentrations, thereby resulting in a lower ORP in the ART without producing any deleterious side effects given the additional known species (e.g., calcium) in the ART filtrate samples. A more detailed analysis is performed looking at the effects of reducing agent concentration and heating on test solution ORP, pH, and persulfate concentration. An additional objective is to observe any noticeable precipitate formation in the filtrate after the addition of each reducing agent.

The procedure for preparing each concentration of reducing agent in either synthetic stock solution or 2010 Filtrate for testing is as follows. Approximately 100 grams of each test solution is prepared. The calculated weight of the reducing agent for a given concentration, and based on a 100 gram total sample, is added first to a tarred 150 mL Pyrex beaker. An analytical balance with a readability of 0.0001 grams is used for weighing each component. It is not practical to weigh out the exact calculated weight of a reducing agent. As a result, when the actual weight is within ±5 percent relative of the calculated weight it is recorded and the amount of either synthetic stock solution or 2010 Filtrate to add is adjusted by proportion accordingly. The tolerance for adding either synthetic stock solution or 2010 Filtrate is ±0.02 grams absolute of the calculated amount. After each test solution is prepared the beaker is covered with a watch glass and placed on a magnetic stirrer for thirty (30) minutes. Following stirring of each beaker, 30 gram aliquots are weighed, to the nearest 0.01 gram, into three separate 40 mL glass VOA vials. Two of the VOA vials are used in the heating study at 55° C. and the other VOA vial is allowed to sit at ambient conditions.

Sample Set A is tested at ambient temperature, and Sample Set B, in duplicate, following heating at 55° C. The ORP, pH, and persulfate concentration are measured on each test solution and reducing agent concentration for both Sample Sets A and B following heating of Sample Set B.

Figure 13:
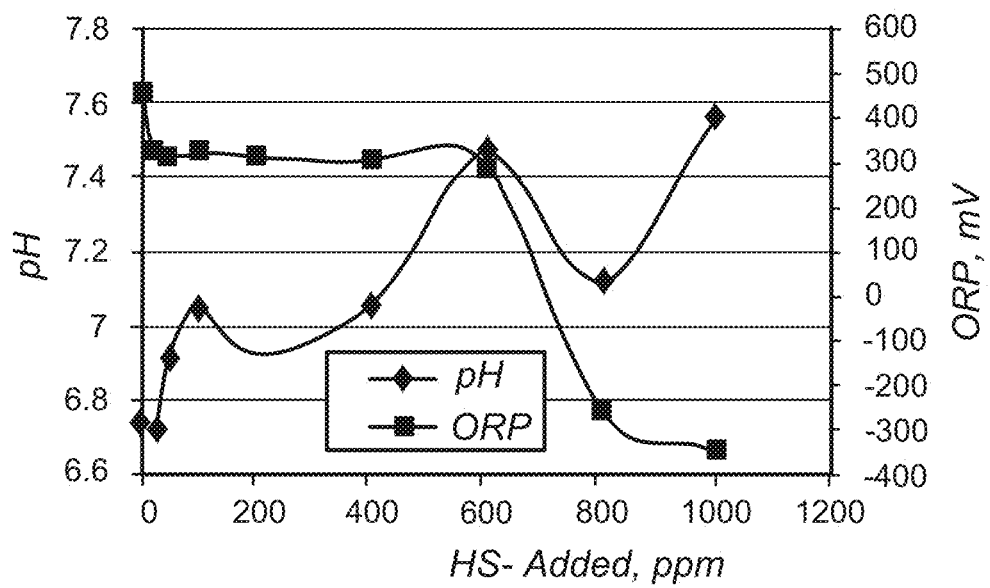
FIG. 13 is a graph illustrating the relationship between the amount of hydrosulfide added versus ORP and pH, 2010 Filtrate—no heating.
Figure 14:
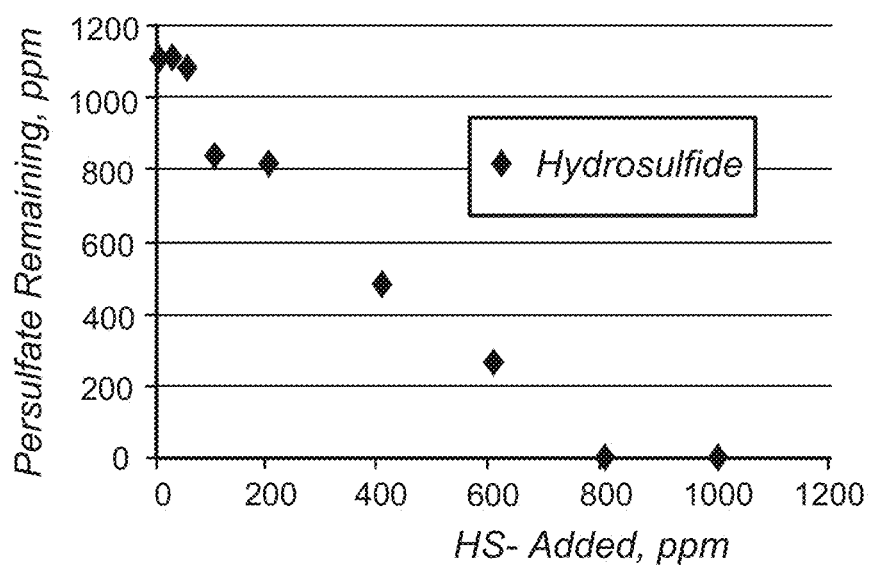
FIG. 14 is a graph illustrating the relationship between the amount of hydrosulfide added versus the concentration of persulfate remaining, 2010 Filtrate—no heating.

Sodium Hydrosulfide—Ambient Conditions:

A total of eight concentrations are tested of sodium hydrosulfide not including the control sample. Sodium hydrosulfide is tested using just 2010 Filtrate sample. The mM concentration of persulfate at 1000 ppm is equal to 5.2 mM. Hydrosulfide ($HS^-$) is the reacting species with persulfate. The chemical reaction between hydrosulfide and persulfate should be a mole ratio of 1.0. From Table 2, 5.2 mM $HS^-$ equates to a concentration of about 170 ppm. This concentration is less than what is necessary to completely react with the initial concentration of persulfate, 1104 ppm, present. A hydrosulfide concentration between 600 ppm to 800 ppm is necessary to completely react with the persulfate at room temperature as shown in FIG. 14. This represents a hydrosulfide to persulfate mole ratio closer to 4.0 and is similar to what is necessary using a synthetic solution. FIG. 13 shows the general trend of pH increasing as the concentration of sodium hydrosulfide is increased. ORP dropped sharply near 600 ppm as $HS^-$. As already discussed, it is believed the reason for negative ORP readings at 800 and 1000 ppm was due to dissolved $H_2S$ still remaining in these test solutions. The overall results show that hydrosulfide does react with persulfate at room temperature.

TABLE 2

| Overnight - No Heating - 2010 Filtrate: | | | | | |
|---|---|---|---|---|---|
| Sodium Hydrosulfide (ppm) | Hydrosulfide (ppm) | Sodium Hydrosulfide (mM) | pH | ORP | Remaining Persulfate (ppm) |
| 0 | 0 | 0.0 | 6.74 | 470 | 1104 |
| 42 | 25 | 0.8 | 6.72 | 310 | 1104 |
| 85 | 50 | 1.5 | 6.92 | 301 | 1080 |
| 170 | 100 | 3.0 | 7.05 | 326 | 840 |
| 340 | 200 | 6.1 | 6.93 | 311 | 816 |
| 680 | 400 | 12.1 | 7.05 | 303 | 480 |
| 1019 | 600 | 18.2 | 7.46 | 291 | 264 |
| 1359 | 800 | 24.2 | 7.12 | −256 | 0 |
| 1699 | 1000 | 30.3 | 7.57 | −340 | 0 |

Figure 15:
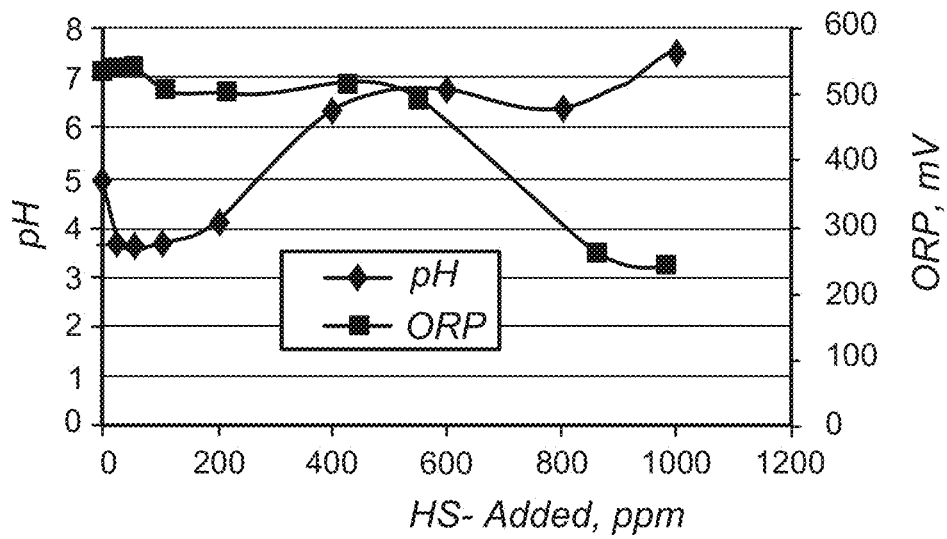
FIG. 15 is a graph illustrating the relationship between the amount of hydrosulfide added versus ORP and pH, 2010 Filtrate—after heating.
Figure 16:
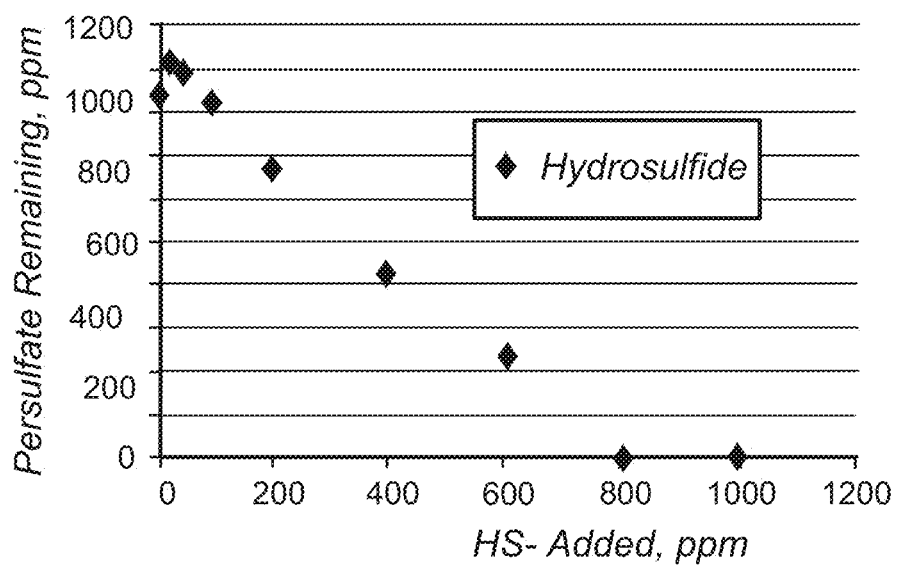
FIG. 16 is a graph illustrating the relationship between the amount of hydrosulfide added versus the concentration of persulfate remaining, 2010 Filtrate—after heating.

Following Heating at 55° C.:

The effect of heating on the Test Samples shows the following: (1) the pH trend is the same as at ambient temperature, pH increasing with increasing hydrosulfide concentration but the overall pH is lower in the heated samples until 1000 ppm $HS^-$ is reached (Table 3 and FIG. 15); (2) similar to the ambient temperature results ORP drops sharply near 600 ppm $HS^-$ as shown in FIG. 15. However, the overall ORP values are higher in the heated samples; and (3) similar to the ambient temperature results a hydrosulfide concentration between 600 to 800 ppm is necessary to completely react with the persulfate as shown in FIG. 16. The persulfate concentration of the control sample drops from 1104 to 840 ppm following heating at 55° C. This shows that persulfate is not completely reacted by heating to a temperature of 55° C. as occurs at 80° C. This is an important point because heating to just 55° C. can still illustrate the effect or contribution of the reducing agent concentration toward the reaction with the persulfate.

TABLE 3

After Heating - 2010 Filtrate

| Sodium Hydrosulfide (ppm) | Hydrosulfide (ppm) | Sodium Hydrosulfide (mM) | pH | ORP | Remaining Persulfate (ppm) |
|---|---|---|---|---|---|
| 0 | 0 | 0.0 | 4.91 | 537 | 840 |
| 42 | 25 | 0.8 | 3.64 | 540 | 912 |
| 85 | 50 | 1.5 | 3.62 | 546 | 900 |
| 170 | 100 | 3.0 | 3.64 | 506 | 828 |
| 340 | 200 | 6.1 | 4.11 | 500 | 660 |
| 680 | 400 | 12.1 | 6.32 | 519 | 432 |
| 1019 | 600 | 18.2 | 6.7 | 494 | 228 |
| 1359 | 800 | 24.2 | 6.34 | 263 | 0 |
| 1699 | 1000 | 30.3 | 7.52 | 241 | 0 |

HAH or Hydroxylammonium Chloride:

A total of seven concentrations of HAH (or hydroxylammonium chloride) are tested not including the control sample. HAH is tested using both synthetic solution and 2010 Filtrate. The mM concentration of persulfate at 1000 ppm is equal to 5.2 mM. While not wishing to be bound to any one theory, it is believed the protonated form of hydroxylamine, $NH_3OH^+$, is the reacting species with persulfate. The chemical reaction between $NH_3OH^+$ and persulfate should be a mole ratio of 2.0.

Figure 17:
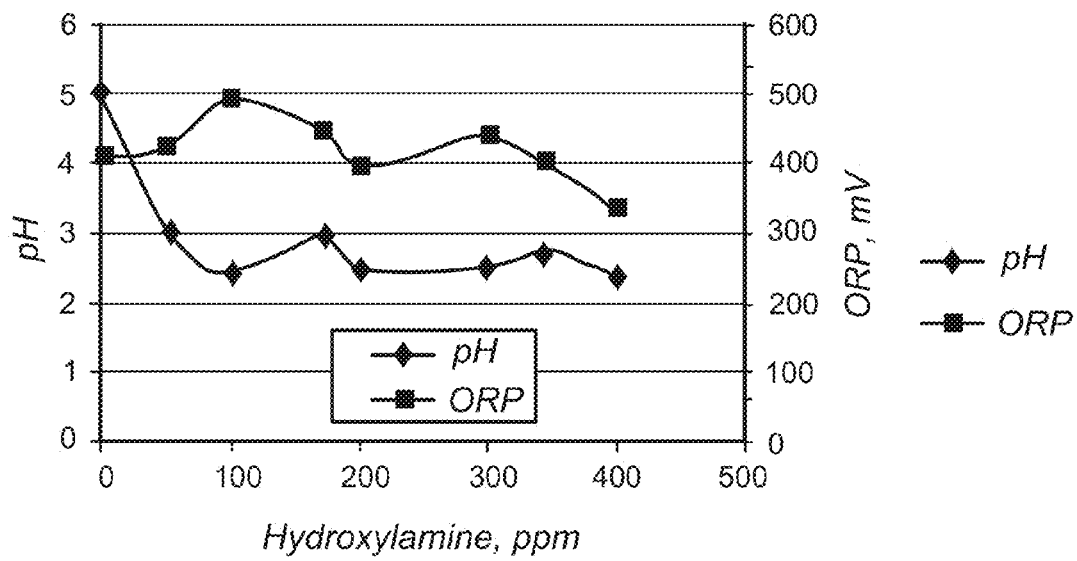
FIG. 17 is a graph illustrating the relationship between the amount of HAH added versus ORP and pH, synthetic, no heating.
Figure 18:
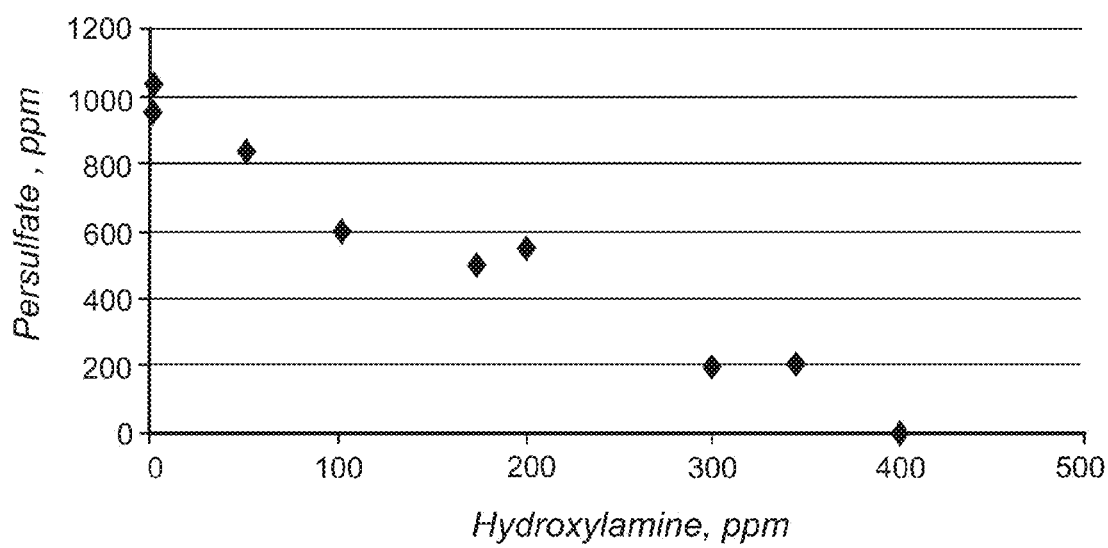
FIG. 18 is a graph illustrating the relationship between the amount of HAH added versus persulfate remaining, synthetic, no heating.

Synthetic Solution—Ambient Conditions:

As can be seen from Table 4, 10.4 mM $NH_3OH^+$ equates to a concentration of about 344 ppm. This concentration is approximately what is necessary to completely react with the initial concentration of persulfate, 1032 ppm, present. A hydroxylamine concentration between 344 to 400 ppm is necessary to completely react with the persulfate at room temperature as shown in FIG. 18. FIG. 17 shows a large decrease in pH after addition of the lowest concentration, 50 ppm of hydroxylamine, followed by a gradual decrease in pH as the concentration of hydroxylamine increases thereafter. The ORP tends to oscillate in the test solutions as the concentration of hydroxylamine increases and reaches a minimum at 400 ppm. The ORP, pH, and persulfate concentration are measured on the synthetic control sample after preparation and at the end of the test period which is approximately 24 hours. The pH decreases slightly in the control sample with time, and the ORP and persulfate concentration decrease. The overall results show that hydroxylamine does react with persulfate at room temperature.

TABLE 4

Overnight - No Heating - Synthetic:

| HAH (ppm) | Hydroxylamine (ppm) | HAH (mM) | pH | ORP (mV) | Remaining Persulfate (ppm) |
|---|---|---|---|---|---|
| S0 | 0 | 0.0 | 5.12 | 565 | 1032 |
| 0 | 0 | 0.0 | 4.99 | 410 | 960 |
| 105 | 50 | 1.5 | 3.02 | 424 | 840 |

TABLE 4-continued

Overnight - No Heating - Synthetic:

| HAH (ppm) | Hydroxylamine (ppm) | HAH (mM) | pH | ORP (mV) | Remaining Persulfate (ppm) |
|---|---|---|---|---|---|
| 211 | 100 | 3.0 | 2.43 | 490 | 600 |
| 362 | 172 | 5.2 | 2.94 | 450 | 504 |
| 421 | 200 | 6.1 | 2.46 | 396 | 552 |
| 632 | 300 | 9.1 | 2.49 | 438 | 192 |
| 724 | 344 | 10.4 | 2.71 | 399 | 216 |
| 842 | 400 | 12.1 | 2.35 | 337 | <50 |

Figure 19:
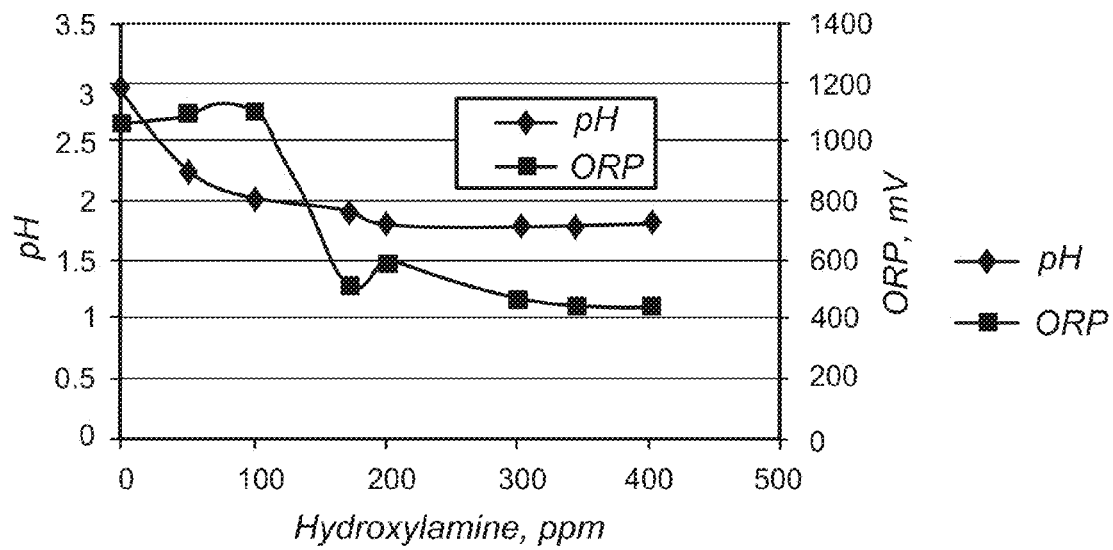
FIG. 19 is a graph illustrating the relationship between the amount of HAH added versus ORP and pH, synthetic, after heating.
Figure 20:
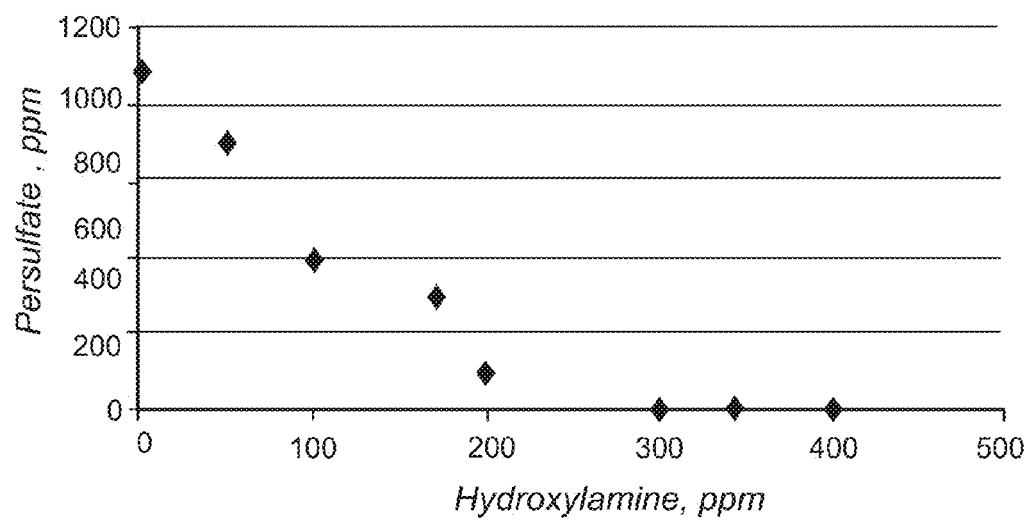
FIG. 20 is a graph illustrating the relationship between the amount of HAH added versus the persulfate remaining, synthetic, after heating.

Synthetic Solution—Following Heating at 55° C.:

The effect of heating on the Test Samples with synthetic solution shows the following: (1) the pH trend is the same as at ambient temperature, pH decreasing with increasing hydroxylamine concentration, but the overall pH values are lower in the heated samples (Table 5 and FIG. 19); (2) unlike the ambient temperature results, here ORP drops sharply between 100 to 172 ppm as hydroxylamine (or HAH) concentration increases as shown in FIG. 17. However, the overall ORP values between 300 to 400 ppm as hydroxylamine (HAH) increases are similar to ambient temperature results. There is a more significant decrease in ORP comparing the control sample (1070 mV) to the Test Samples with hydroxylamine (HAH) concentrations above 300 ppm (less than 470 mV) with heating; and (3) heating enhances the effectiveness of hydroxylamine to react with persulfate. A lower concentration of hydroxylamine (HAH) is necessary to completely react with the same starting concentration of persulfate with heating. A hydroxylamine (HAH) concentration between 200 to 300 ppm is necessary with heating as shown in FIG. 20 compared to 344 to 400 ppm at ambient temperature. However, just with heating, the persulfate concentration in the control sample decreases from 1070 to 888 ppm and may account for some of the observed difference.

TABLE 5

After Heating - Synthetic:

| HAH (ppm) | Hydroxylamine (ppm) | HAH (mM) | pH | ORP (mV) | Remaining Persulfate (ppm) |
|---|---|---|---|---|---|
| 0 | 0 | 0.0 | 2.96 | 1070 | 888 |
| 105 | 50 | 1.5 | 2.26 | 1096 | 696 |
| 211 | 100 | 3.0 | 2.03 | 1104 | 384 |
| 362 | 172 | 5.2 | 1.92 | 515 | 288 |
| 421 | 200 | 6.1 | 1.82 | 591 | 96 |
| 632 | 300 | 9.1 | 1.8 | 470 | <50 |
| 724 | 344 | 10.4 | 1.78 | 444 | <50 |
| 842 | 400 | 12.1 | 1.82 | 429 | <50 |

Figure 21:
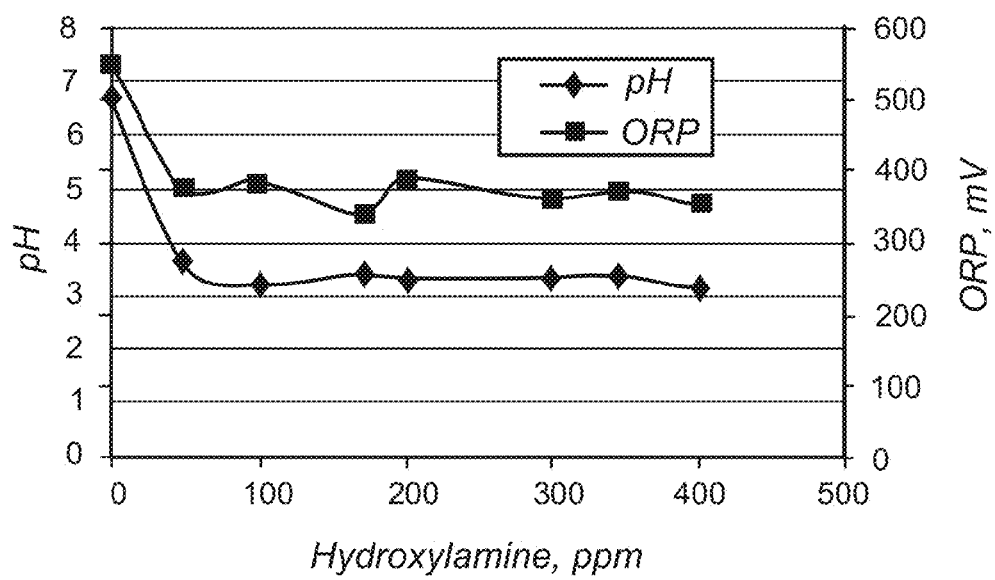
FIG. 21 is a graph illustrating the relationship between the amount of HAH added versus ORP and pH, 2010 Filtrate, no heating.
Figure 22:
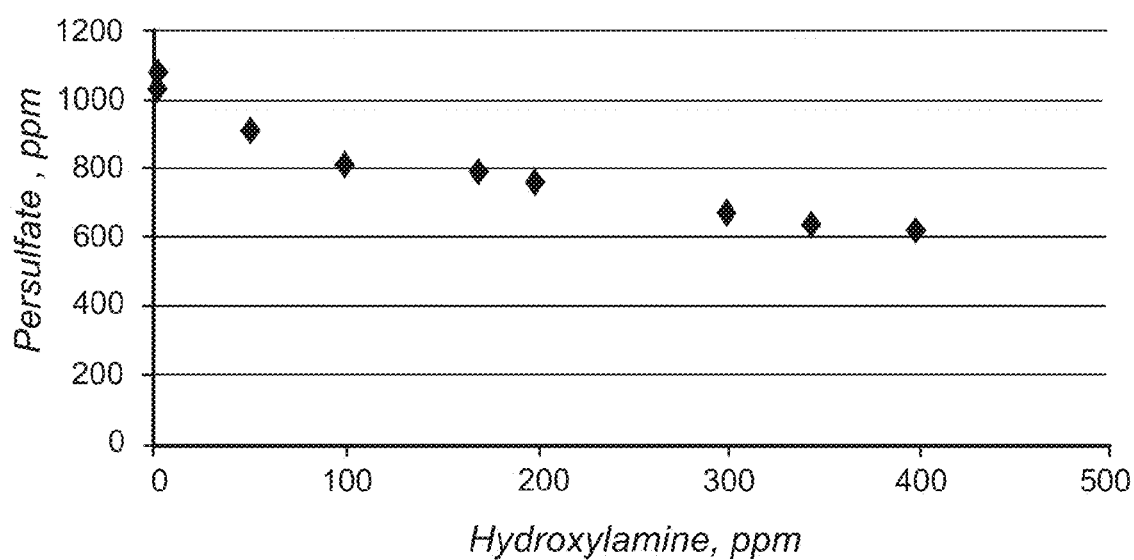
FIG. 22 is a graph illustrating the relationship between the amount of HAH added versus ORP and pH, 2010 Filtrate, no heating.

2010 Filtrate—Ambient Conditions:

From Table 6, 10.4 mM $NH_3OH^+$ equates to a concentration of approximately 344 ppm. This concentration is near to what should be necessary to completely react with the initial concentration of persulfate, 1080 ppm, measured in the 2010 Filtrate. However, at ambient temperature HAH is not effective at reacting with the persulfate contained in the 2010 Filtrate. In fact, more than half of the starting persulfate concentration remains after reaction with an HAH concentration of 400 ppm as shown in FIG. 22. Certainly, the chemistry of 2010 Filtrate is much more complex than the synthetic solution, and has an effect on the HAH/persulfate redox reaction. FIG. 21 shows a large decrease in pH after addition of the lowest concentration, 50 ppm of HAH, followed by a leveling off in pH as the concentration of hydroxylamine increases thereafter. A similar trend is found in the measured ORP of these Test Samples. The ORP, pH, and persulfate concentration are measured in the 2010 Filtrate control sample at the beginning and end of the test period which is approximately 24 hours. The pH and ORP increases slightly in the control sample with time and persulfate concentration decreases. The overall results show that HAH is not as effective reacting with persulfate at room temperature using 2010 Filtrate compared to the synthetic solution.

TABLE 6

Overnight - No Heating - 2010 Filtrate:

| HAH (ppm) | Hydroxylamine (ppm) | HAH (mM) | pH | ORP (mV) | Remaining Persulfate (ppm) |
|---|---|---|---|---|---|
| S0 | 0 | 0.0 | 6.7 | 517 | 1080 |
| 0 | 0 | 0.0 | 6.78 | 548 | 1032 |
| 105 | 50 | 1.5 | 3.62 | 375 | 912 |
| 211 | 100 | 3.0 | 3.18 | 382 | 816 |
| 362 | 172 | 5.2 | 3.41 | 340 | 792 |
| 421 | 200 | 6.1 | 3.33 | 387 | 768 |
| 632 | 300 | 9.1 | 3.37 | 360 | 672 |
| 724 | 344 | 10.4 | 3.34 | 371 | 648 |
| 842 | 400 | 12.1 | 3.17 | 352 | 624 |

Figure 23:
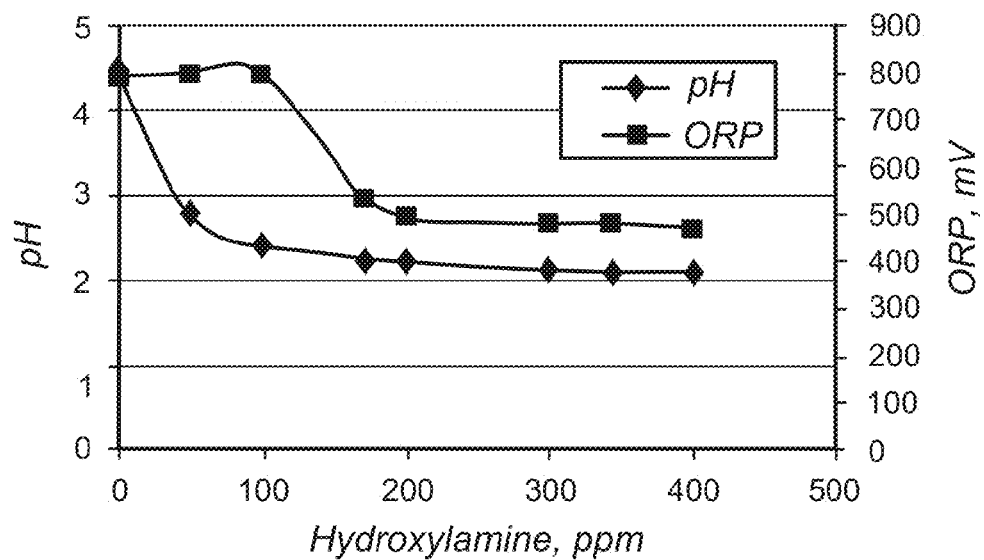
FIG. 23 is a graph illustrating the relationship between the amount of HAH added versus ORP and pH, 2010 Filtrate, after heating.
Figure 24:
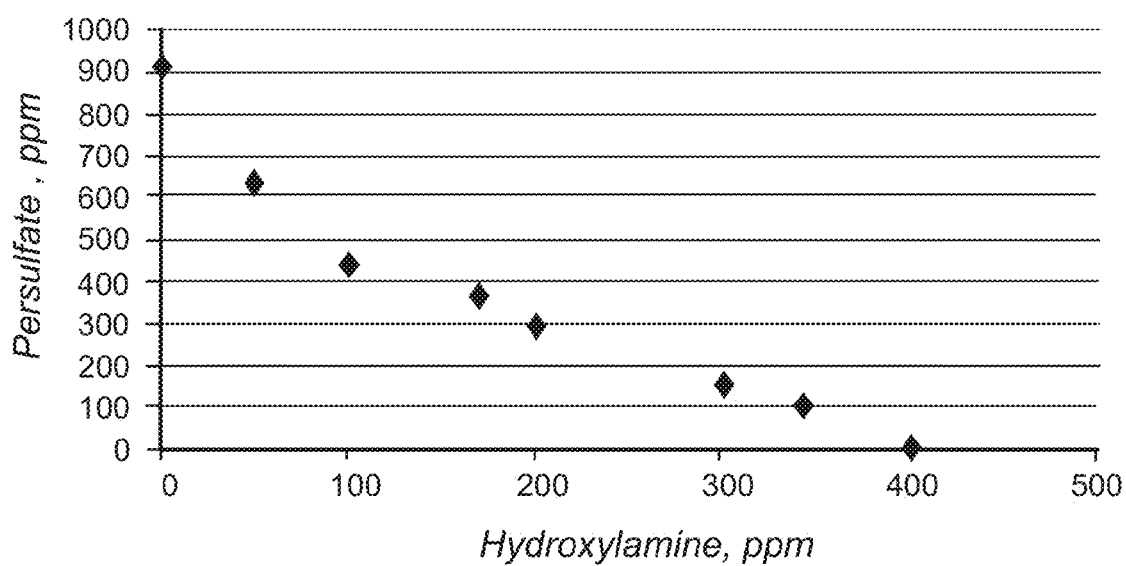
FIG. 24 is a graph illustrating the relationship between the amount of HAH added versus persulfate remaining, 2010 Filtrate, after heating.
Figure 25:
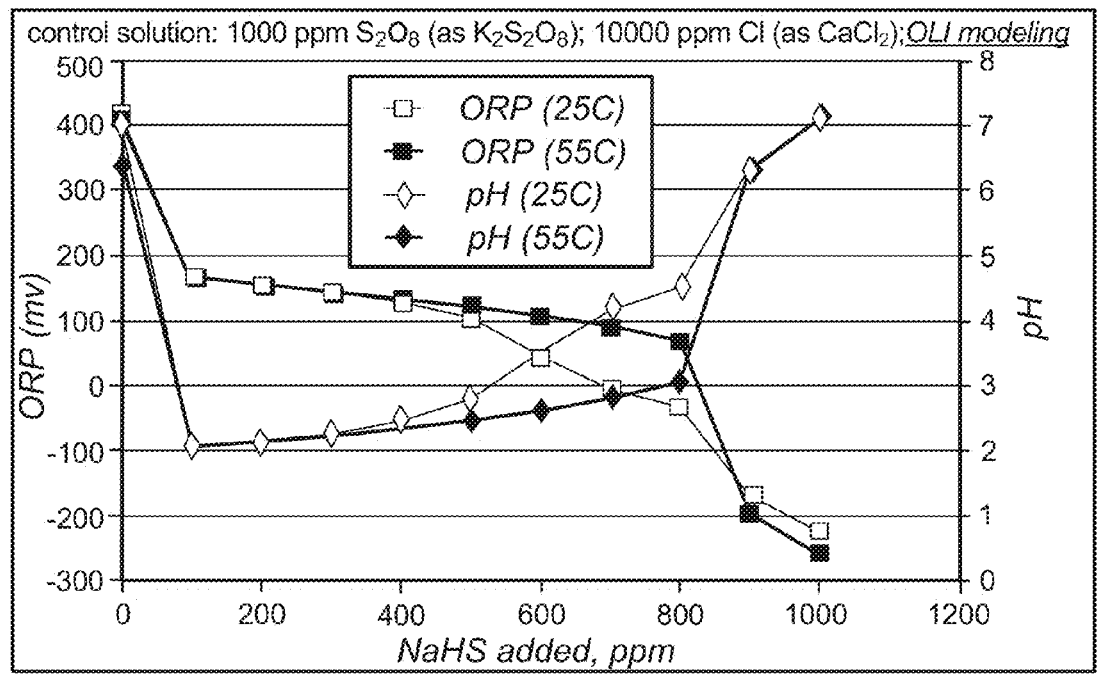
FIG. 25 is a graph illustrating various plots of ORP versus NaHS added.
Figure 26:
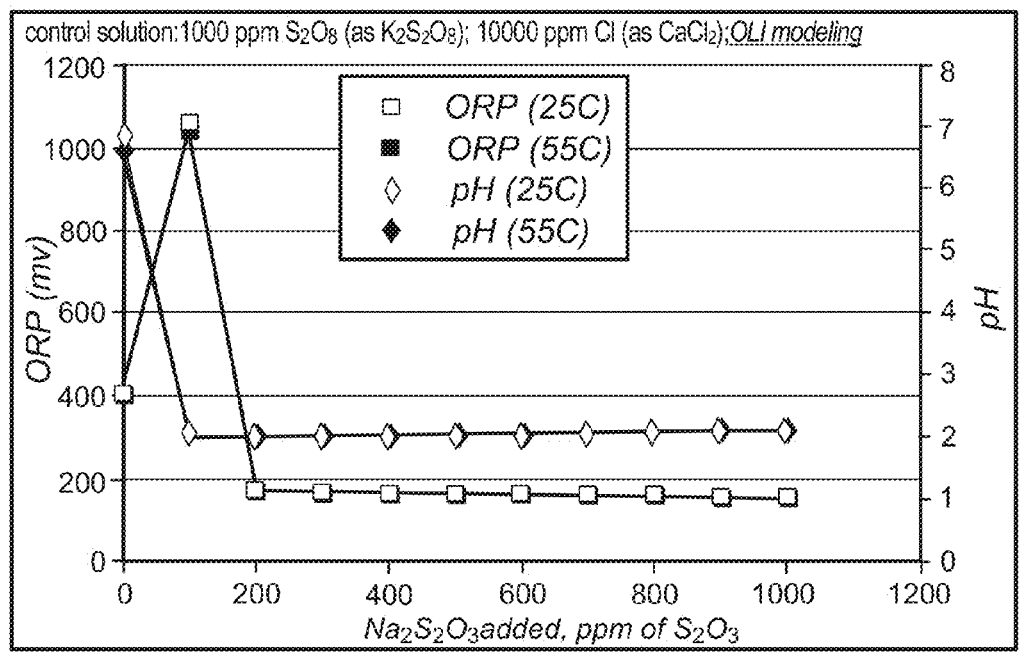
FIG. 26 is a graph illustrating various plots of ORP versus $Na_2S_2O_3$ added based on ppm of $S_2O_3^{2-}$.
Figure 27:
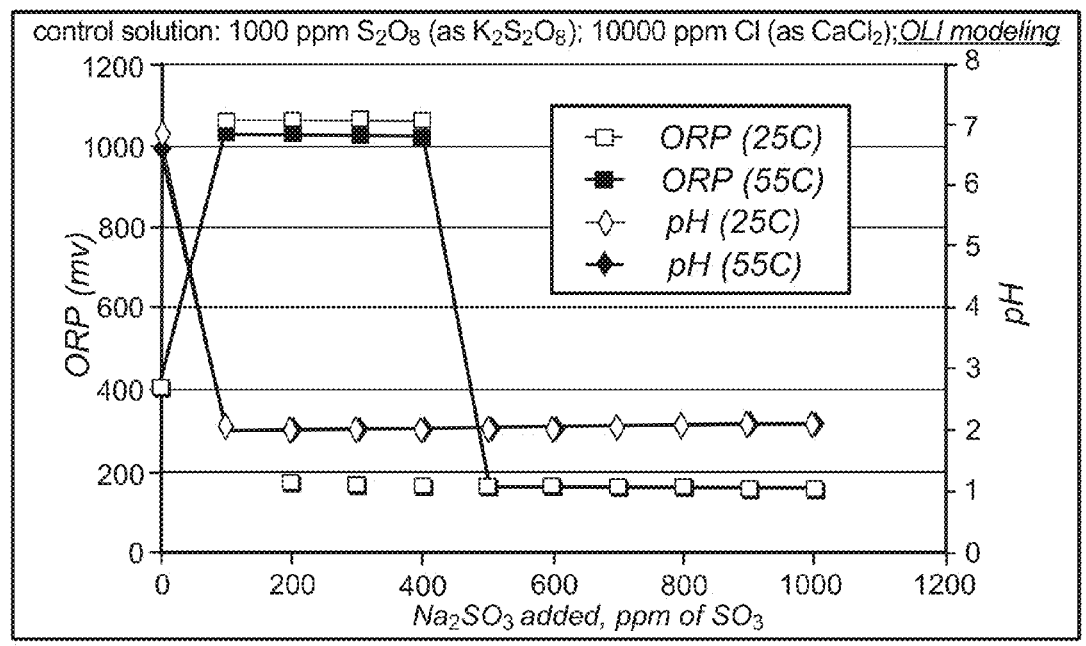
FIG. 27 is a graph illustrating various plots of ORP versus $Na_2SO_3$ added based on ppm of $SO_3^{2-}$.
Figure 28:
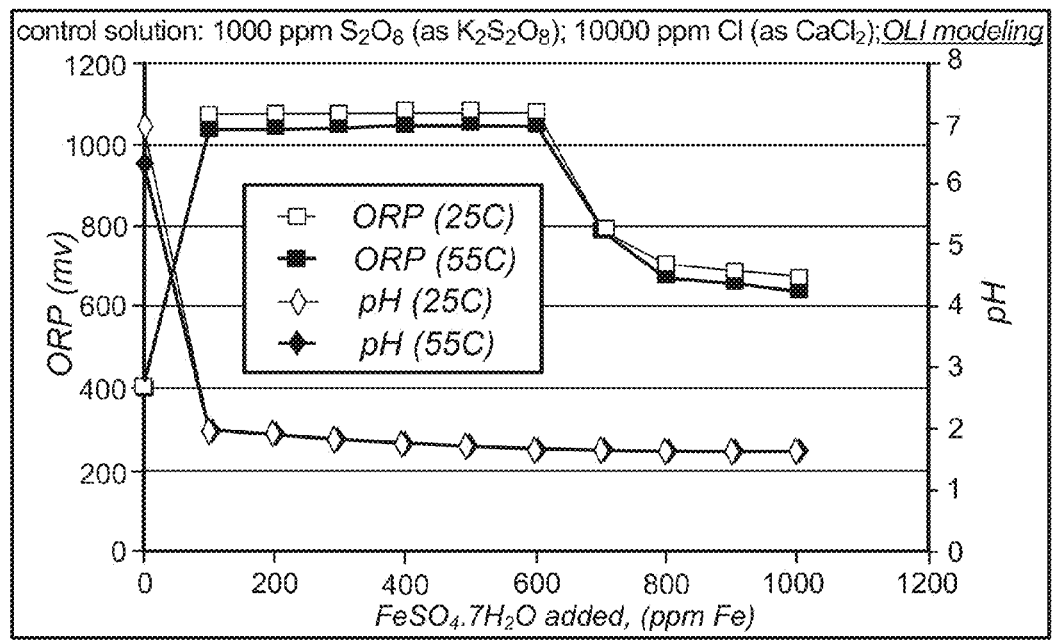
FIG. 28 is a graph illustrating various plots of ORP versus $FeSO_4 \cdot 7H_2O$ added based on ppm of Fe.
Figure 29:
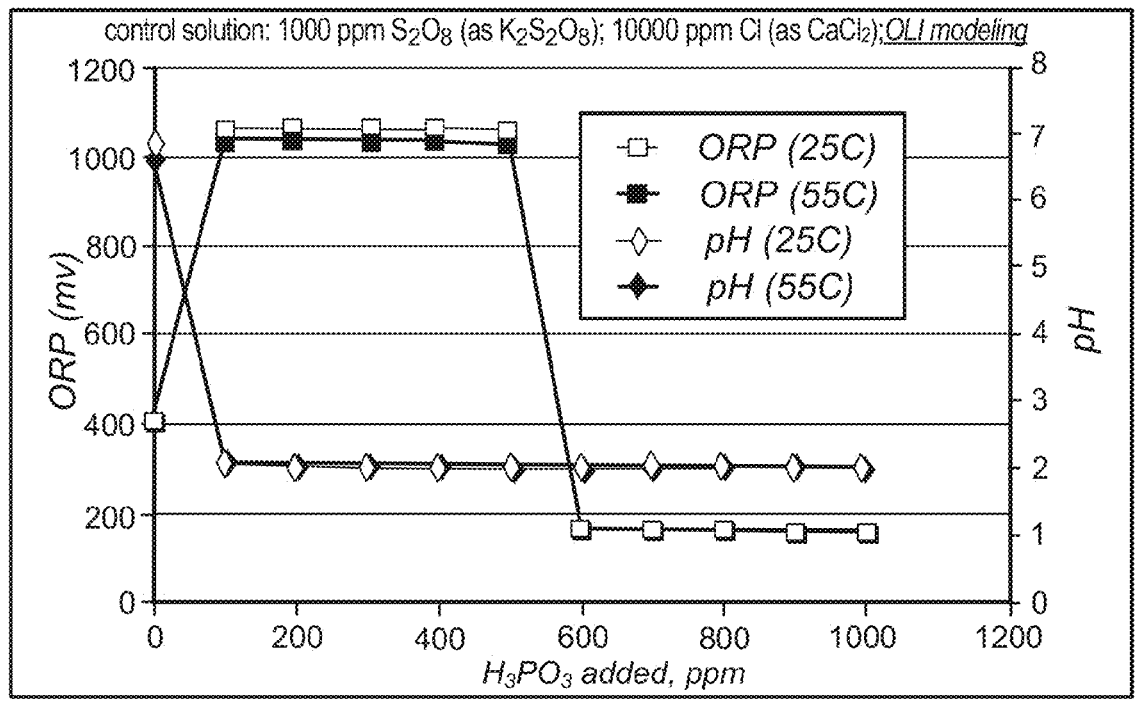
FIG. 29 is a graph illustrating various plots of ORP versus $H_3PO_3$ added.
Figure 30:
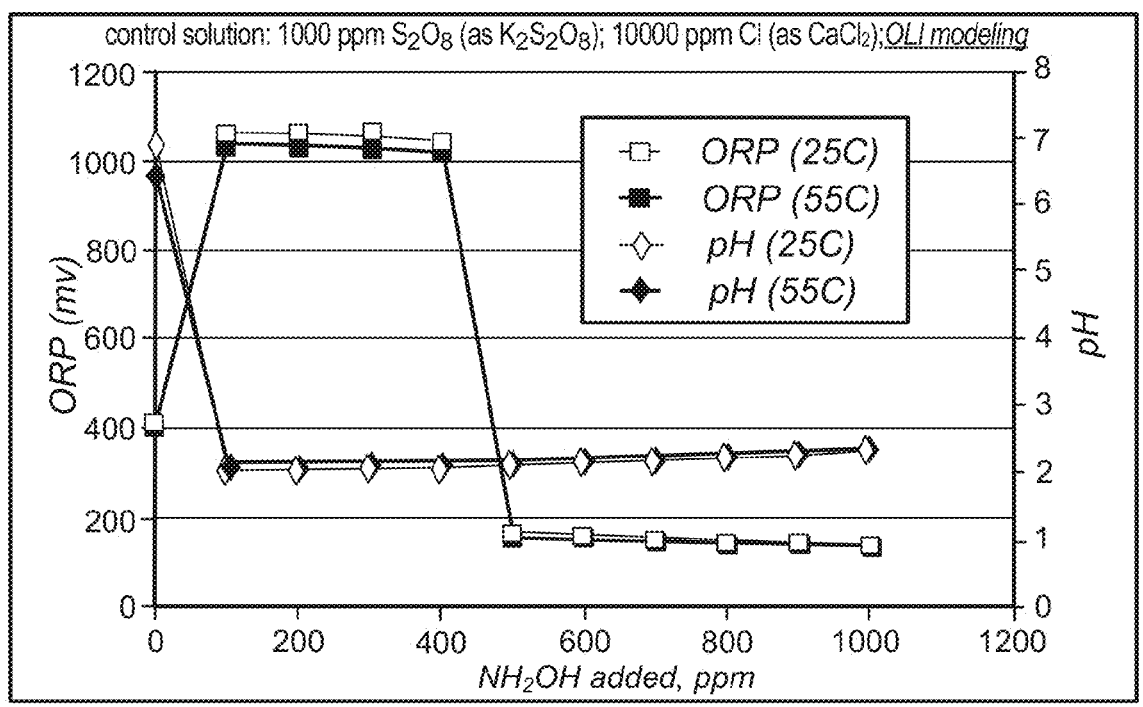
FIG. 30 is a graph illustrating various plots of ORP versus $NH_2OH$ added.

2010 Filtrate—Following Heating at 55° C.:

The effect of heating on the Test Samples using 2010 Filtrate shows the following: (1) the pH trend is the same as at ambient temperature, pH decreases with increasing HAH concentration, but the overall pH is lower in the heated samples (Table 7 and FIG. 23); (2) unlike the ambient temperature results, here ORP drops sharply between 100 to 172 ppm of HAH and then levels off at the higher concentrations as shown in FIG. 23. The overall ORP values are higher for the heated samples compared to the ambient temperature results. There is a more significant decrease in ORP comparing the control sample (790 mV) to the Test Samples with HAH concentrations above 200 ppm (less than 500 mV) with heating; (3) heating enhances the effectiveness of HAH reacting with persulfate. A lower concentration of HAH is necessary to completely react with the same starting concentration of persulfate with heating. A HAH concentration between 344 to 400 ppm is necessary with heating as shown in FIG. 24; and (4) a higher concentration of HAH is necessary to react with a similar starting persulfate concentration (1080 versus 1032 ppm) using 2010 Filtrate versus a synthetic solution.

TABLE 7

After Heating - 2010 Filtrate:

| HAH (ppm) | Hydroxylamine (ppm) | HAH (mM) | pH | ORP (mV) | Remaining Persulfate (ppm) |
|---|---|---|---|---|---|
| 0 | 0 | 0.0 | 4.48 | 790 | 912 |
| 105 | 50 | 1.5 | 2.78 | 800 | 636 |
| 211 | 100 | 3.0 | 2.41 | 798 | 444 |
| 362 | 172 | 5.2 | 2.27 | 534 | 360 |
| 421 | 200 | 6.1 | 2.22 | 498 | 288 |
| 632 | 300 | 9.1 | 2.12 | 484 | 156 |
| 724 | 344 | 10.4 | 2.09 | 482 | 108 |
| 842 | 400 | 12.1 | 2.08 | 470 | <50 |

Electrolyte Equilibrium Modeling (OLI)—Test Matrix for Initial Screening of Reducing Agents Using Synthetic Solution:

As a check of the experimental results and for the synthetic solution tests, OLI models for each case are set up and run to theoretically predict the final concentration of each reducing solution. It is estimated that after one-half hour the solution reaches its equilibrium. The OLI modeling is performed at both test temperatures (25° C. and 55° C.). It should be noted that in addition to the final/equilibrium values of ORP, pH, $S_2O_8^{2-}$, all the potential precipitates, ionic/molecular species, and thermodynamic values (enthalpy, entropy, thermal conductivity, ionic strength, etc.) of the final solution are also obtained.

Comparing the ORP and pH versus HAH concentration experimental results (Table 4 and FIG. 17—ambient temperature, Table 5 and FIG. 19—at 55° C.) in the synthetic solution to the predicted OLI results (see below and FIG. 18): (1) the trend of pH and magnitude of the pH values are in close agreement at both test temperatures; (2) ORP results are not in agreement at ambient or 25° C. Experimental results show the ORP oscillates and is only slightly affected by HAH concentration decreasing to a minimum of 337 mV at 400 ppm HAH. OLI results show the ORP increases after addition of HAH to a maximum above 1000 mV at a HAH concentration of 100 ppm. The increase in ORP is due to persulfate activation (free radicals are formed, i.e. $—S_2O_8^{2-}+heat \rightarrow 2SO_4.^-$) when heated, and the concentration of unreacted persulfate is still high. The ORP then levels off between 100 to 400 ppm HAH before decreasing to an ORP value below 200 mV at 500 ppm HAH. The OLI results for ORP are similar at both 25° C. and 55° C.; and (3) the experimental ORP results at 55° C. show a maximum is reached above 1000 mV at a HAH concentration of 100 ppm, and then a decreases to 515 mV at a HAH concentration of 172 ppm before leveling off and reaching a minimum of 429 mV at a HAH concentration of 400 ppm.

Evaluation of Reducing Agents to be Potentially Used in a WFGD Absorber Recirculation Tank (ART) Electrolyte Equilibrium Modeling (OLI) of the Reducing Agents:

As a method to confirm the experimental results and for the synthetic solution (the control solution: 10000 ppm Cl⁻ and 1,000 ppm $S_2O_8^{2-}$), OLI models are set up for each case and run to theoretically predict the final concentration, pH, and ORP of each reducing solution. $CaCl_2$ and $K_2S_2O_8$ are used as the sources of Cl⁻ and $S_2O_8^{2-}$, respectively (OLI thermodynamic data base does not contain $Na_2S_2O_8$). The OLI modeling is performed at two temperatures (25° C. and 55° C.) and over a range of reducing agent concentrations (reducing agent/$S_2O_8^{2-}$ ratio of 0 to 1). It should be noted that in addition to the final/equilibrium values of ORP, pH, $S_2O_8^{2-}$, all the potential precipitates, ionic/molecular species, and thermodynamic values (enthalpy, entropy, thermal conductivity, ionic strength, etc.) of the final solution are also obtained.

Results of the OLI modeling are presented in Table 8 (precipitated species) and FIGS. 25 through 30 (pH and ORP). It should be noted that for all cases, no $S_2O_8^{2-}$ is observed in the final equilibrated solution. Based on the ORP results, NaHS seems to be the most effective reducing agent in lowering and/or controlling the ORP. Lower than 1000 ppm of NaHS (NaHS/$S_2O_8^{2-}$ ratio of 1) can be used to decrease the ORP of the control solution to even negative millivolt values. Except for NaHS, the temperature of the solution did not have a significant impact on the ORP or the pH of the final solution. Most of the precipitated species are considered acceptable and are naturally encountered during baseline operation of the WFGD (except for $Fe_2O_3$ for the iron reducing agent). HAH may also be a desirable reducing agent since its addition resulted in the precipitation of gypsum only. Based on these results, it is believed that the addition of, at a minimum, NaHS to the absorber tank or ART can be effective in reducing the ORP. One advantage of NaHS is that it can help in reducing Hg re-emission if added to the recirculation pump. The challenge in addition of NaHS to the ART lies in obtaining a uniform distribution of NaHS in the tank. NaHS needs to reach the oxidizing agent ($S_2O_8^{2-}$) in the ART as soon as possible and as uniformly as possible. It should be noted that NaHS active agent is $H_2S$ (or $HS^-$ ion). Conceivably, $H_2S$ can be added to the ART oxidation air for a uniform distribution.

TABLE 8

Precipitated Species as the Result of Adding Reducing Agents to the Control Solution

| Reducing Agent | 25° C. | 55° C. |
|---|---|---|
| NaHS | Gypsum, $S_8$(100-800 ppm NaHS) | Gypsum, $S_8$(400-800 ppm NaHS) |
| $Na_2S_2O_3$ | Gypsum, $S_8$(300-1000 ppm $S_2O_3^{2-}$) | Gypsum, $S_8$(600-1000 ppm $S_2O_3^{2-}$) |
| $Na_2SO_3$ | Gypsum, $S_8$(600-1000 ppm $SO_3^{2-}$) | Gypsum |
| $FeSO_4 \cdot 7H_2O$ | Gypsum, $Fe_2O_3$ | Gypsum, $Fe_2O_3$ |
| $H_3PO_3$ | Gypsum, $S_8$(600-1000 ppm $H_3PO_3$) | Gypsum |
| $NH_2OH$ | Gypsum | Gypsum |

Manganese Precipitation:

As discussed above, one approach to minimize formation of $Mn_xO_y$ in a wet scrubber might be to eliminate or minimize the concentration of persulfate (less than about 150 ppm) in a wet scrubber. Also, formation of SN-compounds and SO-acids are competing reactions for available $NO_2$, $Mn^{3+}$, and $Fe^{3+}$ in a wet scrubber. This might help to explain why similar designed wet scrubbers can have vastly different persulfate concentrations depending on the $NO_x$ concentration in the flue gas entering the wet scrubber. This suggests that higher $NO_x$ concentration entering the wet scrubber favors formation of SN-compounds over SO-acids (i.e., persulfate).

Several reducing agents are evaluated above to determine their effectiveness at reacting with persulfate and lowering oxidation-reduction potential (ORP). Another approach, and the one used here, is to select the three reducing agents from the data obtained above and determine their effectiveness at preventing precipitation of manganese. Two test solutions containing persulfate are utilized in the testing, a synthetic solution and 2010 ART Filtrate.

Manganese Spiking Experiments:

Three reducing agents, sodium hydrosulfide (NaHS), sodium thiosulfate ($Na_2S_2O_3$), and HAH ($NH_2OH \cdot HCl$) will be evaluated herein for their effectiveness at preventing precipitation of manganese in two test solutions containing persulfate: (i) a laboratory prepared or synthetic solution; and (ii) 2010 ART Filtrate. Both test solutions contain persulfate at an approximate concentration of 1000 ppm. Two synthetic solutions are prepared with $CaCl_2$ at 10000 ppm chloride (5650 ppm Ca). One of the synthetic solutions has 1000 ppm persulfate ($S_2O_8^{2-}$) and the other contains no persulfate and serves as a control. The sequence of addition is the manganese spike solution, reducing agent and the test solution. The reason for this sequence of addition is to prevent reaction of the test solution, first with either the manganese spike solution or the reducing agent and to determine if the test solution reacted, preferentially, with either the manganese spike solution or the reducing agent. The test concentration of manganese, added as $MnCl_2$, is calculated at 100 ppm, the approximate concentration typically found in ART filtrate samples where manganese precipitation is not occurring.

The concentration of each reducing agent added depends on the amount determined necessary from previous testing to chemically react completely with the concentration of persulfate present, near 1000 ppm, in each test solution. For NaHS the amount added is at a concentration of 24.2 mM. The mM concentration of persulfate at 1000 ppm is equal to 5.2 mM. Hydrosulfide ($HS^-$) is the reacting species with persulfate. Theoretically, the chemical reaction between hydrosulfide and persulfate should be at mole ratio of 1.0, but instead a mole ratio $HS^-/S_2O_8^{2-}$ is necessary between 4 to 5. It is believed the protonated form of hydroxylamine, $NH_3OH^+$, is the reacting species with persulfate. The chemical reaction between $NH_3OH^+$ and persulfate should occur at a mole ratio of 2.0, and requires a 10.4 mM concentration of HAH ($NH_2OH \cdot HCl$). It is found that a 9.1 mM concentration of HAH is necessary for the synthetic solution and a higher 12.1 mM concentration for the 2010 ART Filtrate. Unlike for NaHS and $NH_2OH \cdot HCl$, a detailed study is not performed for $Na_2S_2O_3$ and its reaction with persulfate. The chemical reaction between thiosulfate and persulfate should occur at a mole ratio of 2.0, and requires a 10.4 mM concentration of $Na_2S_2O_3$. This is the concentration of $Na_2S_2O_3$ used in this portion of this specification.

Initially, each 225 gram Test Sample is prepared by first adding the calculated and weighed amounts of manganese spike solution and reducing agent into an individual 250 mL wide mouth Nalgene bottle followed by the appropriate amount and type of test solution. ORP and pH are determined on each of the control test solutions and samples at ambient temperature. After the measurements, two 100 gram split samples of each test solution are transferred into 125 mL clear glass I-Chem bottles. Test Set B is allowed to sit at ambient temperature while Test Set A is heated to 55° C. Following heating at 55° C. for 15 hours, the samples are allowed to cool to room temperature and the ORP and pH are measured on the control and Test Samples for both Test Sets and the results are listed in Table 9. Persulfate concentrations are measured by titration method on the synthetic solution and 2010 ART Filtrate to determine their starting concentrations and on all the Test Samples following heating where persulfate has been added. Each of the control and Test Samples of both Test Sets are filtered through individual 0.45 μm Millipore filters, and the filtrates sent to CTL Group for dissolved manganese analysis using ICP-AES. Each of the filtrate samples is preserved by adjusting to 2 weight percent $HNO_3$. Finally, for the Test Samples that form a precipitate, an SEM/EDS analysis is performed in an attempt to determine the elemental composition of the precipitate collected on each of the Millipore filters.

TABLE 9

Test Results for Effect of Various Reducing Agents on Manganese Precipitation

| Reducing Agent | Test | Unheated | | | | | Heated | | | | |
|---|---|---|---|---|---|---|---|---|---|---|---|
| | | ORP (+mV) | pH | Mn Sol. (ppm) | $S_2O_8^{2-}$ (ppm) | Precipitate | ORP (+mV) | pH | Mn Sol. (ppm) | $S_2O_8^{2-}$ (ppm) | Precipitate |
| Synthetic Solution | | | | | | | | | | | |
| Control w/o Mn | 1 | 600 | 5.18 | 0.18 | 1008 | Y, slight tint | 1029 | 3.25 | <0.0002 | 840 | Y, brown ppt. |
| Control with Mn | 2 | 592 | 5.11 | 107 | — | Y, slight tint | 900 | 2.90 | 83.2 | 888 | Y, dark tint, dark brown & black ppt. |
| Control with Mn w/o $S_2O_8^{2-}$, NaHS | 6 | 210 | 9.78 | 1.01 | — | Y, tint, yellow/brown ppt. | 172 | 7.68 | 9.43 | — | Y, tint, light tan ppt. & brown particles floating |
| Control with Mn w/o $S_2O_8^{2-}$, $Na_2S_2O_3$ | 7 | 222 | 6.62 | 108 | — | N | 188 | 7.30 | 107 | — | N |
| Control with Mn w/o $S_2O_8^{2-}$, $NH_2OH \cdot HCl$ | 8 | 188 | 4.04 | 105 | — | N | 129 | 3.94 | 110 | — | N |
| Control with Mn with $S_2O_8^{2-}$, NaHS | 3 | 373 | 6.14 | 81.2 | — | Y, slight tint, brown ppt. | 702 | 3.91 | 91.9 | <50 | Y, clear, brown ppt. |
| Control with Mn with $S_2O_8^{2-}$, $Na_2S_2O_3$ | 4 | 314 | 4.68 | 108 | — | N | 305 | 2.98 | 110 | <50* | Y, cloudy |
| Control with Mn with $S_2O_8^{2-}$, $NH_2OH \cdot HCl$ | 5 | 495 | 2.35 | 108 | — | N | 503 | 1.82 | 110 | <50 | N |
| 2010 ART Filtrate | | | | | | | | | | | |
| Control w/o Mn | 9 | 335 | 6.76 | <0.0002 | 936 | N | 359 | 5.39 | <0.0002 | 840 | N |
| Control with Mn | 10 | 328 | 6.63 | 108 | — | Y, slight tint, small brown particles | 458 | 3.58 | 79.7 | 816 | Y, dark tint, dark brown & black ppt. |
| NaHS | 11 | 242 | 7.55 | 104 | — | Y, clear, white ppt. & white particles floating | 96 | 7.31 | 109 | 72 | Y, clear, off white ppt. |
| $Na_2S_2O_3$ | 12 | 256 | 6.79 | 105 | — | N | 209 | 5.56 | 107 | <50* | N |
| $NH_2OH \cdot HCl$ | 13 | 420 | 2.94 | — | — | N | 451 | 2.13 | 111 | <50 | N |

*Based on the persulfate titration results the amount of $Na_2S_2O_3$ required to react with the persulfate present in the sample was in excess by 30 to 40%.

Test Sample 1—Control without Mn, without Reducing Agent, 1000 ppm Persulfate Synthetic Solution:

Test Sample 1 is a control sample without the addition of manganese or a reducing agent. Even though certified ACS Grade $CaCl_2 \cdot 2H_2O$ is used to prepare the synthetic solutions, manganese is measured at a concentration of 0.88 ppm in the 10000 ppm chloride stock solution not containing persulfate.

Figure 31:
FIG. 31 is a photo comparing the heated and unheated of Test Sample 1.
Figure 32:
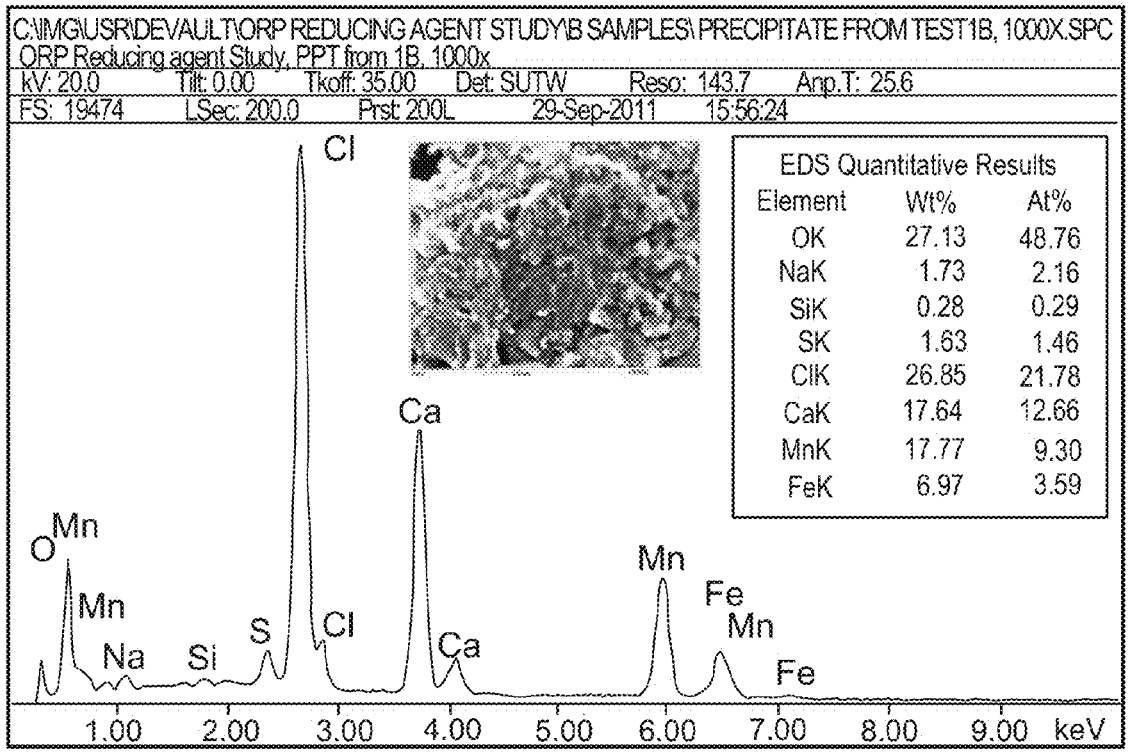
FIG. 32 is an SEM analysis of the unheated precipitate sample of Test Sample 1.

There is a slight tint color to both liquids and a slight tan precipitate formed in the unheated sample. In the heated sample, the precipitate is a dark brown and there appears to be more precipitate as shown in FIG. 31. Here, and in the following photographs, the "A" sample is the heated sample. It is suspected that a small amount of the persulfate reacted with some of the soluble calcium to form $CaSO_4 \cdot 2H_2O$. An SEM/EDS analysis is performed on both the unheated and heated sample precipitates, and shows a small weight percentage of sulfur present (1.63 weight percent unheated versus 1.54 weight percent heated) with excess calcium (see FIG. 32). Also, a small weight percentage of manganese was found in the heated sample precipitate (2.97 weight percent). Consistent with this, soluble manganese is lower in the heated sample (less than 0.0002 (IRL) versus 0.18 ppm). After heating, the ORP of the Test Sample increases from 600 to 1029+mV, and the pH decreases from 5.18 to 3.25. The persulfate concentration in the control Test Sample decreases from 1008 to 840 ppm. These persulfate values are significant for this study because it shows that when the persulfate is heated to 55° C., the approximate temperature of an ART, it slowly decomposes. In earlier tests heating samples with similar persulfate concentrations to 80° C. for fifteen hours decomposes all the persulfate. By heating the test solutions to just 55° C. the effectiveness of the reducing agent to decompose persulfate can also be studied because at 55° C. persulfate decomposition is not influenced as greatly by heating.

Figure 33:
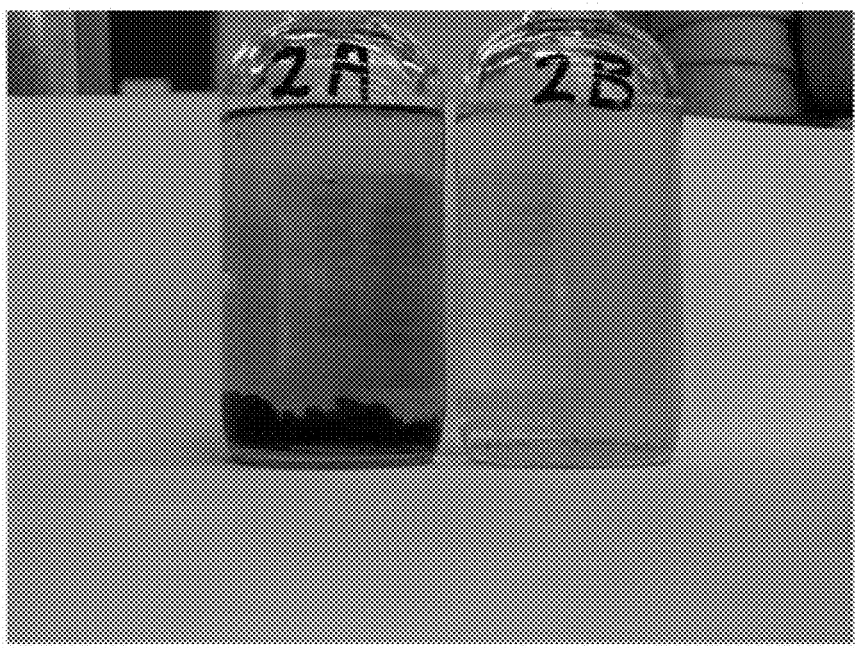
FIG. 33 is a photo comparing the heated and unheated of Test Sample 2.
Figure 34:
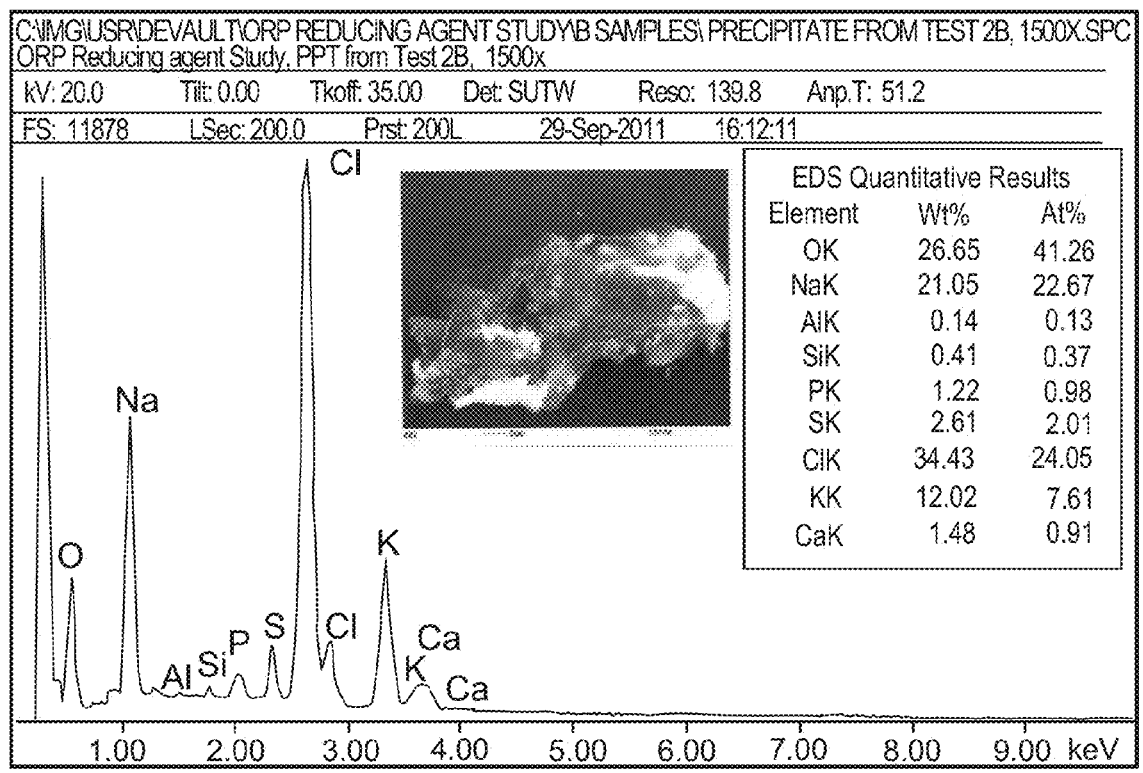
FIG. 34 is an SEM analysis of the unheated precipitate sample of Test Sample 2.

Test Sample 2, Control, with Mn, without Reducing Agent, 1000 ppm Persulfate Synthetic Solution:

Test Sample 2 is a control sample with the addition of manganese but without a reducing agent. There is a slight tint color to the liquid and a slight light brown precipitate forms in the unheated sample. There is a darker tint to the liquid and the heated sample has a substantial amount of dark brown and black precipitate as shown in FIG. 33. It is suspected that a small amount of the persulfate reacted with some of the soluble calcium in the unheated sample to form $CaSO_4 \cdot 2H_2O$. An SEM/EDS analysis is performed on the precipitate which shows small weight percentages of calcium and sulfur present (see FIG. 34). After heating, the ORP of the Test Sample increases from 592 to 900+mV and the pH decreases from 5.11 to 2.90. Also, a high weight percentage of manganese is found in the heated sample precipitate (37.41 weight percent). Consistent with this soluble manganese is lower in the heated sample (83.2 versus 107 ppm). The persulfate concentration in the Test Sample decreases from 1008 to 888 ppm which is important for this study, and is explained above.

Figure 35:
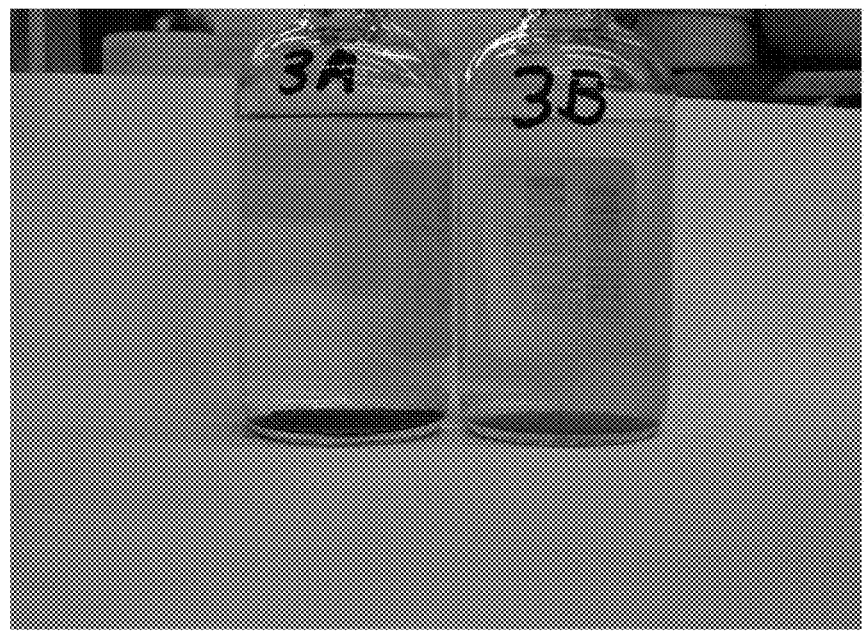
FIG. 35 is a photo comparing the heated and unheated of Test Sample 3.
Figure 36:
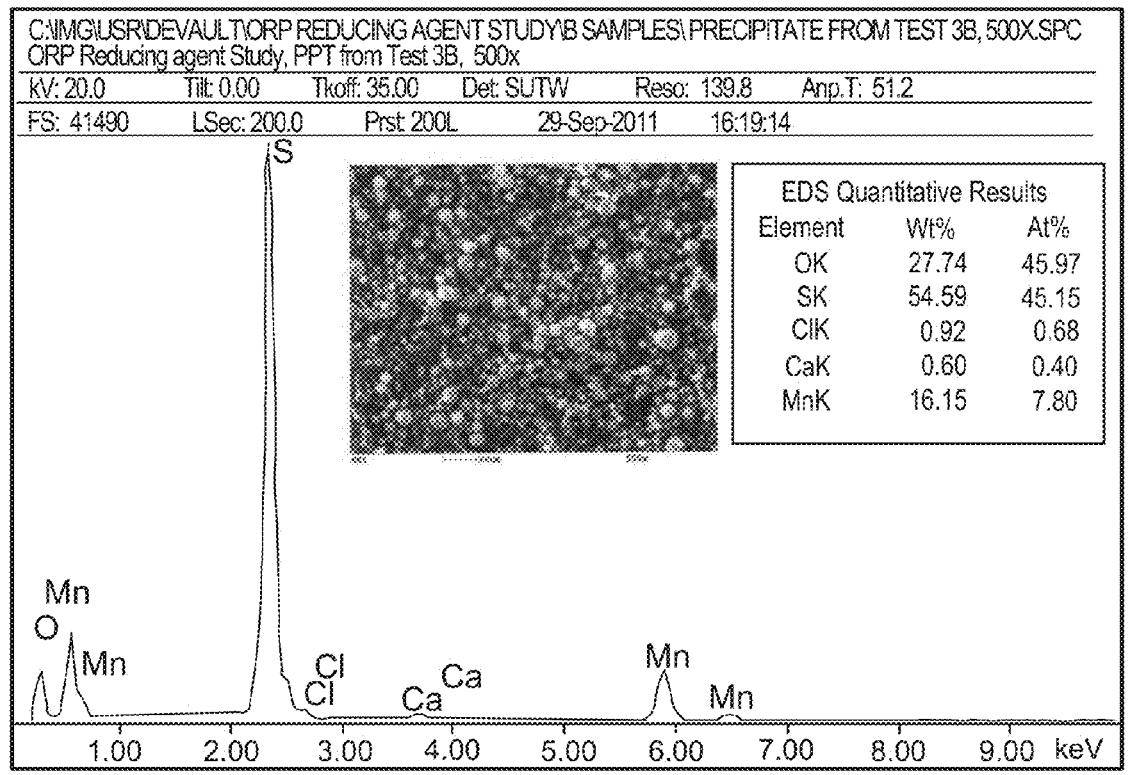
FIG. 36 is an SEM analysis of the unheated precipitate sample of Test Sample 3.

Test Sample 3, with Mn, with NaHS, in 1000 ppm Persulfate Synthetic Solution:

Test Sample 3 consists of the addition of manganese and NaHS with persulfate in the synthetic solution. There is a slight tint color to the liquid and a light brown precipitate forms in the unheated sample (see FIG. 35). The liquid is clear and the heated sample has a brown precipitate. An SEM/EDS analysis is performed (see FIG. 36) on the precipitates and shows moderate weight percentages of manganese in both the unheated and heated sample precipitates (16.15 versus 8.02 weight percent). The manganese concentration is higher in the unheated versus heated sample precipitate and this same trend is observed in Test Sample 6 where NaHS is also used as the reducing agent. Consistent with this, soluble manganese is measured in the unheated and heated samples at 81.2 and 91.9 ppm, respectively. In this example a soluble manganese concentration range between 107 to 111 ppm in Test Samples showed no manganese precipitation. Also, the EDS results show very high concentrations of sulfur in both the unheated and heated sample precipitates (54.59 versus 71.49 weight percent). This can be explained by the chemical reaction where elemental sulfur is formed as a product.

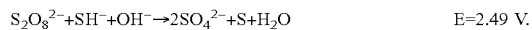

$$S_2O_8^{2-}+SH^-+OH^-\rightarrow 2SO_4^{2-}+S+H_2O \qquad E=2.49\ V.$$

After heating, the ORP of the Test Sample increases from 373 to 702+mV and the pH decreases from 6.14 to 3.91. The persulfate concentration in the Test Sample decreases from 1008 to less than about 50 ppm. This shows the reducing agent has effectively reacted with all the persulfate but did not prevent precipitation of some of the manganese.

Figure 37:
FIG. 37 is a photo comparing the heated and unheated of Test Sample 4.

Test Sample 4, with Mn, with $Na_2S_2O_3$, in 1000 ppm Persulfate Synthetic Solution:

Test Sample 4 consists of the addition of manganese and $Na_2S_2O_3$ with persulfate in the synthetic solution. There is no precipitate observed in the unheated sample (see FIG. 37). The liquid is cloudy in the heated sample but an insufficient amount of precipitate could be collected for EDS analysis. After heating, the ORP of the Test Sample decreases from 314 to 305+mV and the pH decreases from 4.68 to 2.98. Soluble manganese is measured in the unheated and heated samples at 108 and 110 ppm, respectively. The persulfate concentration in the Test Sample decreases from 1008 to less than about 50 ppm. This shows that the reducing agent has effectively reacted with all the persulfate and has prevented precipitation of manganese. Based on the persulfate titration determination there is determined to be an excess of $Na_2S_2O_3$ still in the heated sample. The excess is equivalent to 432 ppm of persulfate. This suggests a concentration of $Na_2S_2O_3$ of less than 10.4 mM is necessary, probably closer to 7.3 mM.

Figure 38:
FIG. 38 is a photo comparing the heated and unheated of Test Sample 5.

Test Sample 5, with Mn, with NH OH.HCl, in 1000 ppm Persulfate Synthetic Solution:

Test Sample 5 consists of the addition of manganese and $NH_2OH.HCl$ with persulfate in the synthetic solution. There is no precipitate observed in either the unheated or heated samples (see FIG. 38). After heating, the ORP of the Test Sample increases from 495 to 503+mV and the pH decreases from 2.35 to 1.82. The persulfate concentration in the Test Sample decreases from 1008 to less than about 50 ppm. This shows that the reducing agent has effectively reacted with all the persulfate and has prevented precipitation of manganese.

Figure 39:
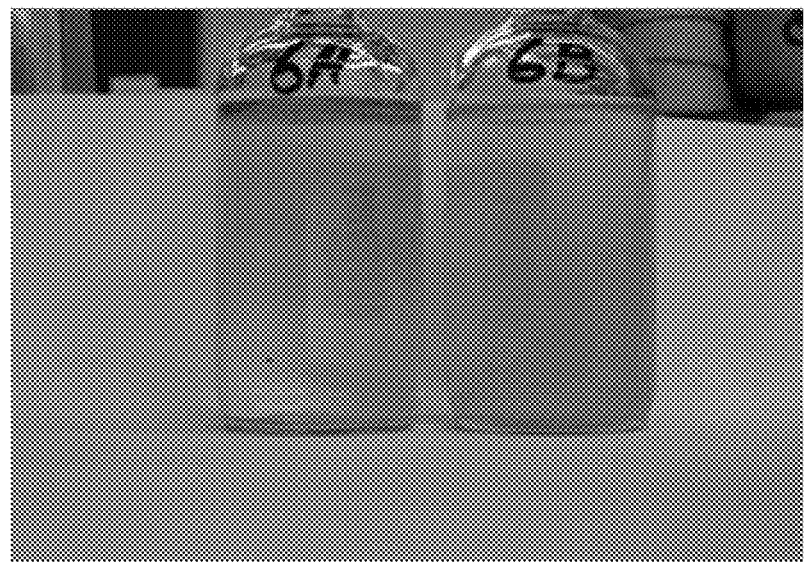
FIG. 39 is a photo comparing the heated and unheated of Test Sample 6.
Figure 40:
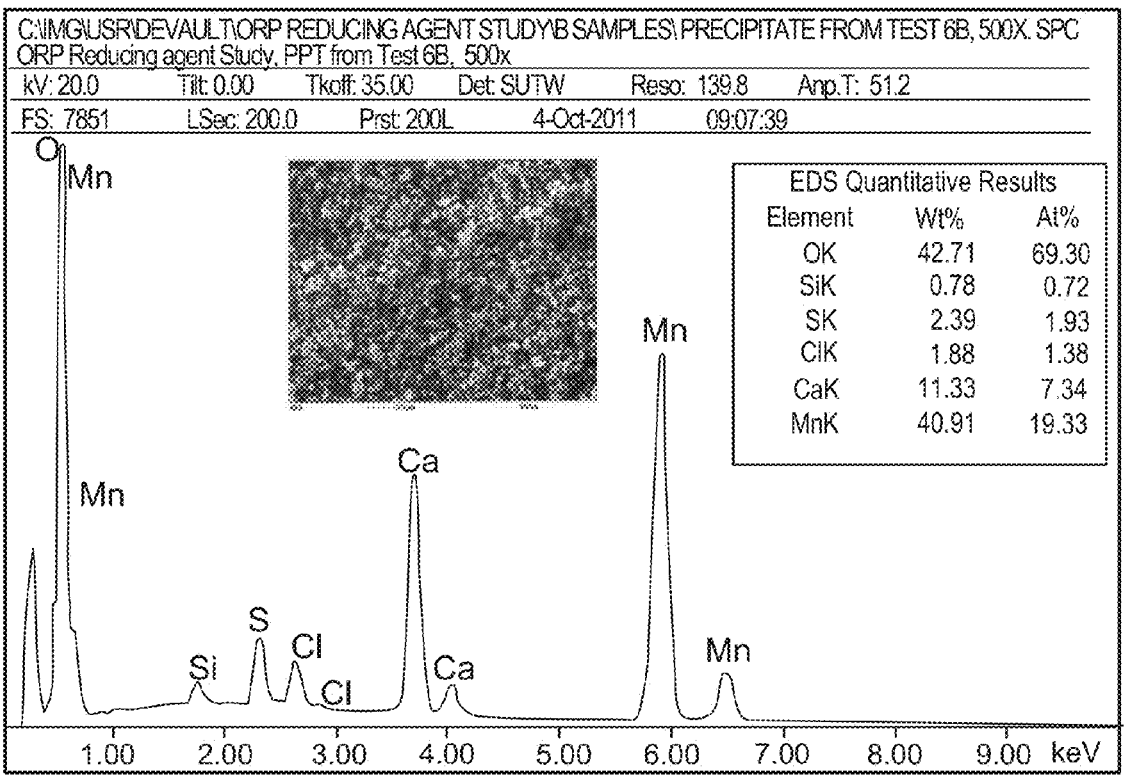
FIG. 40 is an SEM analysis of the unheated precipitate sample of Test Sample 6.

Test Sample 6, Control, with Mn, with NaHS, without Persulfate in Synthetic Solution:

Test Sample 6 is a control sample with the addition of manganese and NaHS but without persulfate in the synthetic solution. There is a tint color to the liquid and a slight yellow/brown precipitate formed in the unheated sample (see FIG. 39). There is a lighter tint to the liquid and the heated sample has a light tan precipitate with brown particles floating on the surface. An SEM/EDS analysis (see FIG. 40) is performed on the precipitates and shows high weight percentages of manganese in both the unheated and heated sample precipitates (40.91 versus 33.62 weight percent). Consistent with this, low soluble manganese is measured in the unheated and heated samples at 1.01 and 9.43 ppm, respectively. The majority of the spiked manganese has precipitated in both samples. In this example, a soluble manganese concentration range between 107 to 111 ppm in Test Samples shows no manganese precipitation. After heating, the ORP of the Test Sample decreases from 210 to 172+mV and the pH decreases from 9.78 to 7.68. Precipitation of the manganese can be explained by the ORP and pH of the test solutions in conjunction with the Pourbaix diagram of FIG. 1 for manganese. Based on the Pourbaix diagram at pH 7.68 to 9.78 formation of $Mn_3O_4$ and $Mn_2O_3$ are favored at an ORP of approximately +200 mV. Also, the EDS results show possible formation of a lesser amount of $CaSO_4.2H_2O$ (Ca—10.11 weight percent) in the heated sample precipitate with an excess of sulfur (S—12.00 weight percent).

Figure 41:
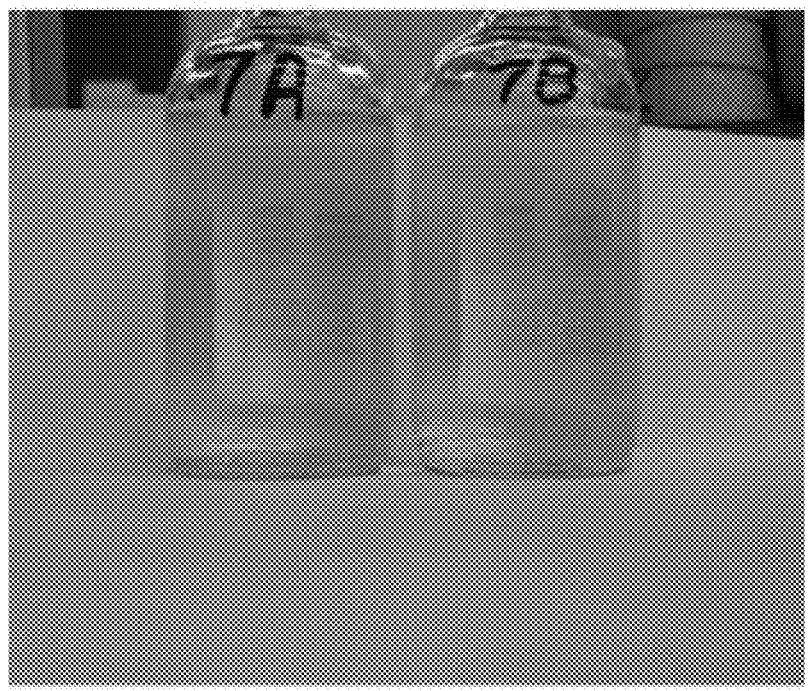
FIG. 41 is a photo comparing the heated and unheated of Test Sample 7.

Test Sample 7, Control, with Mn, with $Na_2S_2O_3$, without Persulfate in Synthetic Solution:

Test Sample 7 is a control sample with the addition of manganese and $Na_2S_2O_3$ but without persulfate in the synthetic solution. There is no precipitate observed in either the unheated or heated samples (see FIG. 41). After heating, the ORP of the Test Sample decreases from 222 to 188+mV and the pH increases from 6.62 to 7.30. Soluble manganese measured in the unheated and heated samples is 108 and 107 ppm, respectively. The manganese measurement using ICP-OES, at best, has a percent relative standard deviation (percent RSD) of ±3 percent, or approximately 3 ppm at a spiked manganese concentration of 100 ppm in a Test Sample. Therefore, at these manganese values a difference of 1 ppm is not significant.

Figure 42:
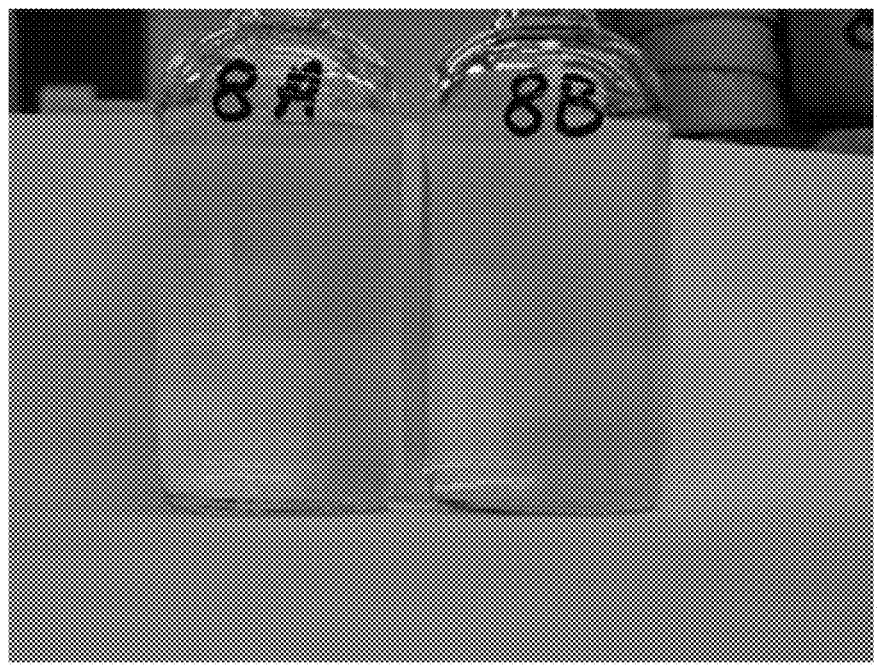
FIG. 42 is a photo comparing the heated and unheated of Test Sample 8.

Test Sample 8, Control, with Mn, with $NH_2OH.HCl$, without Persulfate in Synthetic Solution:

Test Sample 8 is a control sample with the addition of manganese and $NH_2OH.HCl$ but without persulfate in the synthetic solution. There is no precipitate observed in either the unheated or heated samples (see FIG. 42). After heating, the ORP of the Test Sample decreases from 188 to 129+mV and the pH decreases from 4.04 to 3.94. Soluble manganese measured in the unheated and heated samples is 105 and 110 ppm, respectively.

Figure 43:
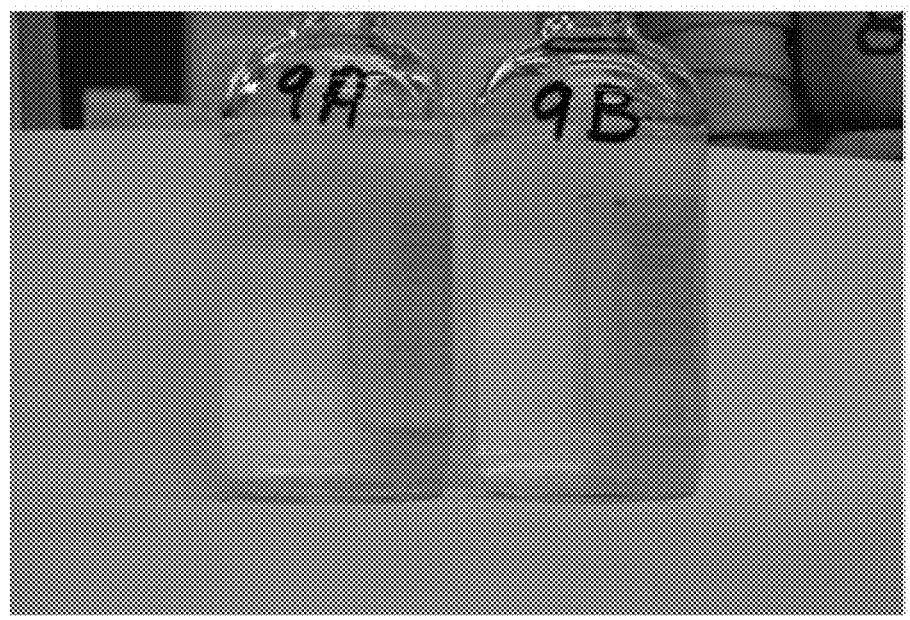
FIG. 43 is a photo comparing the heated and unheated of Test Sample 9.

Test Sample 9, Control, without Mn, without Reducing Agent, 2010 Filtrate:

Test Sample 9 is a control sample without the addition of manganese or a reducing agent. There is no precipitate observed in either the unheated or heated samples (see FIG. 43). After heating, the ORP of the Test Sample increases from 335 to 359+mV and the pH decreases from 6.76 to 5.39. The persulfate concentration in the Test Sample decreases from 936 to 840 ppm, and is the same concentration measured for the synthetic solution (Test Sample 1) after heating.

Figure 44:
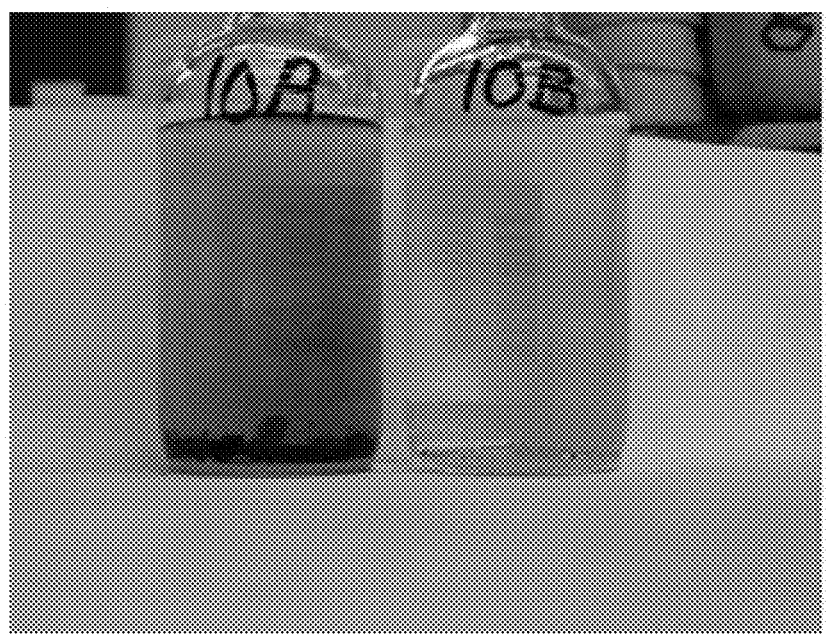
FIG. 44 is a photo comparing the heated and unheated of Test Sample 10.
Figure 45:
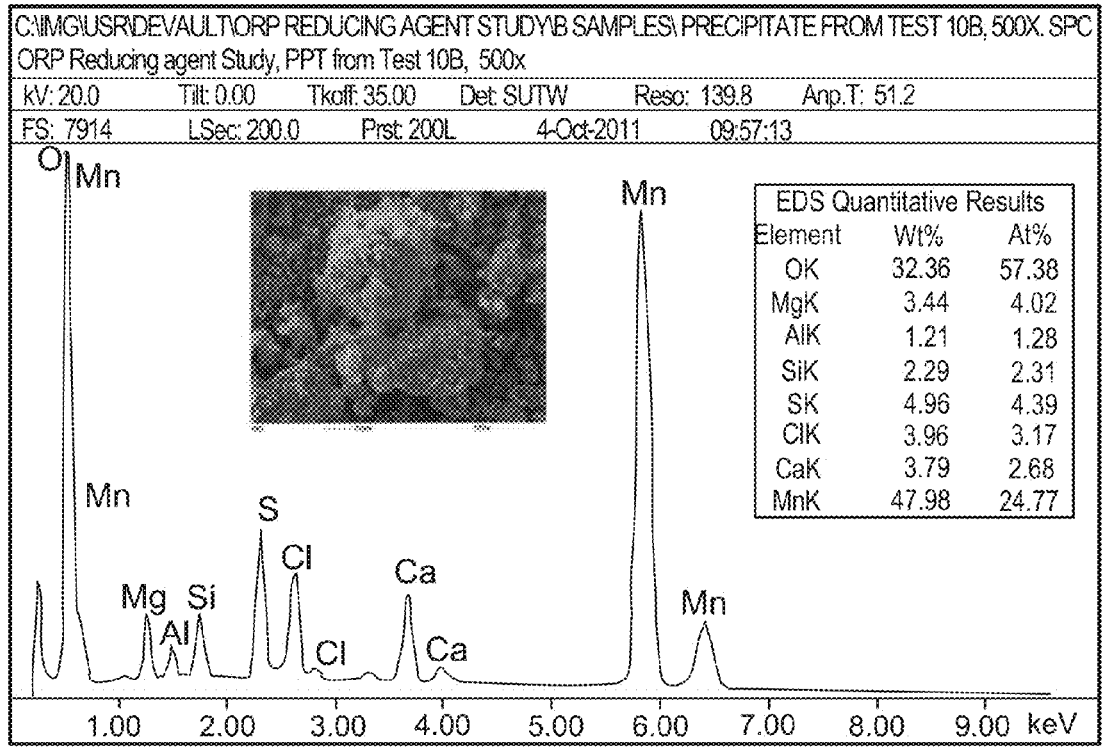
FIG. 45 is an SEM analysis of the unheated precipitate sample of Test Sample 10.

Test Sample 10, Control, with Mn, without Reducing Agent, 2010 Filtrate:

Test Sample 10 is a control sample with the addition of manganese but without a reducing agent. There is a slight tint color to the liquid and a slight light brown precipitate formed in the unheated sample (see FIG. 44). There is a darker tint to the liquid and the heated sample has a substantial amount of dark brown and black precipitate. It is suspected that a small amount of the persulfate reacts with some of the soluble calcium in the unheated sample to form $CaSO_4.2H_2O$. An SEM/EDS (see FIG. 45) analysis is performed on the precipitate which shows small weight percentages of calcium (3.79 weight percent) and sulfur (4.96 weight percent) being present. Also, high manganese (47.98 weight percent) is measured in the unheated sample precipitate. After heating, the ORP of the Test Sample increases from 328 to 458+mV and the pH decreases from 6.63 to 3.58. Even a higher weight percentage of manganese is found in the heated sample precipitate (59.11 weight percent). Consistent with this, soluble manganese is lower in the heated sample (79.7 versus 108 ppm). The persulfate concentration in the Test Sample decreases from 936 to 816 ppm and has been explained above.

Figure 46:
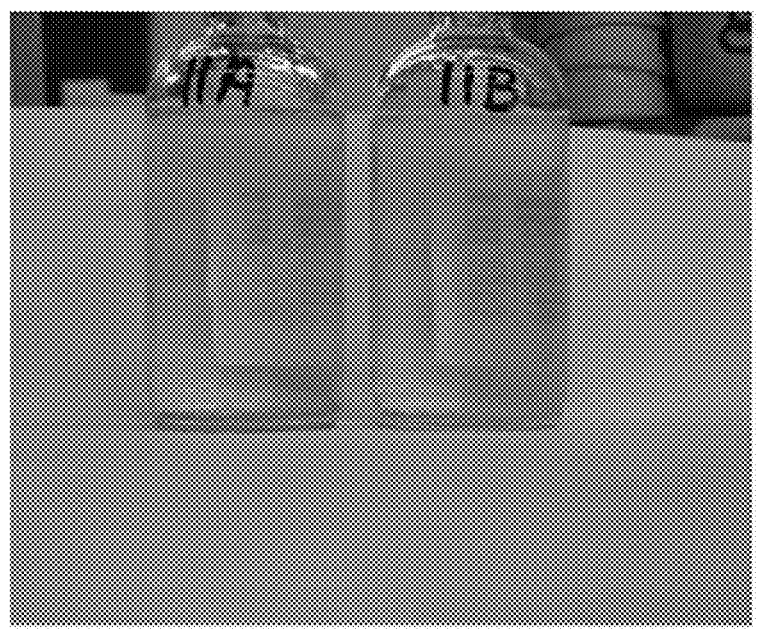
FIG. 46 is a photo comparing the heated and unheated of Test Sample 11.
Figure 47:
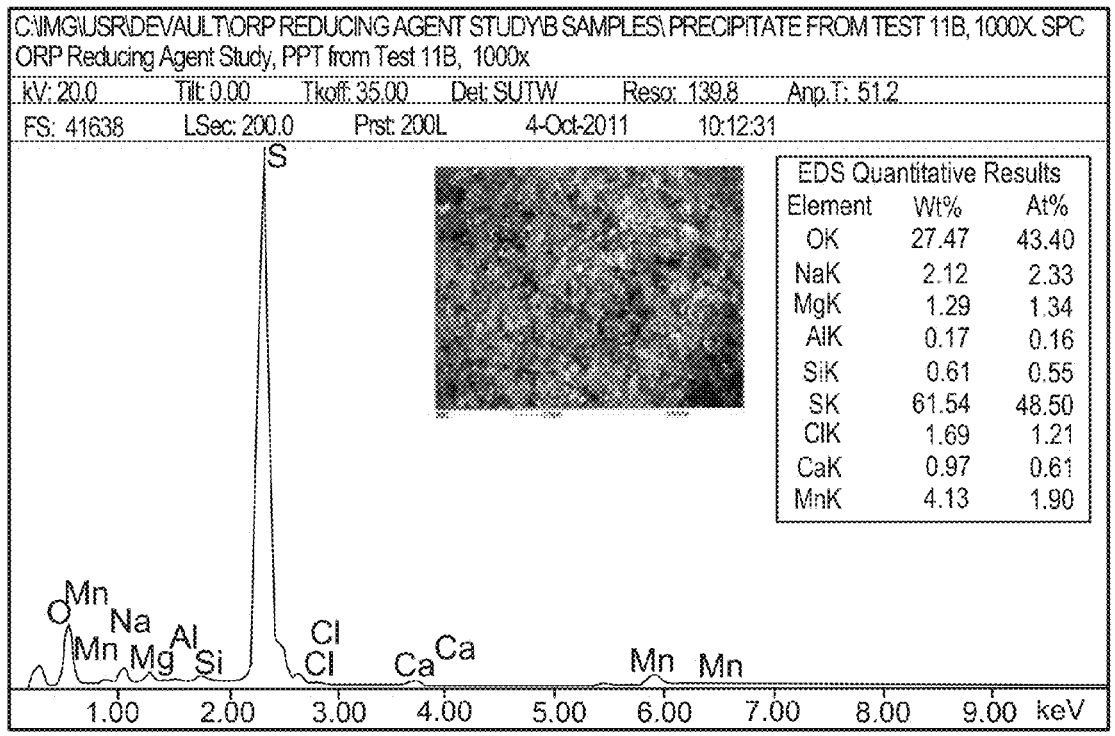
FIG. 47 is an SEM analysis of the unheated precipitate sample of Test Sample 11.

Test Sample 11, with Mn, with NaHS, in 2010 Filtrate:

Test Sample 11 consists of the addition of manganese and NaHS with the 2010 Filtrate. The liquid is clear but a white precipitate forms with white particles floating on the surface in the unheated sample (see FIG. 46). The liquid is clear and the heated sample has an off white precipitate. An SEM/EDS analysis (see FIG. 47) is performed on the precipitates and shows low weight percentages of manganese in both the unheated and heated sample precipitates (4.13 versus 1.05 weight percent). The manganese concentration is higher in the unheated versus heated sample precipitate and this same trend is observed in Test Samples 3 and 6 where NaHS is also used as the reducing agent. Soluble manganese is measured in the unheated and heated samples at 104 and 109 ppm, respectively. In the previous Test Samples a soluble manganese concentration range between 107 to 111 ppm in Test Samples shows no manganese precipitation, but here a low weight percentage of manganese is found in the heated sample precipitate. Also, the EDS results show very high concentrations of sulfur in both the unheated and heated sample precipitates (61.54 versus 81.58 weight percent) and this same trend is observed in Test Sample 3, but to a lesser extent in Test Sample 6 where NaHS is also used as the reducing agent.

After heating, the ORP of the Test Sample decreases from 242 to 96+mV and the pH decreases from 7.55 to 7.31. The persulfate concentration in the Test Sample decreases from 936 to 72 ppm. This shows the reducing agent has effectively reacted with most of the persulfate but did not prevent precipitation of some of the manganese.

Figure 48:
FIG. 48 is a photo comparing the heated and unheated of Test Sample 12.

Test Sample 12, with Mn, with $Na_2S_2O_3$, in 2010 Filtrate:

Test Sample 12 consists of the addition of manganese and $Na_2S_2O_3$ with the 2010 Filtrate. There is no precipitate observed in either the unheated or heated samples (see FIG. 48). After heating, the ORP of the Test Sample decreases from 256 to 209+mV and the pH decreases from 6.79 to 5.56. The persulfate concentration in the Test Sample decreases from 936 to less than about 50 ppm. This shows the reducing agent has effectively reacted with all the persulfate and has prevented precipitation of manganese. Based on the persulfate titration determination there is determined to be an excess of $Na_2S_2O_3$ still in the heated sample. The excess is equivalent to 600 ppm of persulfate. This suggests a concentration of $Na_2S_2O_3$ less than 10.4 mM is necessary, probably closer to 6.3 mM. Even a lower concentration of sodium thiosulfate is necessary for this Test Sample than the Test Sample prepared with synthetic solution (Test Sample 4). A possible explanation could be tied to the soluble calcium concentrations in the starting test solutions (approximately 100 versus 5650 ppm), where some interaction with the reducing agent may occur.

Figure 49:
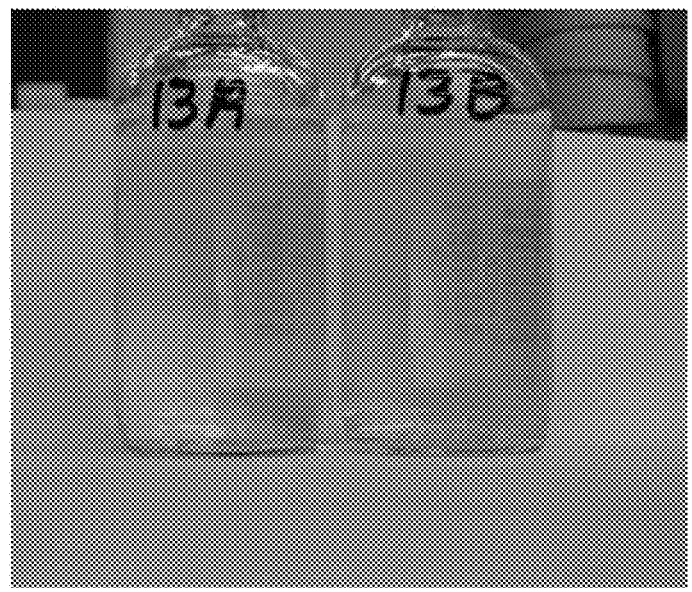
FIG. 49 is a photo comparing the heated and unheated of Test Sample 13.
Figure 50:
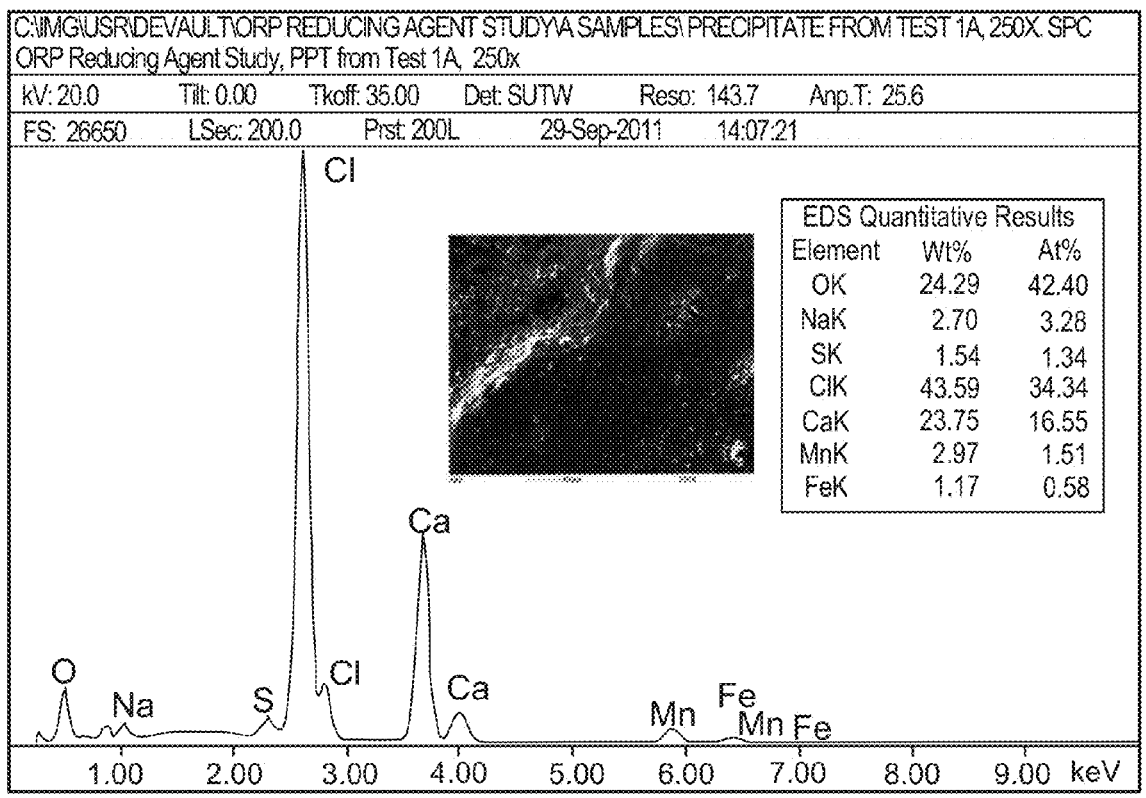
FIG. 50 is an SEM analysis of the heated precipitate sample of Test Sample 1.
Figure 51:
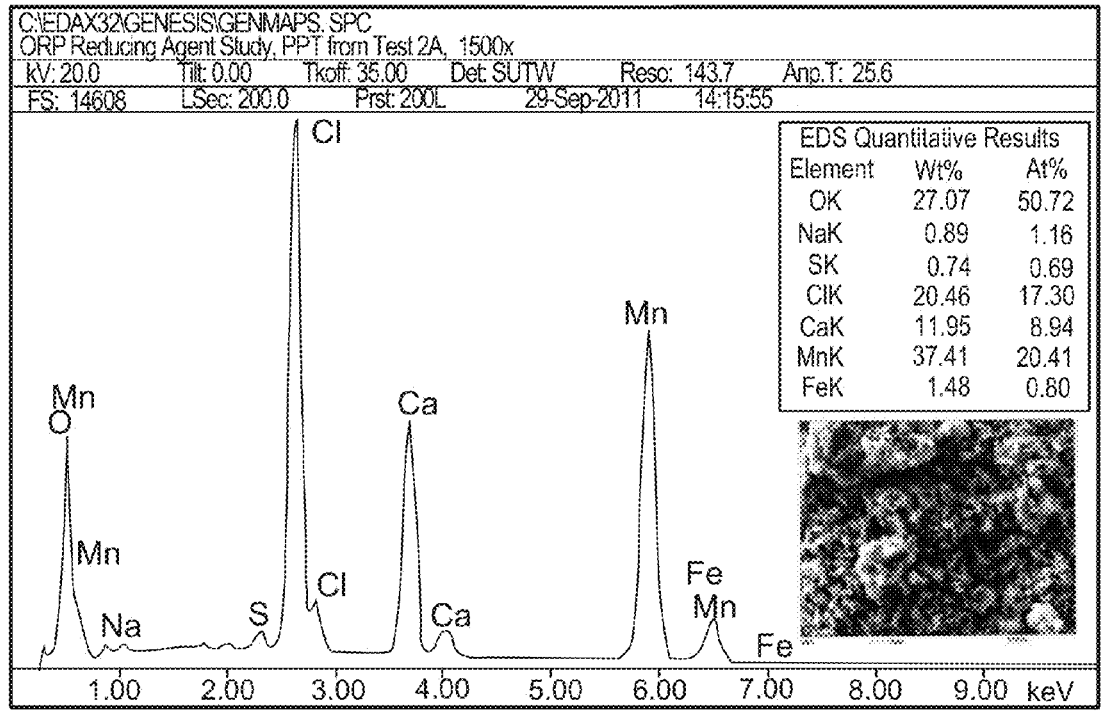
FIG. 51 is an SEM analysis of the heated precipitate sample of Test Sample 2.
Figure 52:
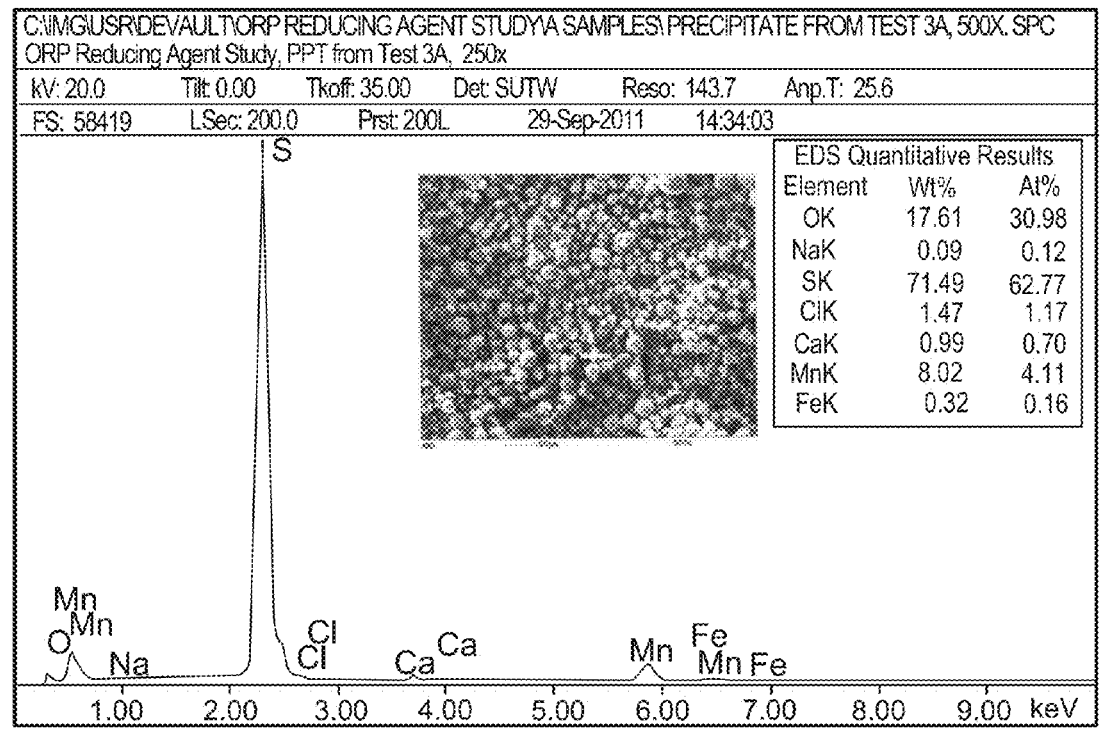
FIG. 52 is an SEM analysis of the heated precipitate sample of Test Sample 3.
Figure 53:
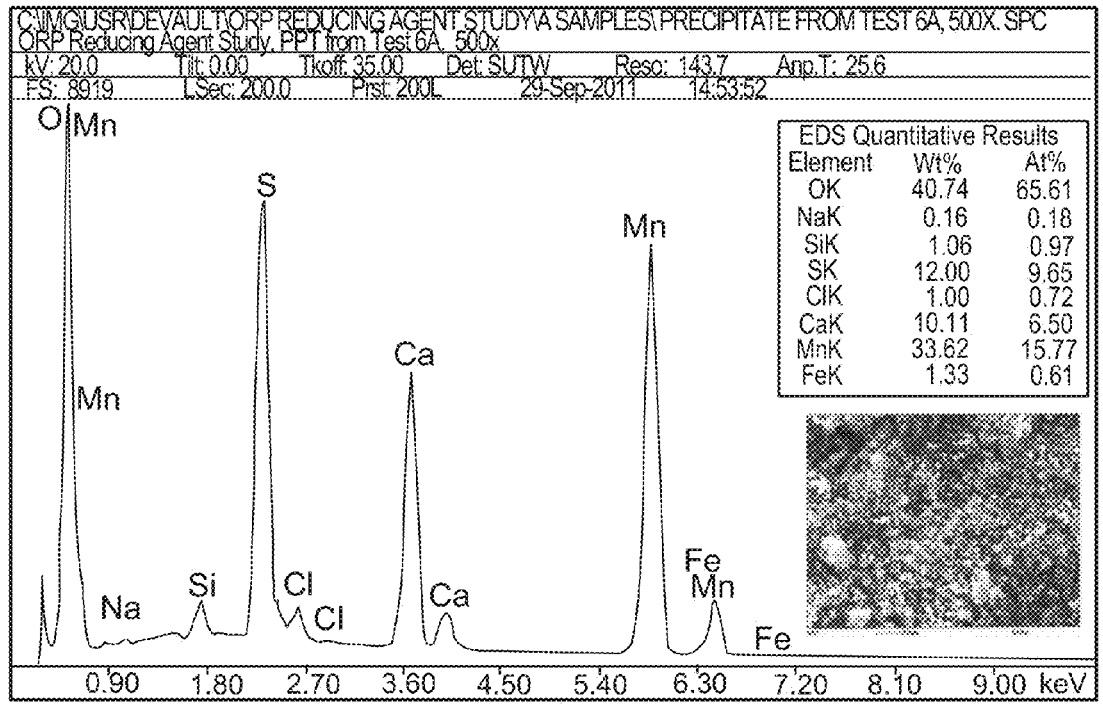
FIG. 53 is an SEM analysis of the heated precipitate sample of Test Sample 6.
Figure 54:
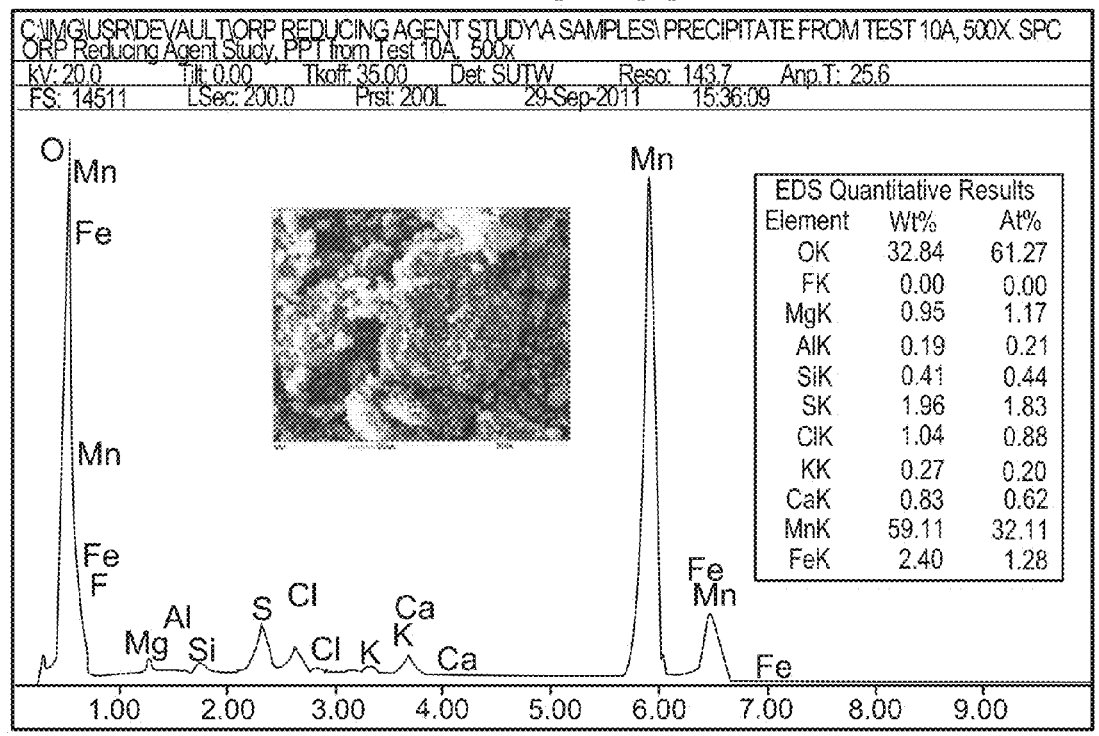
FIG. 54 is an SEM analysis of the heated precipitate sample of Test Sample 10.
Figure 55:
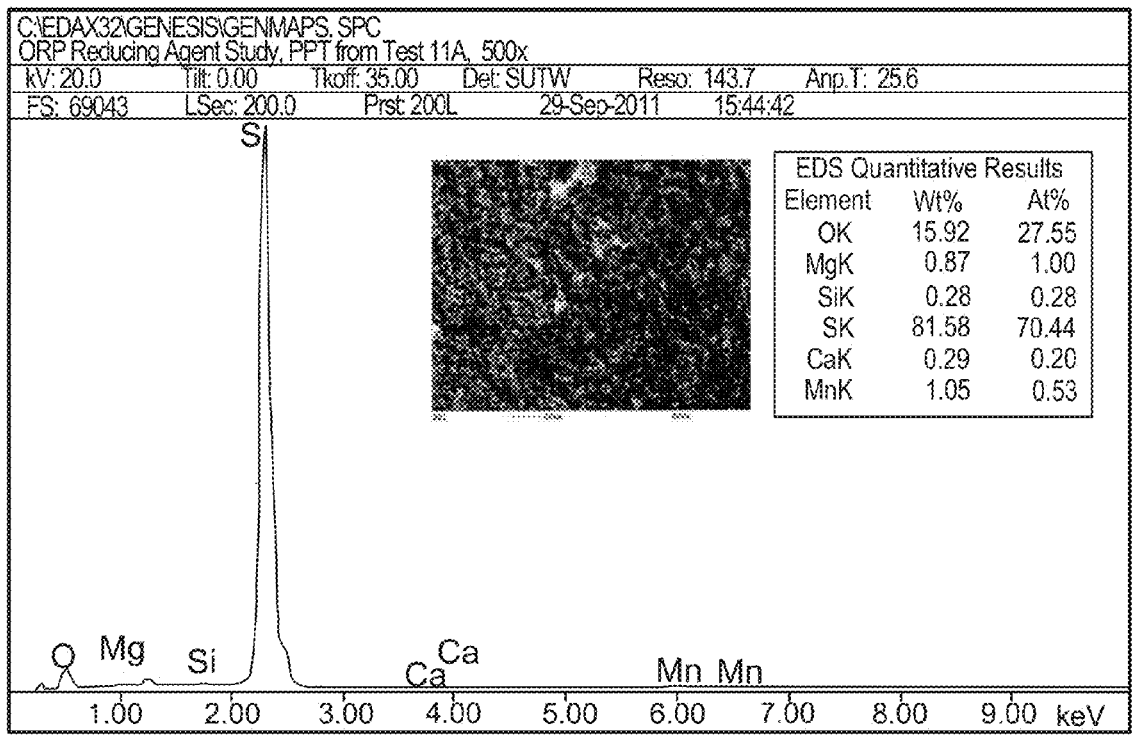
FIG. 55 is an SEM analysis of the heated precipitate sample of Test Sample 11.

Test Sample 13, with Mn, with $NH_2OH.HCl$ in 2010 Filtrate:

Test Sample 13 consists of the addition of manganese and $NH_2OH.HCl$ with the 2010 Filtrate. There is no precipitate observed in either the unheated or heated samples (see FIG. 49). After heating, the ORP of the Test Sample increases from 420 to 451+mV and the pH decreases from 2.94 to 2.13. The persulfate concentration in the Test Sample decreases from 936 to less than about 50 ppm. This shows the reducing agent has effectively reacted with all the persulfate and has prevented precipitation of manganese. Here, a slightly higher concentration (12.1 mM) of HAH is necessary compared to Test Sample 5 (9.1 mM HAH).

The formation of precipitates is observed in several of the Test Samples. All the samples containing the reducing agent NaHS form precipitates. For the samples that formed precipitates the precipitation is observed to be more pronounced in the heated versus ambient Test Sample. The appearance and elemental composition of the precipitates is not always the same for the various Test Samples. Based on the results for this batch bench-scale study: (1) both sodium thiosulfate and HAH are found to be effective at preventing precipitation of manganese in Test Samples containing persulfate while sodium hydrosulfide does not prevent manganese precipitation; and (2) based on the mM concentration necessary to react completely with approximately 1000 ppm persulfate, sodium thiosulfate is found to be the most effective reducing agent followed by HAH and then sodium hydrosulfide in order to prevent manganese precipitation. Regarding FIGS. 50 through 55, these Figures are SEM/EDS analyses of the heated portions of Test Samples 1, 2, 3, 6, 10 and 11, respectively.

Evaluation of Reducing Agents and their Potential Effect on the Oxidation State of Selenium in a WFGD Absorber Recirculation Tank (ART):

Selenium is one of the most volatile trace elements in coal, and is vaporized in a coal combustion boiler. As the temperature of the combustion flue gas is lowered, vaporized selenium is partially condensed on the surface of fly ash particles, which is captured in an electrostatic precipitator (ESP). Selenium passing through the ESP exists as $Se(IV)O_2$ in the flue gas and enters a wet flue gas desulfurization (WFGD) unit where it is dissolved in the absorber recirculation tank (ART) solution.

It is generally accepted that selenium exists as selenite ($Se(IV)O_3^{2-}$) and selenate ($Se(VI)O_4^{2-}$) in the ART solution, where the vast majority of selenite will, most likely, be oxidized to selenate. Selenite is generally removed in a conventional wastewater treatment method such as coagulation-sedimentation. But in order to remove selenate it has to be reduced to selenite or elemental selenium ($Se^0$) before wastewater treatment.

The new national standards, scheduled to be unveiled in 2012, will replace a patchwork of state regulations that EPA officials say are too lax to protect fish and wildlife for toxic metals and other elements, particularly selenium, in the power plants' wastewater. Some states allow the plants to emit selenium at levels hundreds of times higher than EPA's water-quality standards, while others do not even require monitoring for it. EPA found the two major sources of pollutants discharged from steam electric-power plants are coal-ash ponds and FGD systems. FGD wastewaters generally contain significant levels of metals including such bio-accumulative pollutants as arsenic, mercury, and selenium, and significant levels of chloride, total dissolved solids, total suspended solids (TSS), and nutrients. To treat FGD wastewater treatment plants use settling ponds (the most common treatment method), chemical precipitation systems, anaerobic and aerobic biological treatment systems, constructed wetlands, vapor-compression evaporation systems, and other technologies.

EPA's plans to revise wastewater discharge standards for coal-fired power plants could mean stricter selenium discharge limits. Thus, in another embodiment, the present invention seeks to determine at least one reducing agent that can be effective in controlling the oxidation state of selenium. Through the use of a reducing agent the desired goal is to maintain or maximize the formation of selenite or possibly elemental selenium in an ART for later wastewater treatment applications.

As noted above, several reducing agents are evaluated herein to determine their effectiveness at reacting with persulfate and lowering oxidation-reduction potential (ORP). Three of these reducing agents are used above to determine their effectiveness at preventing precipitation of manganese in batch bench-scale studies in two test solutions containing persulfate, a synthetic solution and 2010 ART Filtrate. Now, these same three reducing agents are evaluated to determine their effect on the oxidation state of selenium in batch bench-scale studies in two test solutions containing persulfate, a synthetic solution and 2010 ART Filtrate.

Selenium Spiking Experiments:

Three (3) reducing agents, sodium hydrosulfide (NaHS), sodium thiosulfate ($Na_2S_2O_3$), and HAH ($NH_2OH.HCl$), are evaluated to determine their effect on the oxidation state of selenium in two test solutions containing persulfate, a laboratory prepared or synthetic solution and 2010 ART Filtrate. Both test solutions contain persulfate at an approximate concentration of 1000 ppm. Two synthetic solutions are prepared with $CaCl_2$ at 10000 ppm chloride (5650 ppm Ca). Certified ACS Grade $CaCl_2.2H_2O$ is used to prepare the synthetic solutions. One of the synthetic solutions has 1000 ppm persulfate ($S_2O_8^{2-}$) and the other contained no persulfate to serve as a control. Persulfate is added as sodium peroxydisulfate or persulfate, 98 percent purity purchased from Alpha Aesar. The sequence of addition is the selenium spike solution, reducing agent and the test solution. The reason for this sequence of addition is to prevent reaction of the test solution, first, with either the selenium spike solution or the reducing agent, and to determine if the test solution reacts, preferentially, with either the selenium spike solution or the reducing agent. The test concentration of selenium is calculated at 1 ppm or 1000 ppb and is added as either (100 ppm selenite, $Se(IV)O_3^{2-}$) or (100 ppm selenate, $Se(VI)O_4^{2-}$) depending on the Test Sample, and is the approximate concentration typically found in ART filtrate samples. The selenium spiking solutions are prepared from chemicals purchased from Alfa Aesar (sodium selenite, $Na_2SeO_3$, anhydrous, 99 percent purity, min metals basis and sodium selenate, $Na_2SeO_4$, 99.8 plus percent purity, metals basis).

The concentration of each reducing agent added depends on the amount determined necessary from previous testing to chemically react completely with the concentration of persulfate present, near 1000 ppm, in each test solution. For NaHS the amount added is at a concentration of 24.2 mM. The mM concentration of persulfate at 1000 ppm is equal to 5.2 mM. Hydrosulfide ($HS^-$) is the reacting species with persulfate. Theoretically, the chemical reaction between hydrosulfide and persulfate should be a mole ratio of 1.0, but instead a mole ratio $HS^-/S_2O_8^{2-}$ is necessary closer between 4 to 5. While not wishing to be bound to any one theory, it is believed the protonated form of hydroxylamine, $NH_3OH^+$, is the reacting species with persulfate. The chemical reaction between $NH_3OH^+$ and persulfate should occur at a mole ratio of 2.0, and requires a 10.4 mM concentration of HAH ($NH_2OH.HCl$). It is determined that a 9.1 mM concentration of HAH is necessary for the synthetic solution and a higher 12.1 mM concentration for the 2010 ART Filtrate. Unlike for NaHS and $NH_2OH.HCl$, a detailed study is not performed for $Na_2S_2O_3$ and its reaction with persulfate. The chemical reaction between thiosulfate and persulfate should occur at a mole ratio of 2.0, and requires a 10.4 mM concentration of $Na_2S_2O_3$. This is the concentration of $Na_2S_2O_3$ used in this study.

It has been shown that the presence of persulfate, a very strong oxidizer, at concentrations in excess of about 150 ppm has a pronounced effect to oxidize Se(IV) to Se(VI). Also, it has been found that the concentration of dissolved selenium increases as oxidation-reduction potential (ORP) increases in a WFGD system. Initially, each 225 gram Test Sample is prepared by first adding the calculated and weighed amounts of selenium spike solution and reducing agent into an individual 250 mL wide mouth Nalgene bottle followed by the appropriate amount and type of test solution. ORP and pH are determined on each of the control test solutions and samples at ambient temperature. After the measurements two 100 gram split samples of each test solution are transferred into 125 mL clear glass 1-Chem bottles. Test Set B is allowed to sit at ambient temperature while Test Set A is heated to 55° C. Following heating at 55° C. for 15 hours the samples are allowed to cool to room temperature and the ORP and pH are measured on the control and Test Samples for both Test Sets and the results are listed in Table 10. Persulfate concentrations are measured by titration method on the synthetic solution and 2010 ART Filtrate to determine their starting concentrations and on all the Test Samples following heating where persulfate has been added. Each of the control and Test Samples is sent to Southern Research Institute (SRI) for selenium speciation analysis in the dissolved liquid, only, using isotopic dilution ICP-MS. The samples are shipped to SRI packed in ice to maintain 4° C. prior to analysis.

TABLE 10

Test Results for Effect of Various Reducing Agents On Selenium Speciation

| | | Unheated | | | | | | Heated | | | | |
|---|---|---|---|---|---|---|---|---|---|---|---|---|
| Reducing Agent | Test | ORP (+mV) | pH | Se(IV) Soluble | Se(VI) Soluble | $S_2O_8^{2-}$ (ppm) | Precipitate | ORP (+mV) | pH | Se(IV) Soluble | Se(VI) Soluble | $S_2O_8^{2-}$ (ppm) | Precipitate |
| Starting Solutions | | | | Conc. (ppb) | Conc. (ppb) | | | | | Conc. (ppb) | Conc. (ppb) | | |
| Synthetic Solution with $S_2O_8^{2-}$ | | | | <1.00 | <1.00 | 1008 | | | | | | | |

TABLE 10-continued

Test Results for Effect of Various Reducing Agents On Selenium Speciation

| Reducing Agent | Test | Unheated ORP (+mV) | pH | Se(IV) Soluble | Se(VI) Soluble | $S_2O_8^{2-}$ (ppm) | Precipitate | Heated ORP (+mV) | pH | Se(IV) Soluble | Se(VI) Soluble | $S_2O_8^{2-}$ (ppm) | Precipitate |
|---|---|---|---|---|---|---|---|---|---|---|---|---|---|
| Synthetic Solution w/o $S_2O_8^{2-}$ | | | | <1.00 | 1.53 | | | | | | | | |
| 2010 Cayuga Unit 2 Filtrate | | | | 2.35 | 782 | 888 | | | | | | | |
| Spiking Solution Se (IV) or Selenite | | | | 95500 | 3.11 | | | | | | | | |
| Spiking Solution Se(VI) or Selenate Synthetic Solution | | | | 230 | 74150 | | | | | | | | |
| Control w/o Se(IV) or Se(VI), w/o reducing agent, with $S_2O_8^{2-}$ | 1 | 636 | 4.88 | 4.40 | <1.00 | | Y, light tint, slight deposit | 1029 | 3.06 | <1.00 | <1.00 | 840 | Y, dark tint, more deposit |
| Control with Se (IV), w/o reducing agent, with $S_2O_8^{2-}$ | 2 | 618 | 5.14 | 241 | 504 | | Y, light tint, slight deposit | 1055 | 3.07 | 2.74 | 785 | 936 | Y, dark tint, more deposit |
| Control with Se (VI), w/o reducing agent, with $S_2O_8^{2-}$ | 3 | 541 | 4.73 | 5.69 | 761 | | Y, light tint, slight deposit | 1055 | 3.08 | 2.57 | 769 | 936 | Y, dark tint, more deposit |
| Control with Se (VI) w/o $S_2O_8^{2-}$, NaHS | 4 | −398 | 8.60 | 2.62 | 763 | | Y, particles on bottom | 260 | 7.32 | 2.53 | 779 | | Y, particles on bottom |
| Control with Se (VI) w/o $S_2O_8^{2-}$, $Na_2S_2O_3$ | 5 | 78 | 7.24 | 725 | <1.00 | | N | 245 | 7.93 | 746 | <1.00 | | N |
| Control with Se (VI) w/o $S_2O_8^{2-}$, $NH_2OH \cdot HCl$ | 6 | 86 | 4.03 | 6.29 | 753 | | N | 226 | 3.86 | 2.52 | 772 | | N |
| With Se (IV) with $S_2O_8^{2-}$, NaHS | 7 | 336 | 3.81 | 4.10 | <1.00 | | Y, particles on bottom | 414 | 3.22 | <1.00 | <1.00 | <50 | Y, particles on bottom |
| With Se (IV) with $S_2O_8^{2-}$, $Na_2S_2O_3$ | 8 | 258 | 4.15 | 2.98 | 749 | | N | 285 | 2.82 | 2.46 | 934 | <50* | Y, light film |
| With Se (IV) with $S_2O_8^{2-}$, $NH_2OH \cdot HCl$ | 9 | 505 | 2.10 | 638 | 6.14 | | N | 520 | 1.83 | 618 | 26.5 | <50 | N |
| 2010 ART Filtrate | | | | | | | | | | | | | |
| Control w/o Se (IV) | 10 | 378 | 6.68 | 3.32 | 775 | | N | 436 | 3.94 | 2.55 | 782 | 792 | N |
| Control with Se (IV) | 11 | 379 | 6.68 | 2.72 | 1540 | | N | 457 | 3.93 | 2.44 | 1958 | 821 | N |
| With Se (IV) with $S_2O_8^{2-}$, NaHS | 12 | 264 | 7.35 | 3.35 | 774 | | Y, particles on bottom | 299 | 6.85 | 6.45 | 777 | 120 | Y, particles on bottom |
| With Se (IV) with $S_2O_8^{2-}$, $Na_2S_2O_3$ | 13 | 253 | 6.77 | 461 | 771 | | N | 321 | 3.81 | 3.10 | 777 | <50* | N |
| With Se (IV) with $S_2O_8^{2-}$, $NH_2OH \cdot HCl$ | 14 | 476 | 2.19 | 682 | 790 | | N | 453 | 2.09 | 667 | 800 | <50* | N |

*Based on the persulfate titration results the amount of $Na_2S_2O_3$ or $NH_2OH \cdot HCl$ required to react with the persulfate present in the sample was in excess by 40 to 60%.

Starting Solutions:

(a) Synthetic solution with persulfate—the measured concentration of both dissolved selenite and selenate are each below the instrument reporting limit (less than 1.00 ppb). Persulfate concentration is measured at 1008 ppm; (b) synthetic solution without persulfate—the measured concentration of dissolved selenite is less than 1.00 ppb and selenate is 1.53 ppb; (c) 2010 Filtrate—the measured concentration of dissolved selenite is 2.35 ppb and selenate is 782 ppb. Persulfate concentration is measured at 888 ppm; (d) spiking solution Se(IV) or selenite—the measured concentration of dissolved selenite is 95500 ppb and selenate is 3.11 ppb; and (e) spiking solution Se(VI) or selenite—the measured concentration of dissolved selenite is 230 ppb and selenate is 74150 ppb. The value for selenate is expected to be closer to 100000 ppb or 100 ppm based on review of the actual weights of sodium selenate and water used to prepare the spiking solution. Approximately 84 grams of $Na_2SeO_4$ will dissolve in 100 mL of water at room temperature so it is not a solubility issue.

Test Sample 1, Control, without Se(IV) or Se(VI), without Reducing Agent, 1000 ppm Persulfate Synthetic Solution:

Test Sample 1 is a control sample without the addition of selenium or a reducing agent. In the unheated sample the measured concentration of dissolved selenite is 4.40 ppb and selenate is less than 1.00 ppb. In the heated sample the measured concentration of dissolved selenite is less than 1.00 ppb and selenate is less than 1.00 ppb. There is not expected to be any dissolved selenium in either the unheated or heated sample, and the results should be and are similar to the starting synthetic solution with persulfate.

There is a slight tint color and a slight tan precipitate formed in the unheated sample. There is a darker tint color and the precipitate is a dark brown and there appears to be more in the heated sample. After heating, the ORP of the Test Sample increases from 636 to 1029+mV and the pH decreases from 4.88 to 3.06. The persulfate concentration in the control Test Sample decreases from 1008 to 840 ppm.

Test Sample 2, Control, with Se(IV), without Reducing Agent, 1000 ppm Persulfate Synthetic Solution:

Test Sample 2 is a control sample with the addition of selenite or Se(IV), but without a reducing agent. Based on the analysis of the starting spiking solution Se(IV), or selenite, the expected selenite concentration added to Test Sample 2 is 955 ppb. In the unheated sample the measured concentration of dissolved selenite is 241 ppb and selenate is 504 ppb. This suggests persulfate has the ability to oxidize a high percentage of selenite to selenate at room temperature. It is difficult to calculate the exact percentage oxidized from selenite to selenate because the measured total dissolved selenium concentration is 745 versus 955 ppb expected, for a difference of 210 ppb. Possibly a portion of the selenium precipitates but the precipitate is not analyzed for selenium to confirm this. In the heated sample the measured concentration of dissolved selenite is 2.74 ppb and selenate is 785 ppb. A higher concentration of selenate is measured in the heated versus unheated sample, 785 versus 504 ppb with similar total dissolved selenium concentrations. This suggests in addition to the presence of persulfate, temperature or the combination of persulfate and temperature has even a greater effect on oxidizing selenite to selenate. Once again there is a difference in measured total dissolved selenium concentration compared to expected concentration, 788 versus 955 ppb, for a difference of 167 ppb.

Similar to Test Sample 1, there is a slight tint color and a slight tan precipitate forms in the unheated sample. There is a darker tint color and the precipitate is a dark brown and there appears to be more in the heated sample. After heating, the ORP of the Test Sample increases from 618 to 1055+mV and the pH decreases from 5.14 to 3.07. The persulfate concentration ion in the control Test Sample decreases from 1008 to 936 ppm, which is less than the decrease observed in Test Sample 1.

Test Sample 3, Control, with Se(VI), without Reducing Agent, 1000 ppm Persulfate Synthetic Solution:

Test Sample 3 is a control sample with the addition of selenate, or Se(VI), but without a reducing agent. Based on the analysis of the starting spiking solution Se(VI), or selenate, the expected selenate concentration added to Test Sample 3 is 742 ppb. In the unheated sample the measured concentration of dissolved selenite is 5.69 ppb and selenate is 761 ppb. The measured total dissolved selenium concentration is 755 versus 742 ppb expected, for a difference of 13 ppb. In the heated sample the measured concentration of dissolved selenite is 2.57 ppb and selenate is 769 ppb. The measured total dissolved selenium concentration is 772 versus 742 ppb expected, for a difference of 30 ppb. Similar concentrations of selenite and selenate are measured in the heated versus unheated samples, and reasonable checks are obtained between the measured total dissolved selenium and expected concentrations.

Similar to Test Samples 1 and 2 there is a slight tint color and a slight tan precipitate forms in the unheated sample. There is a darker tint color and the precipitate is a dark brown and there appears to be more in the heated sample. After heating, the ORP of the Test Sample increases from 541 to 1055+mV and the pH decreases from 4.73 to 3.08. The persulfate concentration in the control Test Sample decreases from 1008 to 936 ppm. This is the same decrease as in Test Sample 2 but is less of a decrease than in Test Sample 1.

Even though there is precipitate, based on the reasonable checks for measured total dissolved selenium and expected concentrations in the unheated and heated samples, the selenate, or Se(VI), addition is not part of the precipitate. It is possible the $SeO_4^{2-}$ reacts with soluble calcium to form $CaSeO_4$. However, the solubility of $CaSeO_4$ is two orders of magnitude greater than gypsum ($CaSO_4.2H_2O$) and the $K_{sp}$ for gypsum is $1\times10^{-4.6}$ at 25° C. The $K_{sp}$ for $CaSeO_3$ is $1\times10^{-7.27}$ at 25° C., which means $CaSeO_3$ is three orders of magnitude less soluble than gypsum and is more likely to precipitate than $CaSeO_4$. Also, $SeO_4^{2-}$ ions can substitute for sulfate in the gypsum structure to form $Ca(SO_4,SeO_4).2H_2O$.

Test Sample 4, Control, with Se(VI), with NaHS, without Persulfate in Synthetic Solution:

Test Sample 4 is a control sample with the addition of selenate, or Se(VI), and NaHS but without persulfate in the synthetic solution. Based on the analysis of the starting spiking solution Se(VI), or selenate, the expected selenate concentration added to Test Sample 4 is 742 ppb. In the unheated sample the measured concentration of dissolved selenite is 2.62 ppb and selenate is 763 ppb. The measured total dissolved selenium concentration is 766 versus 742 ppb expected, for a difference of 24 ppb. In the heated sample the measured concentration of dissolved selenite is 2.53 ppb and selenate is 779 ppb. The measured total dissolved selenium concentration is 782 versus 742 ppb expected, for a difference of 40 ppb. Similar concentrations of selenite and selenate are measured in the heated versus unheated samples, and reasonable checks are obtained between the measured total dissolved selenium and expected concentrations. After heating, the ORP of the Test Sample increases from −398 to +260 mV and the pH decreases from 8.60 to 7.32. Addition of reducing agent NaHS does not have an effect on changing any spiked selenate to selenite. A light green tint color and some particles form in both the unheated and heated samples.

Test Sample 5, Control, with Se(VI), with $Na_2S_2O_3$, without Persulfate in Synthetic Solution:

Test Sample 5 is a control sample with the addition of selenate, or Se(VI), and $Na_2S_2O_3$ but without persulfate in the synthetic solution. Based on the analysis of the starting spiking solution Se(VI), or selenate, the expected selenate concentration added to Test Sample 5 is 742 ppb. In the unheated sample the measured concentration of dissolved selenite is 725 ppb and selenate is less than 1.00 ppb. The measured total dissolved selenium concentration is 725 versus 742 ppb expected, for a difference of 17 ppb. In the heated sample the measured concentration of dissolved selenite is 746 ppb and selenate is less than 1.00 ppb. The measured total dissolved selenium concentration is 746 versus 742 ppb expected, for a difference of 4 ppb. Similar concentrations of selenite and selenate are measured in the heated versus unheated samples, and reasonable checks are obtained between the measured total dissolved selenium and expected concentrations. For this Test Sample addition of reducing agent $Na_2S_2O_3$ has an immediate effect on changing all the selenate to selenite but it should be emphasized that persulfate is not present in this sample. After heating, the ORP of the Test Sample increases from 78 to 245+mV and the pH increases from 7.24 to 7.93. No precipitate was observed in the unheated and heated samples.

Test Sample 6, Control, with Se(VI), with $NH_2OH.HCl$, without Persulfate in Synthetic Solution:

Test Sample 6 is a control sample with the addition of selenate, or Se(VI), and $NH_2OH.HCl$ but without persulfate in the synthetic solution. Based on the analysis of the starting spiking solution Se(VI), or selenate, the expected selenate concentration added to Test Sample 6 is 742 ppb. In the unheated sample the measured concentration of dissolved selenite is 6.29 ppb and selenate is 753 ppb. The measured total dissolved selenium concentration is 759 versus 742 ppb expected, for a difference of 17 ppb. In the heated sample the measured concentration of dissolved selenite is 2.52 ppb and selenate is 772 ppb. The measured total dissolved selenium concentration is 775 versus 742 ppb expected, for a difference of 33 ppb. Similar concentrations of selenite and selenate are measured in the heated versus unheated samples, and reasonable checks are obtained between the measured total dissolved selenium and expected concentrations. After heating, the ORP of the Test Sample increases from 86 to 226+mV and the pH decreases from 4.03 to 3.86. Addition of the reducing agent $NH_2OH.HCl$ does not have an effect on changing any selenate to selenite. No precipitate is observed in the unheated and heated samples.

Test Sample 7, with Se(IV), with NaHS, in 1000 ppm Persulfate Synthetic Solution:

Test Sample 7 consists of the addition of selenite, or Se(IV), and NaHS with persulfate in the synthetic solution. Based on the analysis of the starting spiking solution Se(IV), or selenite, the expected selenite concentration added to Test Sample 7 is 955 ppb. In the unheated sample the measured concentration of dissolved selenite is 4.10 ppb and selenate is less than 1.00 ppb. The measured total dissolved selenium concentration is 4.10 versus 955 ppb expected, for a difference of 951 ppb. In the heated sample the measured concentration of dissolved selenite is less than 1.00 ppb and selenate is also less than 1.00 ppb. The measured total dissolved selenium concentration is less than 1.00 versus 955 ppb expected, for a difference of 955 ppb. Clearly, the spiked selenite addition has been lost in the Test Sample.

While not wishing to be bound to any one theory, this can possibly be explained by the chemical reaction where elemental sulfur is formed as a product.

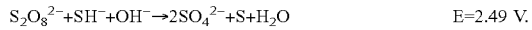

$$S_2O_8^{2-} + SH^- + OH^- \rightarrow 2SO_4^{2-} + S + H_2O \quad\quad E=2.49\ V.$$

Also, it is possible for elemental sulfur to combine with elemental selenium to form selenium disulfide, $SeS_2$. Particles are observed on the bottom of the glass test bottle but are not collected for selenium analysis. Another possibility is the selenite may have reacted with the high concentration of soluble calcium (approximately 5650 ppm) in the Test Sample to form calcium selenite monohydrate ($CaSeO_3..H_2O$). $CaSeO_3.H_2O$ has a solubility product constant ($K_{sp}$) of only $1\times10^{-7.27}$ at 25° C., which indicates very low solubility. For comparison calcium fluoride ($CaF_2$) has a $K_{sp}=3.9\times10^{-11}$, having even less solubility than $CaSeO_3.H_2O$. While not to the same extent, Test Sample 2 also shows a portion of the spiked selenite is lost from solution, approximately 200 ppb.

After heating, the ORP of the Test Sample increases from 336 to 414+mV and the pH decreases from 3.81 to 3.22. The persulfate concentration in the Test Sample decreases from 1008 to less than 50 ppm. This shows the reducing agent has effectively reacted with all the persulfate. While not wishing to be bound to any one theory, addition of reducing agent NaHS may possibly cause an increase in the amount of spiked selenite, or Se(IV), to fall out of solution or precipitate.

Test Sample 8, with Se(IV), with $Na_2S_2O_3$, in 1000 ppm Persulfate Synthetic Solution:

Test Sample 8 consists of the addition of selenite, or Se(IV), and $Na_2S_2O_3$ with persulfate in the synthetic solution. Based on the analysis of the starting spiking solution Se(IV), or selenite, the expected selenite concentration added to Test Sample 8 is 955 ppb. In the unheated sample the measured concentration of dissolved selenite is 2.98 ppb and selenate is 749 ppb. The measured total dissolved selenium concentration is 752 versus 955 ppb expected, for a difference of 203 ppb. In the heated sample the measured concentration of dissolved selenite is 2.46 ppb and selenate is 934 ppb. The measured total dissolved selenium concentration is 936 versus 955 ppb expected, for a difference of 19 ppb. For the heated sample a reasonable check is obtained between the measured total dissolved selenium and expected concentration. Results for Test Samples 5 and 8, both containing the reducing agent $Na_2S_2O_3$, are quite different with respect to the oxidation state of the dissolved selenium. Test Sample 5 is spiked with Se(VI) instead of Se(IV) and did not contain persulfate in the synthetic solution. Test Sample 5 has all dissolved selenium present as Se(IV) while Test Sample 8 has dissolved selenium primarily as Se(VI). This suggests the presence of persulfate may negate the ability of $Na_2S_2O_3$ to reduce Se(VI) to Se(IV). Another possible explanation is since there was no persulfate present in Test Sample 5 and the same concentration of reducing agent is used in both Test Samples, $Na_2S_2O_3$ is in even further excess in Test Sample 5 than in Test Sample 8 because no $Na_2S_2O_3$ is consumed by the reaction with persulfate.

In one embodiment, sodium thiosulfate ($Na_2S_2O_3$) also permits the control, mitigation and/or reduction of selenium re-emission. In one embodiment, where selenium re-emission is desired an excess of sodium thiosulfate ($Na_2S_2O_3$) is added to the ART, or at least one bleed stream therefrom. In one embodiment, an excess of about three moles per mole of persulfate ions is utilized. In another embodiment, a suitable amount of sodium thiosulfate ($Na_2S_2O_3$) as detailed above can be utilized. After heating, the ORP of the Test Sample 8 increases from 258 to 285+mV and the pH decreases from 4.15 to 2.82. The persulfate concentration in the Test Sample decreases from 1008 to less than 50 ppm. This shows the reducing agent has effectively reacted with all the persulfate.

Based on the persulfate titration determination there is determined to be an excess of $Na_2S_2O_3$ still in the heated sample. The excess is equivalent to 504 ppm of persulfate. This suggests a concentration of $Na_2S_2O_3$ less than 10.4 mM is necessary, probably closer to 6.9 mM. No precipitate is observed in the unheated sample but a light film is present in the heated sample. Addition of the selenite spike is not lost from Test Sample 8 like it is in Test Sample 7. Practically, all the spiked selenite is oxidized from Se(IV) to Se(VI). Since the concentration of soluble calcium is very similar in both Test Sample sets, and only the reducing agent is different, this suggests $Na_2S_2O_3$ has less of an impact on precipitating the selenite than NaHS.

Test Sample 9, with Se(IV), with $NH_2OH.HCl$, in 1000 ppm Persulfate Synthetic Solution:

Test Sample 9 consists of the addition of selenite, or Se(IV), and $NH_2OH.HCl$ with persulfate in the synthetic solution. Based on the analysis of the starting spiking solution Se(IV), or selenite, the expected selenite concentration added to Test Sample 9 is 955 ppb. In the unheated sample the measured concentration of dissolved selenite is 638 ppb and selenate is 6.14 ppb. The measured total dissolved selenium concentration is 644 versus 955 ppb expected, for a difference of 311 ppb. In the heated sample the measured concentration of dissolved selenite is 618 ppb and selenate is 26.5 ppb. The measured total dissolved selenium concentration is 645 versus 955 ppb expected, for a difference of 310 ppb. Similar concentrations of selenite and selenate are measured in the heated versus unheated samples. There is no precipitate observed in either the unheated or heated samples, yet there is a difference of approximately 300 ppb between the measured total dissolved selenium and expected concentrations.

Results for Test Samples 6 and 9, both containing the reducing agent $NH_2OH.HCl$, are quite different with respect to the oxidation state of the dissolved selenium. Test Sample 6 is spiked with Se(VI) instead of Se(IV) and does not contain persulfate in the synthetic solution. Test Sample 6 has, essentially, all dissolved selenium present as Se(VI) while Test Sample 9 has dissolved selenium primarily as Se(IV). These results are just the opposite of Test Samples 5 and 8, where $Na_2S_2O_3$ is used as the reducing agent. While not wishing to be bound to any one theory, this suggests $NH_2OH.HCl$ is less affected by the presence of persulfate than $Na_2S_2O_3$, and has a greater ability to prevent Se(IV) from oxidizing to Se(VI). Another possible scenario is $NH_2OH.HCl$ may have the ability to prevent Se(IV) from oxidizing to Se(VI) but does not have the ability to reduce Se(VI) to Se(IV). The persulfate concentration in Test Sample 9 decreases from 1008 to less than 50 ppm. This shows the reducing agent has effectively reacted with all the persulfate.

Still, and similar to $Na_2S_2O_3$, a threshold concentration of $NH_2OH.HCl$ may be necessary in order to change Se(VI) to Se(IV), or to prevent Se(IV) from changing to Se(VI), when persulfate are present. After heating, the ORP of Test Sample 9 increases from 505 to 520+mV and the pH decreases from 2.10 to 1.83. Essentially, addition of reducing agent $NH_2OH.HCl$ prevents the majority of the selenite from oxidizing to selenate. A portion of the spiked selenite is lost from solution, approximately 300 ppb but not to the same extent as in Test Sample 7 where NaHS is used.

Test Sample 10, Control, without Se(IV) or Se(VI), without Reducing Agent, in 2010 Filtrate:

Test Sample 10 is a control sample without the addition of Se(IV), or Se(VI), or a reducing agent. Even though there is no addition of either Se(IV), or Se(VI), to the control sample the filtrate already has selenium present. Based on the analysis of the starting solution 2010 Filtrate, the expected selenite concentration in Test Sample 10 is 2.35 ppb and selenate is 782 ppb. In the unheated sample the measured concentration of dissolved selenite is 3.32 ppb and selenate is 775 ppb. The measured total dissolved selenium concentration is 778 versus 784 ppb expected, for a difference of 6 ppb. In the heated sample the measured concentration of dissolved selenite is 2.55 ppb and selenate is 782 ppb. The measured total dissolved selenium concentration is 785 versus 784 ppb expected, for a difference of 1 ppb. Similar concentrations of selenite and selenate are measured in the heated versus unheated samples, and reasonable checks are obtained between the measured total dissolved selenium and expected concentrations for, essentially, a duplicate sample. There is no precipitate observed in either the unheated or heated samples. After heating, the ORP of the Test Sample increases from 378 to 436+mV and the pH decreases from 6.68 to 3.94. The persulfate concentration in the Test Sample decreases from 888 to 792 ppm. There is no precipitate observed in either the unheated or heated samples.

Test Sample 11, Control, with Se(IV), without Reducing Agent, in 2010 Filtrate:

Test Sample 11 is a control sample with the addition of Se(IV) but without a reducing agent. Based on the analysis of the starting spiking solution Se(IV), or selenite, and starting solution 2010 Filtrate, the expected selenite concentration in Test Sample 11 is 957 ppb and selenate is 782 ppb. In the unheated sample the measured concentration of dissolved selenite is 2.72 ppb and selenate is 1540 ppb. The measured total dissolved selenium concentration is 1543 versus 1739 ppb expected, for a difference of 196 ppb. In the heated sample the measured concentration of dissolved selenite is 2.44 ppb and selenate is 1958 ppb. The measured total dissolved selenium concentration is 1960 versus 1739 ppb expected, for a difference of 221 ppb. Similar concentrations of selenite are measured in the heated versus unheated samples. The measured selenate concentrations are different in the heated versus unheated samples, 1998 versus 1540 ppb. A similar selenium speciation trend is obtained for Test Sample 2, also spiked with Se(IV). The presence of persulfate without a reducing agent favors the formation of Se(VI) and appears to be enhanced by heating to 55° C. There is no precipitate observed in either the unheated or heated samples, yet there is a difference of approximately 200 ppb between the measured total dissolved selenium and expected concentrations. Essentially, this same difference (approximately 200 ppb) is seen for Test Sample 2, suggesting a portion of the spiked selenite is lost by precipitation reacting with soluble calcium. Soluble calcium in the 2010 Filtrate is much lower than in the synthetic solution as listed in Table 11, 851 ppm measured versus approximately 5650 ppm, but is still present very much in excess concentration relative to dissolved selenium.

TABLE 11

Elemental Analysis of 2010 Filtrate by ICP-MS, ppm

| 11 B | 23 Na | 24 Mg | 39 K | 40 Ca |
|---|---|---|---|---|
| 341 | 64 | 1204 | 19 | 851 |

After heating the ORP of the Test Sample increases from 379 to 457+mV and the pH decreases from 6.68 to 3.93. The persulfate concentration in the Test Sample decreases from 888 to 821 ppm.

Test Sample 12, with Se(IV), with NaHS, in 2010 Filtrate:

Test Sample 12 consists of the addition of selenite, or Se(IV), and NaHS with the 2010 Filtrate. Based on the analysis of the starting spiking solution Se(IV), or selenite, the expected selenite concentration added to Test Sample 12 is 955 ppb. In the unheated sample the measured concentration of dissolved selenite is 3.35 ppb and selenate is 774 ppb. The measured total dissolved selenium concentration is 777 versus 1739 ppb expected, for a difference of 962 ppb. 777 ppb is a similar concentration as measured in the starting 2010 Filtrate, 784 ppb, and the difference of 962 ppb is very close to the spiked selenite concentration of 955 ppb. In the heated sample the measured concentration of dissolved selenite is 6.65 ppb and selenate is 777 ppb. The measured total dissolved selenium concentration is 784 versus 1739 ppb expected, for a difference of 955 ppb. 955 ppb matches the spiked selenite concentration and is the same result obtained for Test Sample 7. Once again, it appears all the Se(IV) spiked addition is lost in the Test Sample. While not wishing to be bound to any one theory, this can possibly be explained by the chemical reaction where elemental sulfur is formed as a product.

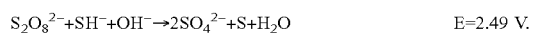

$S_2O_8^{2-} + SH^- + OH^- \rightarrow 2SO_4^{2-} + S + H_2O$      E=2.49 V.

While not wishing to be bound to any one theory, it is possible for elemental sulfur to combine with elemental selenium to form selenium disulfide, $SeS_2$. Particles are observed on the bottom of the glass test bottle. Another possibility is the selenite may have reacted with the high concentration of soluble calcium (approximately 100 ppm) in the Test Sample to form calcium selenite monohydrate ($CaSeO_3.H_2O$). $CaSeO_3.H_2O$ has a solubility product constant ($K_{sp}$) of only $1\times10^{-7.27}$ at 25° C., which indicates very low solubility. For comparison calcium fluoride ($CaF_2$) has a $K_{sp}=3.9\times10^{-11}$, having even less solubility than $CaSeO_3.H_2O$. While not to the same extent, Test Sample 2 shows a portion of the spiked selenite was lost from solution, approximately 200 ppb. After heating, the ORP of the Test Sample increases from 253 to 321+mV and the pH decreases from 7.35 to 6.85. The persulfate concentration in the Test Sample decreases from 1008 to 120 ppm. This shows the reducing agent has reacted with the majority, but not all of the persulfate. Addition of reducing agent NaHS possibly causes an increase in the amount of spiked selenite, or Se(IV), to fall out of solution or precipitate, and does not change the oxidation state of the other dissolved selenium. It remains as Se(VI).

Test Sample 13, with Se(IV), with $Na_2S_2O_3$, in 2010 Filtrate:

Test Sample 13 consists of the addition of selenite, or Se(IV), and $Na_2S_2O_3$ with the 2010 Filtrate. Based on the analysis of the starting spiking solution Se(IV), or selenite, the expected selenite concentration added to Test Sample 13 is 955 ppb. In the unheated sample the measured concentration of dissolved selenite is 461 ppb and selenate is 771 ppb. The measured total dissolved selenium concentration is 1232 versus 1739 ppb expected, for a difference of 507 ppb. No precipitate is observed in the unheated or heated samples. This suggests a portion of Se(IV) may have been reduced further with $Na_2S_2O_3$ to elemental selenium, a very volatile form, and is lost from the sample. In the heated sample the measured concentration of dissolved selenite is 3.10 ppb and selenate is 777 ppb. The measured total dissolved selenium concentration is 780 versus 1739 ppb expected, for a difference of 959 ppb. 780 ppb is a similar concentration as measured in the starting 2010 Filtrate, 784 ppb, and the difference of 959 ppb is very close to the spiked selenite concentration of 955 ppb. Following heating the remaining Se(IV) may have been reduced further with $Na_2S_2O_3$ to elemental selenium, a very volatile form, and is lost from the sample. If this is what is happening, re-emission of elemental selenium is not desired for commercial application purposes.

Even though a precipitate is not observed in the unheated or heated samples, it does not mean there was not a precipitate. The amount of precipitate may have been very slight and hard to see. If this is the case, then for the same reason as for Test Samples 7 and 12, selenite may have reacted with the high concentration of soluble calcium (approximately 100 ppm) in Test Sample 13 to form calcium selenite monohydrate ($CaSeO_3.H_2O$). Heating the sample caused additional spiked selenite to precipitate. After heating, the ORP of Test Sample 13 increases from 253 to 321+mV and the pH decreases from 6.77 to 3.81. The persulfate concentration in the Test Sample decreases from 888 to less than 50 ppm. This shows the reducing agent has effectively reacted with all the persulfate.

Based on the persulfate titration determination it is determined that an excess of $Na_2S_2O_3$ exists in the heated sample. The excess is equivalent to 552 ppm of persulfate. This suggests a concentration of $Na_2S_2O_3$ less than 10.4 mM is necessary, probably closer to 6.4 mM. Addition of reducing agent $Na_2S_2O_3$ possibly causes an increase in the amount of spiked selenite, or Se(IV), to fall out of solution or precipitate, and does not change the oxidation state of the other dissolved selenium. It remained as Se(VI). Heating the sample causes additional spiked selenite to precipitate.

Test Sample 14, with Se(IV), with $NH_2OH.HCl$, in 2010 Filtrate:

Test Sample 14 consists of the addition of selenite, or Se(IV), and $NH_2OH.HCl$, with the 2010 Filtrate. Based on the analysis of the starting spiking solution Se(IV), or selenite, the expected selenite concentration added to Test Sample 14 is 955 ppb. In the unheated sample the measured concentration of dissolved selenite is 682 ppb and selenate is 790 ppb. The measured total dissolved selenium concentration is 1472 versus 1739 ppb expected, for a difference of 267 ppb. In the heated sample the measured concentration of dissolved selenite is 667 ppb and selenate is at 800 ppb. The measured total dissolved selenium concentration is 1467 versus 1739 ppb expected, for a difference of 272 ppb. Similar concentrations of selenite and selenate are measured in the heated versus unheated samples. The measured selenate concentrations in the unheated and heated samples are close to the selenate concentration measured in the 2010 Filtrate. There is no precipitate observed in either the unheated or heated samples, yet there is a difference of approximately 270 ppb between the measured total dissolved selenium and expected concentrations. These results are similar to those obtained for Test Sample 9.

Even though a precipitate is not observed in the unheated or heated samples, it does not mean there is not a precipitate. The amount of precipitate may have been very slight, and hard to see. If this is the case, then for the same reason as for Test Samples 7, 12, and 13, selenite may have reacted with the high concentration of soluble calcium (approximately 100 ppm) in Test Sample 14 to form calcium selenite monohydrate ($CaSeO_3.H_2O$). Heating the sample does not cause additional spiked selenite to precipitate as with Test Sample 13. After heating, the ORP of Test Sample 14 decreases slightly from 476 to 453+mV and the pH decreases from 2.19 to 2.09. The persulfate concentration in Test Sample 14 decreases from 1008 to less than 50 ppm. This shows the reducing agent has effectively reacted with all the persulfate.

Based on the persulfate titration determination it is determined that there is an excess of $NH_2OH.HCl$ still in the heated sample. The excess is equivalent to 480 ppm of persulfate. This suggests a concentration of $NH_2OH.HCl$ of less than 12.1 mM is necessary, probably closer to 7.9 mM.

The difference between the measured total dissolved selenium and expected concentration is 196 ppb for Test Sample 11, the control sample. For Test Sample 14 the difference is slightly higher at 267 and 272 ppb, respectively, for the unheated and heated samples. Heating the sample does not cause additional spiked selenite to precipitate. Addition of the reducing agent $NH_2OH.HCl$ possibly causes an increase in the amount of spiked selenite, or Se(IV), to fall out of solution or precipitate, and does not change the oxidation state of the other dissolved selenium. It remains as Se(VI). Essentially, addition of the reducing agent $NH_2OH.HCl$ prevents the majority of the selenite from oxidizing to selenate.

Comparison Results for Reducing Agents and their Effect on Selenium Speciation:

Specific observations for the Test Samples having a reducing agent at just one concentration are: (1) three reducing agents are evaluated without the presence of persulfate, with the addition of selenate $(Se(VI)O_4^{2-})$, and in a synthetic solution, Test Samples 4 through 6. Only, $Na_2S_2O_3$ has the ability to change selenate $(Se(VI)O_4^{2-})$ to selenite $(Se(IV)O_3^{2-})$, and is not affected by heating. This result may be concentration dependent because there is no persulfate present to consume any of the $Na_2S_2O_3$; (2) the three reducing agents are evaluated in the presence of persulfate, with the addition of selenite $(Se(IV)O_3^{2-})$, and in a synthetic solution, Test Samples 7 through 9. All the selenite is lost using NaHS. Essentially, all the selenite is changed to selenate using $Na_2S_2O_3$. A portion of the selenite is lost but the remaining dissolved selenium exists unchanged as selenite $(Se(IV)O_3^{2-})$ using $NH_2OH.HCl$ and is not affected by heating; and (3) the three reducing agents are evaluated in the presence of persulfate, with the addition of selenite $(Se(IV)O_3^{2-})$, and in 2010 Filtrate, Test Samples 12 through 14. Essentially, all the selenite is lost using NaHS. Only a portion of the selenite is lost in the unheated sample, but, essentially, all the selenite is lost in the heated sample using $Na_2S_2O_3$. A portion of the selenite is lost but the remaining dissolved selenium exists unchanged as selenite $(Se(IV)O_3^{2-})$ using $NH_2OH.HCl$ and is not affected by heating. Also the absolute concentration of dissolved selenite, 667 ppb, matches closely to the result using the synthetic solution with persulfate, 618 ppb, and $NH_2OH.HCl$.

Figure 56:
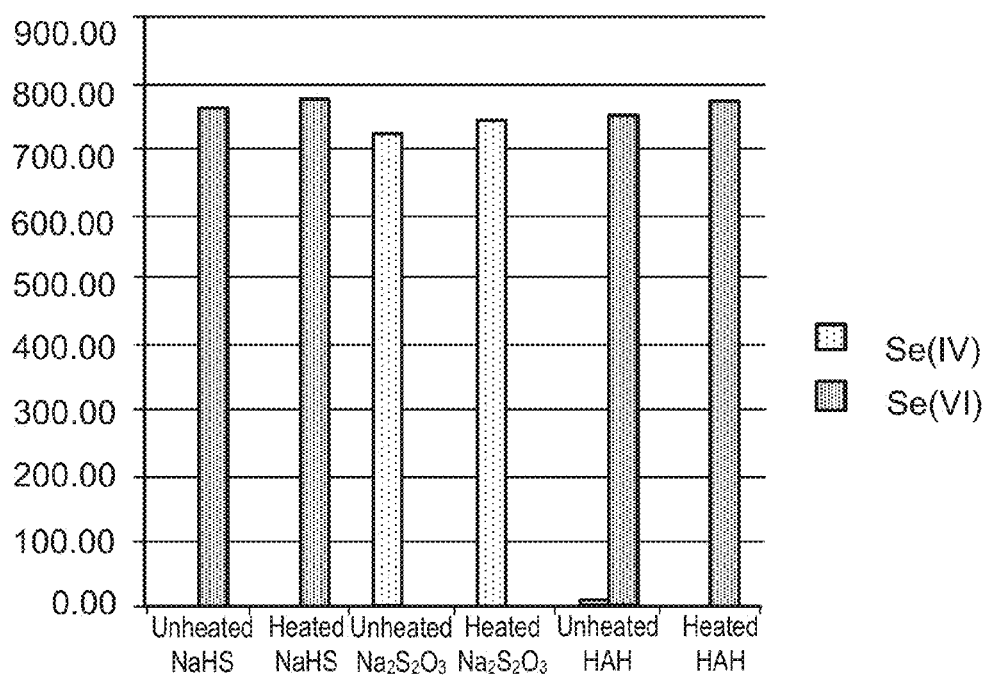
FIG. 56 is a graph comparing reducing agents without persulfate 742 ppb of selenite (expected) in the synthetic solution.
Figure 57:
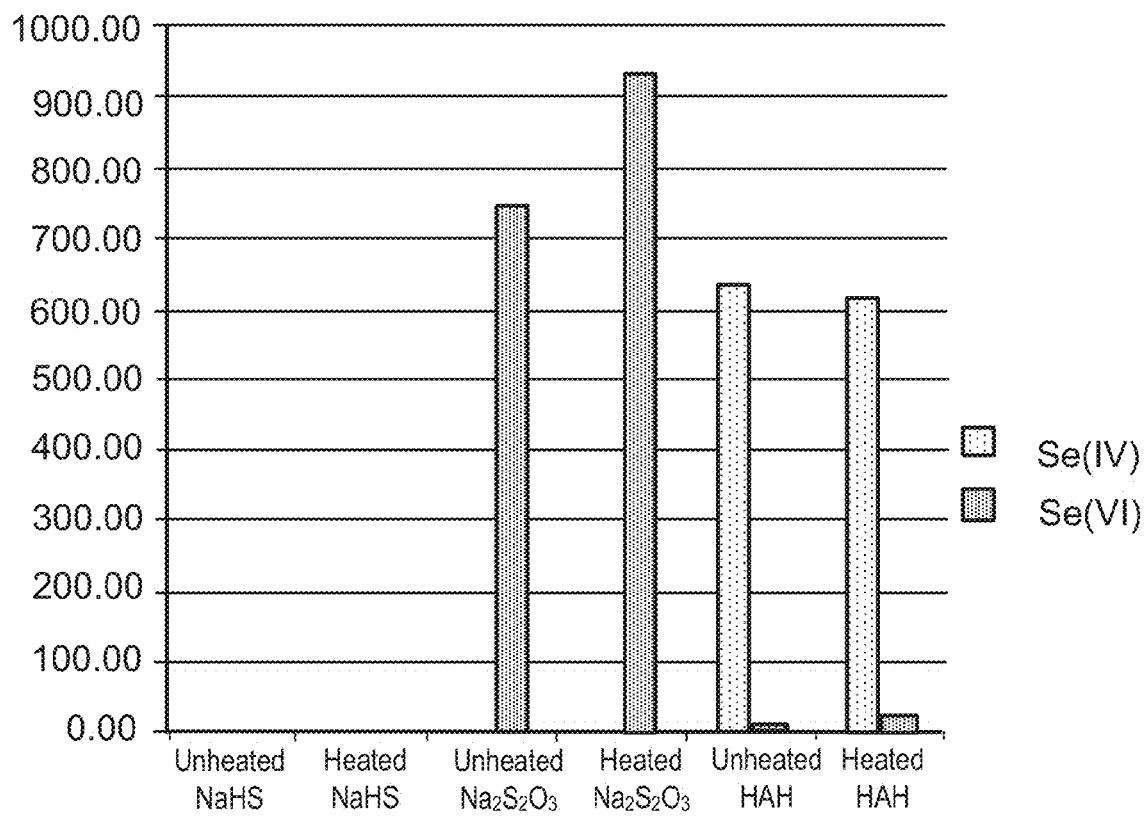
FIG. 57 is a graph comparing reducing agents with persulfate spiked with 955 ppb selenite (expected) in the synthetic solution.
Figure 58:
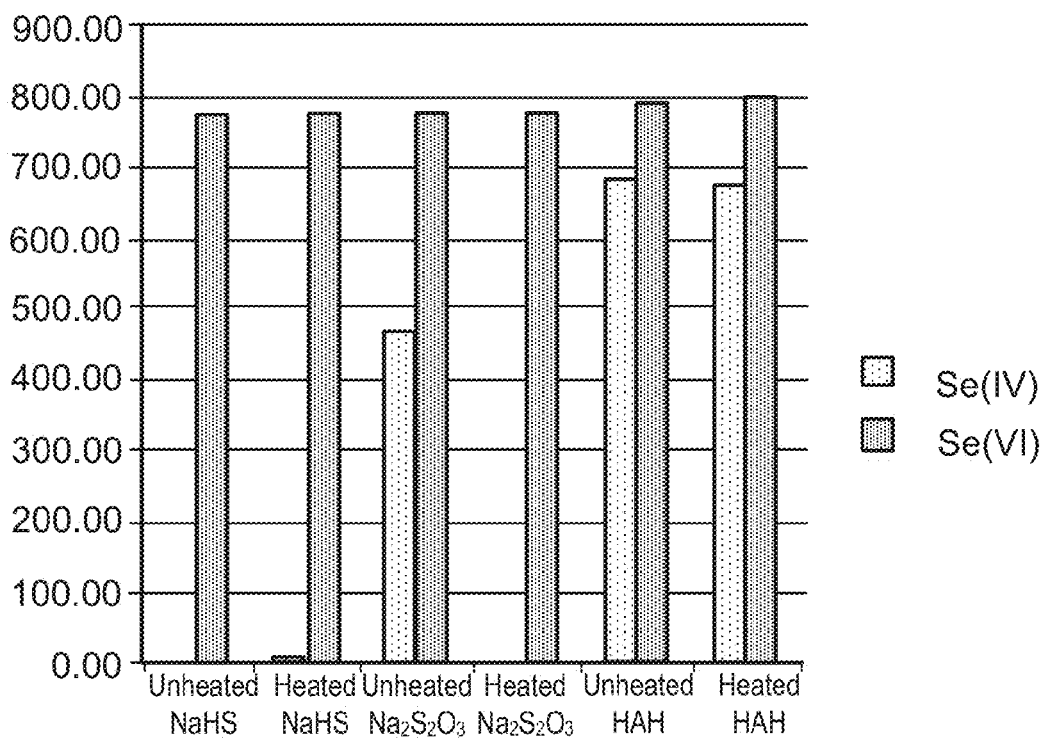
FIG. 58 is a graph comparing reducing agents spiked with 955 ppb selenite in the 2010 Filtrate (782 ppb selenite)

Based on the results for this portion of the specification, several general conclusions are reached: (1) the presence of persulfate $(S_2O_8^{2-})$ or peroxydisulfate in solution affects the oxidation state of selenium favoring the formation of selenate $(Se(VI)O_4^{2-})$. This means selenite $(Se(IV)O_3^{2-})$ will be changed to selenate $(Se(VI)O_4^{2-})$ while selenate $(Se(VI)O_4^{2-})$ will remain unchanged; (2) heating a Test Sample from ambient temperature to 55° C. for fifteen hours in the presence of persulfate increases the amount of selenite $(Se(IV)O_3^{2-})$ oxidized to selenate $(Se(VI)O_4^{2-})$; and (3) the measured total dissolved selenium and expected concentration is reasonable for the all the Test Samples, Test Samples 3 through 6, spiked with selenate $(Se(VI)O_4^{2-})$. This is not the case for the Test Samples spiked with selenite $(Se(IV)O_3^{2-})$ and is believed to be related to the low solubility of $CaSeO_3.H_2O$. More specifically, based on the results obtained for the Test Samples containing the individual reducing agents the following conclusions are reached: (1) three reducing agents are evaluated without the presence of persulfate, with the addition of selenate $(Se(VI)O_4^{2-})$, and in a synthetic solution, Test Samples 4 through 6. Only, $Na_2S_2O_3$ has the ability to change selenate $(Se(VI)O_4^{2-})$ to selenite $(Se(IV)O_3^{2-})$ and is not affected by heating. This result may be concentration dependent because there is no persulfate present to consume any of the $Na_2S_2O_3$; (2) three reducing agents are evaluated in the presence of persulfate, with the addition of selenite $(Se(IV)O_3^{2-})$, and in a synthetic solution, Test Samples 7 through 9. All the selenite is lost using NaHS which is believed to be due to precipitation. Essentially, all the selenite is changed to selenate using $Na_2S_2O_3$. A portion of the selenite is lost but the remaining dissolved selenium exists unchanged as selenite $(Se(IV)O_3^{2-})$ using $NH_2OH.HCl$ and is not affected by heating; and (3) three reducing agents are evaluated in the presence of persulfate, with the addition of selenite $(Se(IV)O_3^{2-})$, and in 2010 Filtrate, Test Samples 12 through 14. Essentially all the selenite is lost using NaHS which is believed to be due to precipitation. Only, a portion of the selenite is lost in the unheated sample, but, essentially, all the selenite is lost in the heated sample using $Na_2S_2O_3$. A portion of the selenite is lost but the remaining dissolved selenium exists unchanged as selenite $(Se(IV)O_3^{2-})$ using $NH_2OH.HCl$ and is not affected by heating. Also the absolute concentration of dissolved selenite, 667 ppb, matches closely to the result using the synthetic solution with persulfate, 618 ppb, and $NH_2OH.HCl$. The results from this portion of the specification illustrate that it is possible to alter the oxidation state of selenium in an ART through the use of one or more of the reducing agents disclosed herein, thus obtaining the more desired form, selenite $(Se(IV)O_3^{2-})$, for waste water treatment. Also, it was observed that NaHS can precipitate selenite $(Se(IV)O_3^{2-})$. Turning to FIGS. 56 through 58, these Figures are graphs illustrating various results from this portion of the specification.

Evaluation of Reducing Agents and their Potential Effect on Mercury Re-Emission in a WFGD Absorber Recirculation Tank (ART):

It has been found that the amount of dissolved mercury increases as the oxidation-reduction potential (ORP) of the absorber recirculation tank (ART) slurry, or solution, increases. Ionized mercury or $Hg^{2+}$ is stable in the ART slurry, or solution, meaning the potential for volatilization or re-emission of mercury is very low. It makes sense that a more oxidizing environment, higher ORP, in the ART slurry, or solution, tends to favor more mercury existing in its fully oxidized and stable state of $Hg^{2+}$. Several reducing agents are evaluated herein to determine their effectiveness at reacting with persulfate and lowering oxidation-reduction potential (ORP). Three reducing agents above are studied to determine their effectiveness at preventing precipitation of manganese and their effect on the oxidation state of selenium in batch bench-scale studies.

For the bench-scale study on manganese precipitation results show that both sodium thiosulfate and HAH are effective at preventing precipitation of manganese in Test Samples containing persulfate while sodium hydrosulfide does not prevent manganese precipitation. Also, based on the mM concentration necessary to react completely with approximately 1000 ppm persulfate, sodium thiosulfate is found to be the most effective reducing agent followed by HAH and then sodium hydrosulfide.

The above study on selenium speciation results shows the presence of persulfate $(S_2O_8^{2})$ or peroxydisulfate in solution affects the oxidation state of selenium favoring the formation of selenate $(Se(VI)O_4^{2-})$. Also heating a Test Sample from ambient temperature to 55° C. for 15 hours in the presence of persulfate increases the amount of selenite $(Se(IV)O_3^{2-})$ oxidized to selenate $(Se(VI)O_4^{2-})$. When reducing agents are used $Na_2S_2O_3$ has the ability to change selenate $(Se(VI)O_4^{2-})$ to selenite $(Se(IV)O_3^{2-})$ without the presence of persulfate and is not affected by heating. This result may be concentration dependent because there is no persulfate present to consume any of the $Na_2S_2O_3$. In the presence of persulfate all the selenite is lost using NaHS which is believed to be due to precipitation. Essentially all the selenite is changed to selenate using $Na_2S_2O_3$. A portion of the selenite is lost but the remaining dissolved selenium exists unchanged as selenite ($Se(IV)O_3^{2-}$) using $NH_2OH \cdot HCl$ and is not affected by heating. The results from this portion of the specification shows the possibility of altering the oxidation state of selenium in an ART through the use of reducing agents to obtain the more desired form of selenium, selenite ($Se(IV)O_3^{2-}$), for waste water treatment. Also it is observed that NaHS can precipitate selenite ($Se(IV)O_3^{2-}$).

Now, the same three reducing agents are evaluated to determine their effect on mercury re-emission using two different test solutions containing persulfate, a synthetic solution and 2010 ART Filtrate. It has been found addition of a reducing agent tends to lower the ORP of a Test Sample. Therefore, addition of a reducing agent to an ART may have the effect of altering the oxidation state of mercury and increasing the potential for formation of elemental mercury and subsequent re-emission of mercury.

Mercury Spiking Experiments:

Three reducing agents, sodium hydrosulfide (NaHS), sodium thiosulfate ($Na_2S_2O_3$) and HAH ($NH_2OH \cdot HCl$) are evaluated for their effect on mercury re-emission in two test solutions containing persulfate: (i) a laboratory prepared or synthetic solution; and (ii) 2010 ART Filtrate. Both test solutions contain persulfate at an approximate concentration of 1000 ppm. Two synthetic solutions are prepared with $CaCl_2$ at 10000 ppm chloride (5650 ppm Ca). Certified ACS Grade $CaCl_2 \cdot 2H_2O$ is used to prepare the synthetic solutions. One of the synthetic solutions has 1000 ppm persulfate ($S_2O_8^{2-}$) and the other contains no persulfate and serves as a control. Persulfate is added as sodium peroxydisulfate, or persulfate, 98 percent purity (purchased from Alpha Aesar). The sequence of addition is the reducing agent is added to the test solution and the mercury spike solution is added last. The reason for this sequence of addition is to prevent reaction of the mercury spike solution with only the reducing agent. The test concentration of mercury, added as $HgCl_2$, is calculated at 100 ppb, the approximate concentration typically found in ART filtrate samples where mercury re-emission is not occurring, but is coal dependent.

The concentration of each reducing agent added depends on the amount determined necessary from previous testing to chemically react completely with the concentration of persulfate present, near 1000 ppm, in each test solution. For NaHS the amount added is at a concentration of 24.2 mM. The mM concentration of persulfate at 1000 ppm is equal to 5.2 mM. Hydrosulfide ($HS^-$) is the reacting species with persulfate. Theoretically, the chemical reaction between hydrosulfide and persulfate should occur at a mole ratio of 1.0, but instead occurs at mole ratio $HS^-/S_2O_8^{2-}$ between 4 to 5. It is believed the protonated form of hydroxylamine, $NH_3OH^+$, is the reacting species with persulfate. The chemical reaction between $NH_3OH^+$ and persulfate should occur at mole ratio of 2.0 and requires a 10.4 mM concentration of HAH ($NH_2OH \cdot HCl$). It is found a 9.1 mM concentration of HAH is necessary for the synthetic solution and a higher 12.1 mM concentration for the 2010 ART Filtrate. The chemical reaction between thiosulfate and persulfate should occur at a mole ratio of 2.0 and requires a 10.4 mM concentration of $Na_2S_2O_3$. This is the concentration of $Na_2S_2O_3$ used in this portion of the specification.

Initially, each 190 gram Test Sample is prepared by first adding the calculated and weighed amount of reducing agent into an individual 250 mL wide mouth Nalgene bottle followed by the appropriate amount and type of test solution, and finally the mercury spike solution. ORP and pH are determined on each of the control test solutions and samples at ambient temperature. After the measurements, two 90 gram split samples of each test solution are transferred into 125 mL clear glass 1-Chem bottles. Test Set A is allowed to sit at ambient temperature while Test Set B is heated to 55° C. Following heating at 55° C. for 15 hours the samples are allowed to cool to room temperature, and the ORP and pH are measured on the control and Test Samples for both Test Sets and the results are listed in Table 12 below. Persulfate concentrations are measured by titration method on the synthetic solution and 2010 ART Filtrate to determine their starting concentrations and on all the Test Samples following heating where persulfate has been added. Each of the control and Test Samples of both Test Sets are sent to Southern Research Institute (SRI) for dissolved mercury analysis using EPA Method 1631e, Mercury in Water, Oxidation, Purge and Trap, and Cold Vapor Atomic Fluorescence Spectrometry. No sample preservation is necessary. Also, for the Test Samples where a precipitate is observed, total mercury analysis is performed.

TABLE 12

Test Results for Effect of Various Reducing Agents On Mercury Re-Emission

| | | Unheated | | | | | | Heated | | | | | |
|---|---|---|---|---|---|---|---|---|---|---|---|---|---|
| Reducing Agent | Test | ORP (+mV) | pH | Hg, sol. (ppb) | Hg Total (ppb) | $S_2O_8^{2-}$ (ppm) | Precipitate | ORP (+mV) | pH | Hg, sol. (ppb) | Hg Total (ppb) | $S_2O_8^{2-}$ (ppm) | Precipitate |
| Synthetic Solution | | | | | | 1008 | | | | | | | |
| Control without Hg without Persulfate w/o reducing agent | 1 | 466 | 5.89 | 0.001 | | | N | 461 | 8.00 | 0.002 | | | N |
| Control with Hg without Persulfate w/o reducing agent | 2 | 462 | 4.39 | 43.6 | | | N | 454 | 4.75 | 94.7 | | | N |
| NaHS with Hg without Persulfate | 3 | −413 | 10.21 | 0.793 | 53.7 | | Y, light green tint, very slight ppt. | −376 | 7.71 | 0.211 | 49.2 | | Y, light green tint, very slight ppt. |
| $Na_2S_2O_3$ with Hg without Persulfate | 4 | 45 | 5.90 | 0.791 | | | N | 81 | 6.25 | 0.467 | | | N |

TABLE 12-continued

Test Results for Effect of Various Reducing Agents On Mercury Re-Emission

| | | Unheated | | | | | | Heated | | | | | |
|---|---|---|---|---|---|---|---|---|---|---|---|---|---|
| Reducing Agent | Test | ORP (+mV) | pH | Hg, sol. (ppb) | Hg Total (ppb) | $S_2O_8^{2-}$ (ppm) | Precipitate | ORP (+mV) | pH | Hg, sol. (ppb) | Hg Total (ppb) | $S_2O_8^{2-}$ (ppm) | Precipitate |
| NH$_2$OH•HCl with Hg without Persulfate | 5 | 120 | 3.99 | 36.2 | | | N | 132 | 3.86 | 71.6 | | | N |
| Control without Hg with Persulfate w/o reducing agent | 6 | 326 | 6.19 | 0.039 | | | N | 1005 | 3.26 | 2.92 | 2.97 | 888 | Y, light brown tint, small amt. ppt. |
| Control with Hg with Persulfate w/o reducing agent | 7 | 374 | 4.32 | 104 | | | N | 1033 | 3.18 | 112 | 98.0 | 888 | Y, light brown tint, small amt. ppt. |
| NaHS (Sodium Hydrosulfide) with Persulfate and Hg | 8 | 308 | 5.66 | 3.47 | 34.2 | | Y, large amt. of ppt. | 621 | 3.11 | 5.75 | 127 | <50 | Y, large amt. ppt., small particles floating |
| Na$_2$S$_2$O$_3$ (Sodium Thiosulfate) with Persulfate and Hg | 9 | 124 | 5.57 | 91.8 | | | N | 318 | 3.02 | 81.4 | 93.3 | <50* | Y, small amt. ppt. |
| NH$_2$OH•HCl (Hydroxylamine Hydrochloride) with Persulfate and Hg | 10 | 428 | 2.73 | 94.2 | | | N | 486 | 1.94 | 1.12 | | 48 | N |
| 2010 ART Filtrate | | | | | | 888 | | | | | | | |
| Control without Hg w/o reducing agent | 11 | 344 | 6.66 | 27.7 | | | N | 399 | 4.99 | 28.4 | | 792 | N |
| Control with Hg w/o reducing agent | 12 | 334 | 6.57 | 133 | | | N | 397 | 4.40 | 125 | | 792 | N |
| NaHS (Sodium Hydrosulfide) with Hg | 13 | 263 | 7.43 | 12.4 | 115 | | Y, large amount of ppt. | 263 | 7.27 | 31.5 | 212 | <50 | Y, large amt. ppt. |
| Na$_2$S$_2$O$_3$ (Sodium Thiosulfate) with Hg | 14 | 121 | 6.63 | 120 | | | N | 259 | 4.83 | 93.3 | | <50* | N |
| NH$_2$OH•HCl (Hydroxylamine Hydrochloride) with Hg | 15 | 393 | 3.00 | 115 | | | N | 461 | 2.07 | 119 | | <50 | N |

*Based on the persulfate titration results the amount of Na$_2$S$_2$O$_3$ required to react with the persulfate present in the sample was in excess by 40 to 60%.

Figure 59:
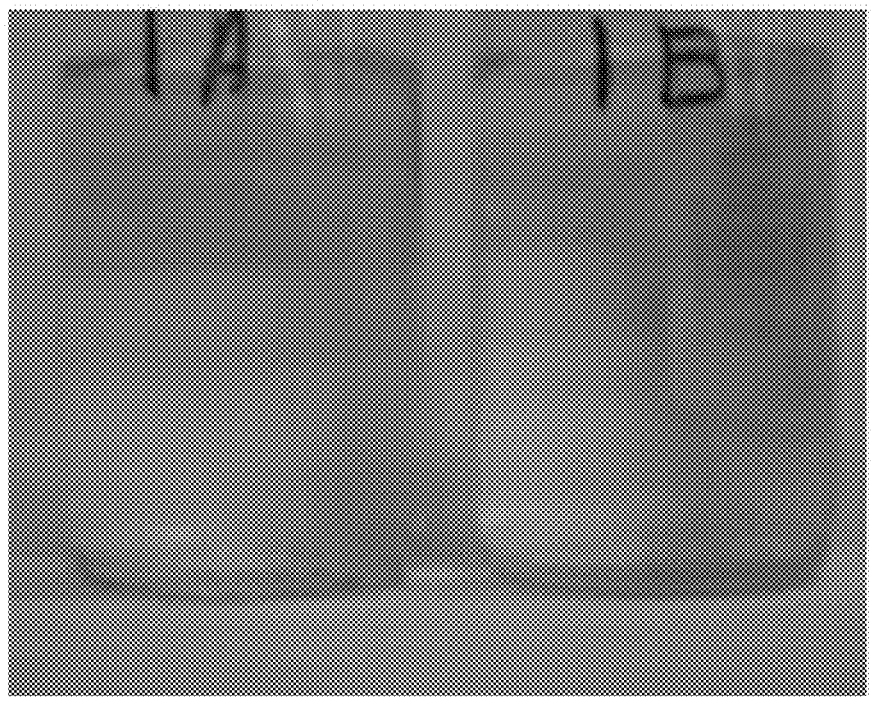
FIG. 59 is a photo comparing the heated and unheated of Test Sample 1.

Test Sample 1, Control, without Hg, without Reducing Agent, without Persulfate in Synthetic Solution:

Test Sample 1 is a control sample without the addition of mercury or a reducing agent or persulfate. Certified ACS Grade CaCl$_2$.2H$_2$O is used to prepare the synthetic solution and mercury is measured at a very low concentration of 0.002 ppb in the 10000 ppm chloride stock solution not containing persulfate. There is no color change or precipitate observed in either Test Sample as shown in FIG. 59. Here and in the following photographs the "B" sample is the heated sample. After heating, the ORP of the Test Sample remains essentially constant, 466 to 461+mV, and the pH increases slightly from 5.89 to 6.00.

Test Sample 2, Control, with Hg, without Reducing Agent, without Persulfate in Synthetic Solution:

Test Sample 2 is a control sample with the addition of mercury but without a reducing agent or persulfate. The soluble mercury concentration measured in the unheated and heated Test Samples is 43.6 and 94.7 ppb, respectively. The large difference in soluble mercury concentration for the samples cannot be explained. Heating a sample should create the possibility of some mercury loss, yet the heated sample has a greater concentration of soluble mercury. The calculated concentration of soluble mercury added to the Test Samples is 100 ppb, and the heated sample is just slightly below this expected concentration.

Figure 60:
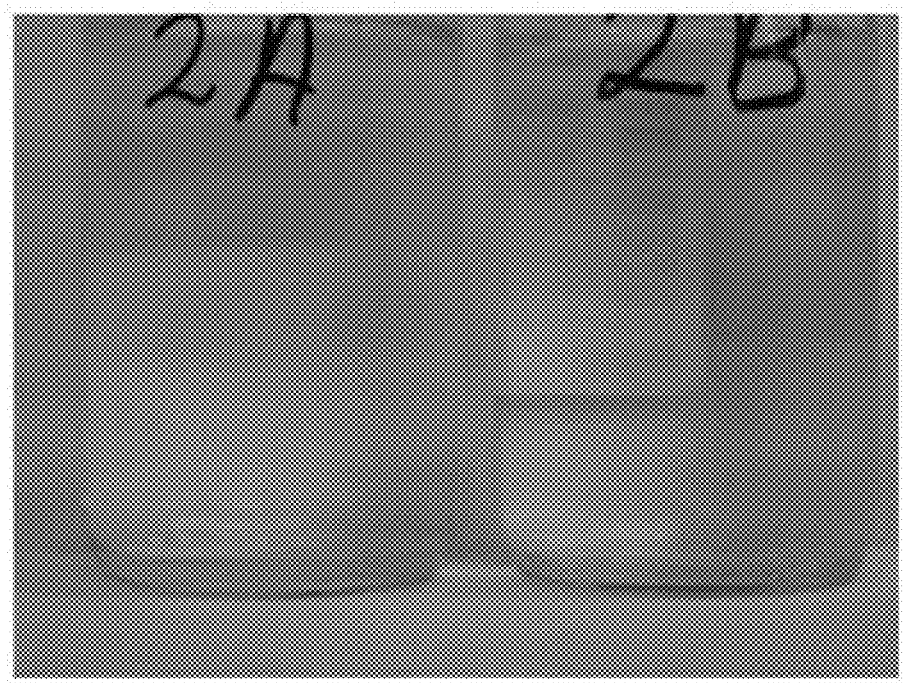
FIG. 60 is a photo comparing the heated and unheated of Test Sample 2.

There is no color change or precipitate observed in either Test Sample as shown in FIG. 60. After heating, the ORP of the Test Sample remains essentially constant, 462 to 454+ mV, and the pH increases slightly from 4.39 to 4.75.

Figure 61:
FIG. 61 is a photo comparing the heated and unheated of Test Sample 3.

Test Sample 3, Control, with Hg, with NaHS, without Persulfate in Synthetic Solution:

Test Sample 3 is a control sample with the addition of mercury and NaHS but without persulfate in the synthetic solution. The soluble mercury concentration measured in the unheated and heated Test Samples is 0.79 and 0.21 ppb, respectively. These values represent a significant loss of soluble mercury from the expected concentration of approximately 100 ppb. Also, since very slight precipitates are observed in both Test Samples and thus total mercury analysis is performed. The total mercury concentration measured in the unheated and heated Test Samples is 53.7 and 49.2 ppb, respectively. Based on the total mercury values most of the retained mercury has precipitated. However, there is still approximately a 50 percent loss of mercury unaccounted for in both samples. While not wishing to be bound to any one theory, the loss can possibly be attributed to the reduction of ionized mercury to the elemental state, and subsequent loss by volatilization. There was a light green tint color and a very slight precipitate formed in both the unheated and heated samples as shown in FIG. 61. After heating, the ORP of the Test Sample increases from −413 to −376 mV and the pH decreases from 10.21 to 7.71. A negative millivolt reading for ORP represents a reducing solution environment and is the only Test Sample with a negative ORP. It should be noted that for the Test Samples where reducing agent is added, the same concentration of each reducing agent is added whether persulfate is present or not. This means for the Test Samples not containing persulfate the concentration of unreacted reducing agent is greater.

Figure 62:
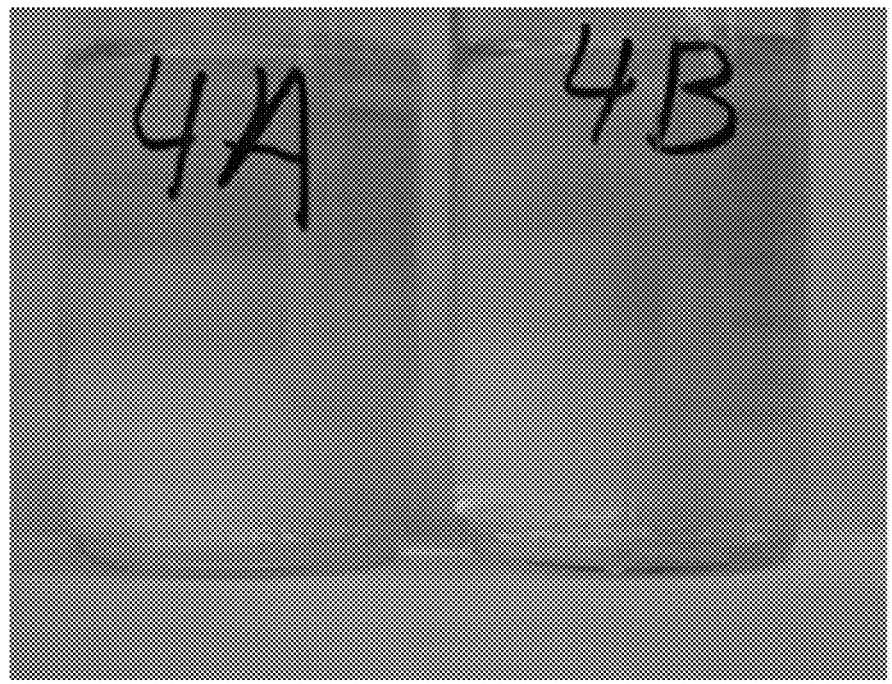
FIG. 62 is a photo comparing the heated and unheated of Test Sample 4.

Test Sample 4, Control, with Hg, with $Na_2S_2O_3$, without Persulfate in Synthetic Solution:

Test Sample 4 is a control sample with the addition of mercury and $Na_2S_2O_3$ but without persulfate in the synthetic solution. The soluble mercury concentration measured in the unheated and heated Test Samples is 0.79 and 0.47 ppb, respectively. These values represent a significant loss of soluble mercury from the expected concentration of approximately 100 ppb. While not wishing to be bound to any one theory, the loss can possibly be attributed to reduction of ionized mercury to the elemental state, and subsequent loss by volatilization. There is no color change or precipitate observed in either Test Sample as shown in FIG. 62. After heating, the ORP of the Test Sample increases from 45 to 81+mV and the pH increases slightly from 5.90 to 6.25.

Test Sample 5, Control, with Hg, with $NH_2OH.HCl$, without Persulfate in Synthetic Solution:

Test Sample 5 is a control sample with the addition of mercury and $NH_2OH.HCl$ but without persulfate in the synthetic solution. The soluble mercury concentration measured in the unheated and heated Test Samples is 36.2 and 71.6 ppb, respectively. The large difference in soluble mercury concentration for the samples cannot be explained. Heating a sample should create the possibility of some mercury loss, yet the heated sample has a greater concentration of soluble mercury. This same trend is observed for Test Sample 2. These values represent a significant loss of soluble mercury from the expected concentration of approximately 100 ppb. While not wishing to be bound to any one theory, the loss can possibly be attributed to reduction of ionized mercury to the elemental state, and subsequent loss by volatilization.

Figure 63:
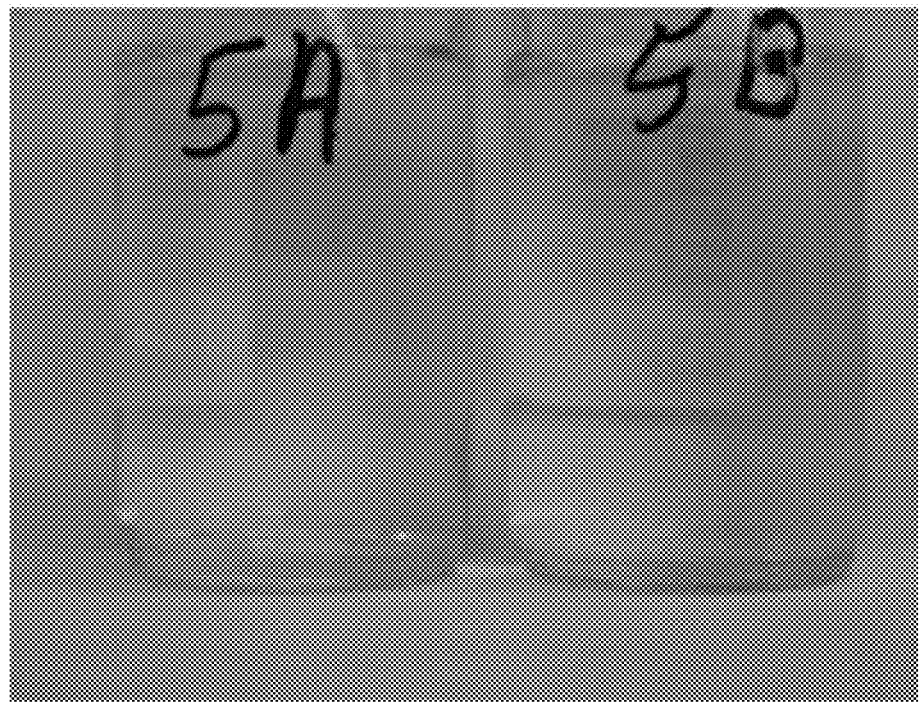
FIG. 63 is a photo comparing the heated and unheated of Test Sample 5.

There is no precipitate observed in either the unheated or heated samples as shown in FIG. 63. After heating, the ORP of the Test Sample increases from 120 to 132+mV and the pH decreases slightly from 3.99 to 3.86. ORP is higher in Test Sample 5 compared to Test Samples 3 and 4 and has the greatest concentration of retained soluble mercury.

Test Sample 6, Control, without Hg, without Reducing Agent, in 1000 ppm Persulfate Synthetic Solution:

Test Sample 6 is a control sample without the addition of mercury or a reducing agent but with persulfate in the synthetic solution. The soluble mercury concentration measured in the unheated and heated Test Samples is 0.04 and 2.92 ppb, respectively. It is expected the soluble mercury concentration would be very low in the 10000 ppm chloride stock solution containing persulfate. However, a greater concentration is measured for this Test Sample compared to Test Sample 1. Also since a precipitate is observed in the heated Test Sample total mercury analysis is performed. The total mercury concentration measured in the heated Test Sample is 2.97 ppb. Based on the total mercury value most of the mercury is present as soluble mercury.

Figure 64:
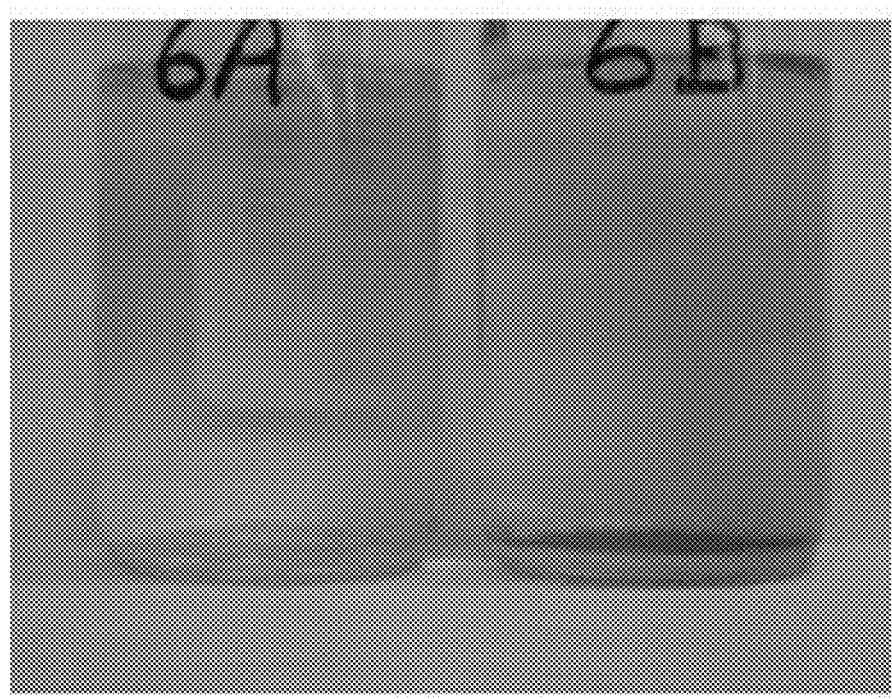
FIG. 64 is a photo comparing the heated and unheated of Test Sample 6.

There is no color change or precipitate observed in the unheated Test Sample but there was a light brown color tint and a brown precipitate formed in the heated sample as shown in FIG. 64. After heating, the ORP of the Test Sample increases from 326 to 1005+mV and the pH decreases from 6.19 to 3.26.

The persulfate concentration in the control Test Sample decreases from 1008 to 888 ppm. These persulfate values are significant because it shows that when persulfate is heated to 55° C., the approximate temperature of an ART, it slowly decomposes. In earlier examples, heating samples with similar persulfate concentrations to 80° C. for 15 hours decomposed all the persulfate. By heating the test solutions to just 55° C., the effectiveness of the reducing agent to decompose persulfate can also be determined because at 55° C. persulfate decomposition is not influenced as greatly by the effect of heating.

Test Sample 7, Control, with Hg, without Reducing Agent, in 1000 ppm Persulfate Synthetic Solution:

Test Sample 7 was a control sample with the addition of mercury but without a reducing agent, and with persulfate in the synthetic solution. The soluble mercury concentration measured in the unheated and heated Test Samples was 104 and 112 ppb, respectively, and is close to the expected concentration of 100 ppb. The heated sample has a higher soluble mercury concentration, and this same trend was observed for Test samples 2 and 5. Also, since precipitate was observed in the heated Test Sample total mercury analysis was performed. The total mercury concentration measured in the heated Test Sample was 98 ppb. Based on the total mercury value all of the mercury is present as soluble mercury.

Figure 65:
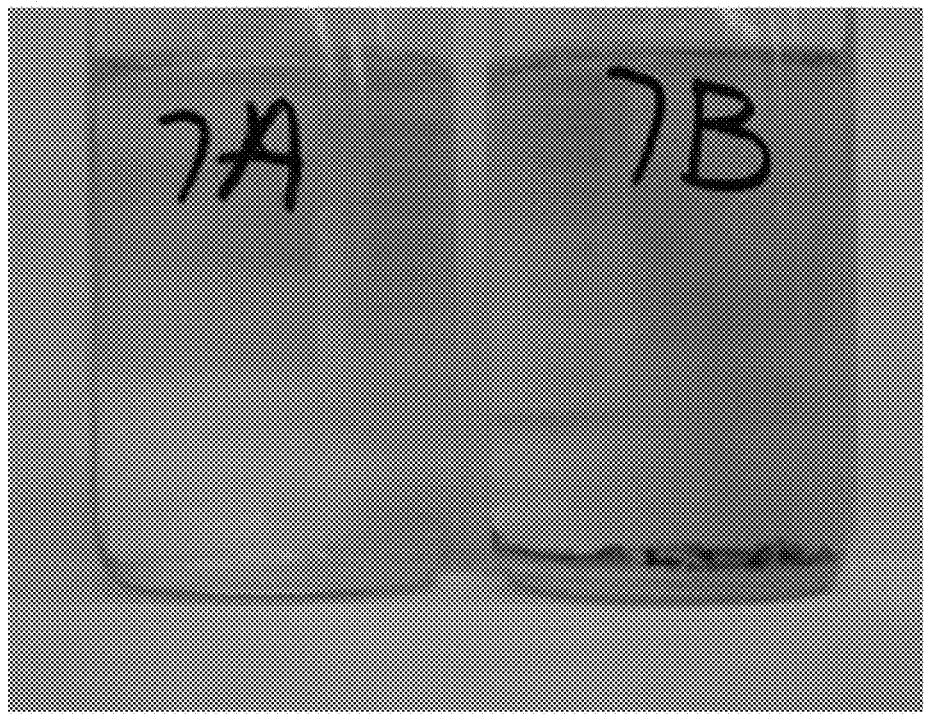
FIG. 65 is a photo comparing the heated and unheated of Test Sample 7.

There is no color change or precipitate observed in the unheated Test Sample but there is a light brown color tint and a brown precipitate formed in the heated sample as shown in FIG. 65. After heating, the ORP of the Test Sample increases from 374 to 1033+mV and the pH decreases from 4.32 to 3.18. The persulfate concentration in the control Test Sample decreases from 1008 to 888 ppm and this result is similar to Test Sample 6.

Test Sample 8, with Hg, with NaHS, in 1000 ppm Persulfate Synthetic Solution:

Test Sample 8 consists of the addition of mercury and NaHS with persulfate in the synthetic solution. The soluble mercury concentration measured in the unheated and heated Test Samples is 3.47 and 5.75 ppb, respectively. These values represent a significant loss of soluble mercury from the expected concentration of approximately 100 ppb. Also precipitates are observed in both the unheated and heated Test Samples and a total mercury analysis is performed. The total mercury concentration measured in the unheated and heated Test Samples is 34.2 and 127 ppb, respectively. Based on the total mercury value most of the retained mercury has precipitated. However, there is still approximately a 66 percent loss of mercury unaccounted for in the unheated sample. The loss can possibly be attributed to reduction of ionized mercury to the elemental state and subsequent loss by volatilization. The heated sample has a total mercury concentration much closer to the expected value of 100 ppb.

Figure 66:
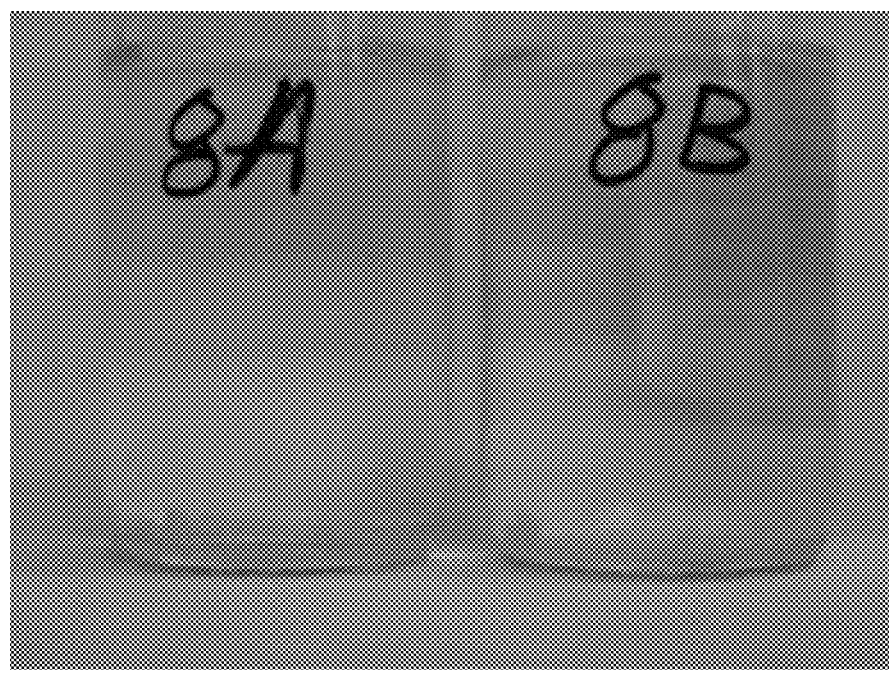
FIG. 66 is a photo comparing the heated and unheated of Test Sample 8.

There is no tint color to the liquid, but large flaky beige particles formed in both the unheated and heated samples as shown in FIG. 66. After heating, the ORP of the Test Sample increases from 308 to 621+mV and the pH decreases from 5.66 to 3.11. The persulfate concentration in the Test Sample decreases from 888 to less than 50 ppm.

Test Sample 9, with Hg, with $Na_2SO_3$, in 1000 ppm Persulfate Synthetic Solution:

Test Sample 9 consists of the addition of mercury and $Na_2S_2O_3$ with persulfate in the synthetic solution. The soluble mercury concentration measured in the unheated and heated Test Samples is 91.8 and 81.4 ppb, respectively. These values represent some loss of soluble mercury from the expected concentration of approximately 100 ppb. Also, a precipitate is observed in the heated Test Sample and a total mercury analysis is performed. The total mercury concentration measured in the heated Test Sample is 93.3 ppb. Based on the total mercury value some of the retained mercury has precipitated. The 7 to 8 percent loss can possibly be attributed to reduction of ionized mercury to the elemental state and subsequent loss by volatilization.

Figure 67:
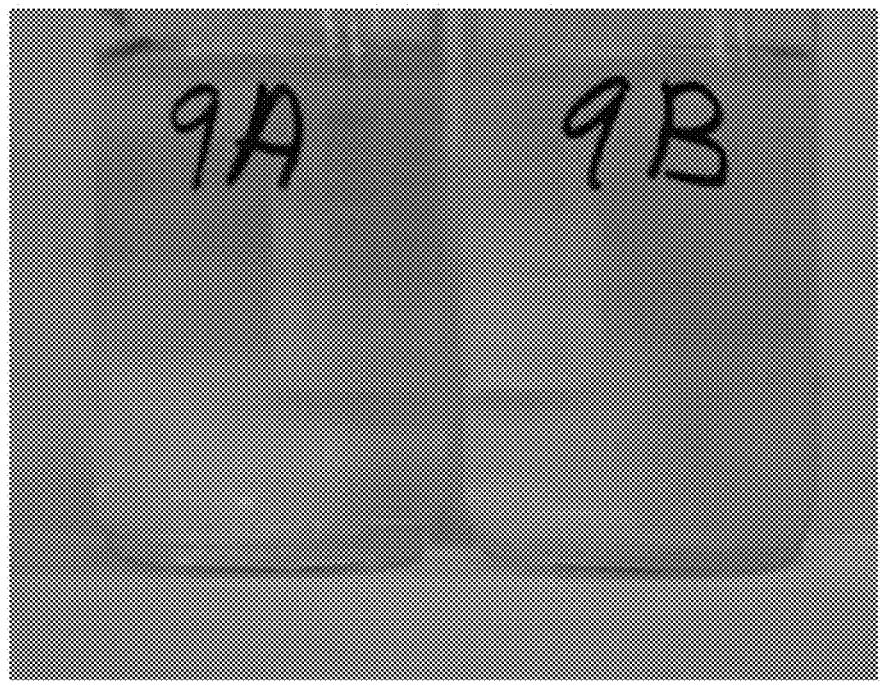
FIG. 67 is a photo comparing the heated and unheated of Test Sample 9.

There is no color change to the liquids but the heated sample has a small amount of white precipitate as shown in FIG. 67. After heating, the ORP of the Test Sample increases from 124 to 318+mV and the pH decreases from 5.57 to 3.02. The persulfate concentration in the Test Sample decreases from 888 to less than 50 ppm. Based on the persulfate titration determination it is determined that there is an excess of $Na_2S_2O_3$ still in the heated sample. The excess is equivalent to 432 ppm of persulfate. This suggests a concentration of $Na_2S_2O_3$ less than 10.4 mM is necessary, probably closer to 7.0 mM.

Test Sample 10, with Hg, with $NH_2OH.HCl$ in 1000 Ppm Persulfate Synthetic Solution:

Test Sample 10 consists of the addition of mercury and $NH_2OH.HCl$ with persulfate in the synthetic solution. The soluble mercury concentration measured in the unheated and heated Test Samples is 94.2 and 1.12 ppb, respectively. The heated sample has a significant loss of soluble mercury from the expected concentration of approximately 100 ppb. A total mercury analysis is not performed on the heated sample because no precipitate is observed. While not wishing to be bound to any one theory, the loss can possibly be attributed to reduction of ionized mercury to the elemental state, especially for this reducing agent and enhanced by heating causing depletion of all available persulfate via redox chemical reaction resulting in lower ORP and subsequent loss by volatilization.

Figure 68:
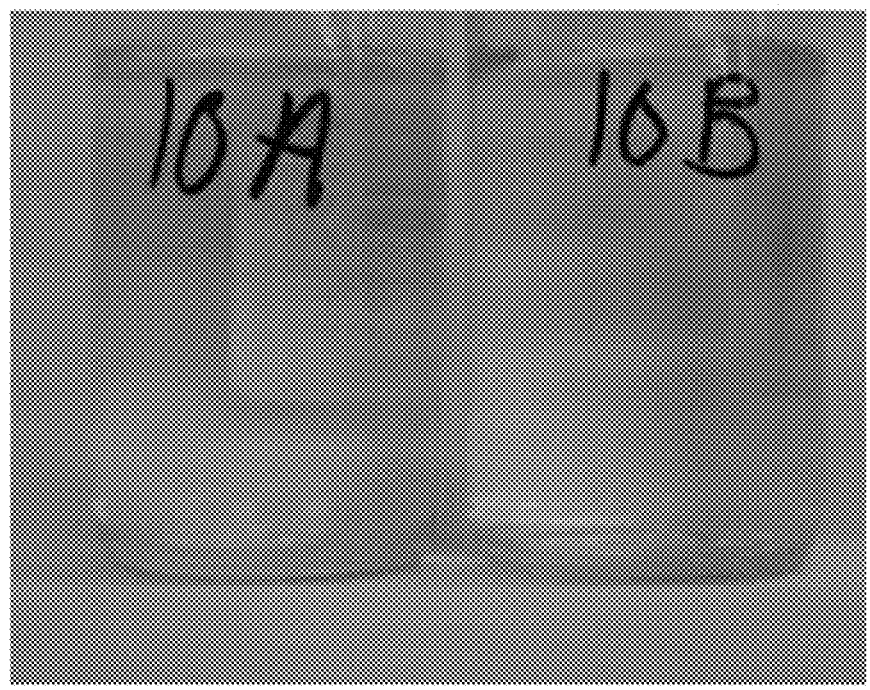
FIG. 68 is a photo comparing the heated and unheated of Test Sample 10.

There is no precipitate observed in either the unheated or heated samples as shown in FIG. 68. After heating, the ORP of the Test Sample increases from 428 to 486+mV and the pH decreases slightly from 2.73 to 1.94. The persulfate concentration in the Test Sample decreases from 888 to less than 50 ppm.

Figure 69:
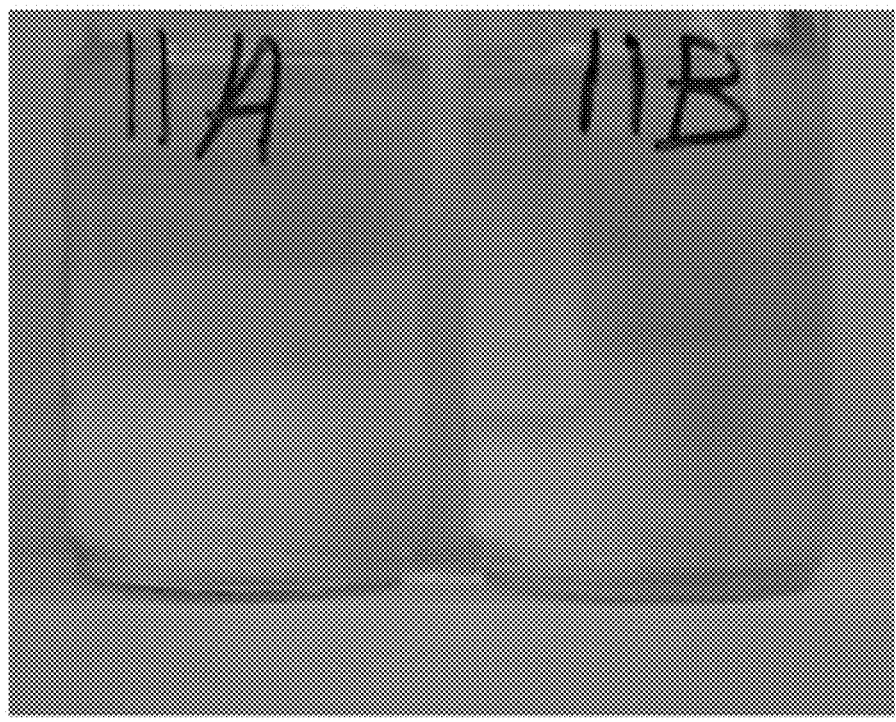
FIG. 69 is a photo comparing the heated and unheated of Test Sample 11.

Test Sample 11, Control, without Hg, without Reducing Agent, in 2010 Filtrate:

Test Sample 11 is a control sample without the addition of mercury or a reducing agent, and in 2010 Filtrate. The soluble mercury concentration measured in the unheated and heated Test Samples is 27.7 and 28.4 ppb, respectively. Since there is no mercury spiked into the Test Samples the measured soluble mercury is the concentration present in the 2010 Filtrate. There is no color change or precipitate observed in either Test Sample as shown in FIG. 69. After heating, the ORP of the Test Sample increases from 344 to 399+mV and the pH decreases from 6.66 to 4.99. The persulfate concentration in the control Test Sample decreases from 888 to 792 ppm.

Figure 70:
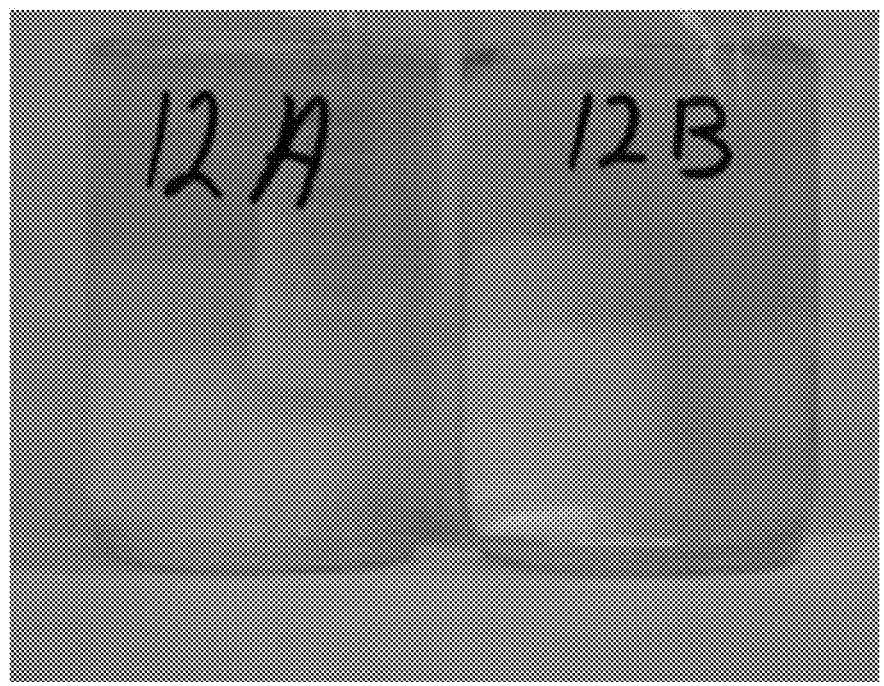
FIG. 70 is a photo comparing the heated and unheated of Test Sample 12.

Test Sample 12, Control, with Hg, without Reducing Agent, in 2010 Filtrate:

Test Sample 12 is a control sample with the addition of mercury but without a reducing agent in the 2010 Filtrate. The soluble mercury concentration measured in the unheated and heated Test Samples is 133 and 125 ppb, respectively. These values are close to the expected concentration when the mercury contribution from the 2010 Filtrate, approximately 28 ppb, is added to the calculated spiked mercury concentration of 100 ppb. There is no color change or precipitate observed in either Test Sample as shown in FIG. 70. After heating, the ORP of the Test Sample increases from 334 to 397+mV and the pH decreases from 6.57 to 4.40. The persulfate concentration in the control Test Sample decreases from 888 to 792 ppm and is the same result as for Test Sample 11.

Figure 71:
FIG. 71 is a photo comparing the heated and unheated of Test Sample 13.

Test Sample 13, with Hg, with NaHS, in 2010 Filtrate:

Test Sample 13 consists of the addition of mercury and NaHS with the 2010 Filtrate. The soluble mercury concentration measured in the unheated and heated Test Samples is 12.4 and 31.5 ppb, respectively. These values represent a significant loss of soluble mercury from the expected concentration of approximately 128 ppb. Also, precipitates are observed in both the unheated and heated Test Samples and a total mercury analysis is performed. The total mercury concentration measured in the unheated and heated Test Samples is 115 and 212 ppb, respectively. Based on the total mercury value most of the retained mercury has precipitated in both samples. However, there is still approximately a 10 percent loss of mercury unaccounted for in the unheated sample. While not wishing to be bound to any one theory, the loss can possibly be attributed to reduction of ionized mercury to the elemental state, and subsequent loss by volatilization. The heated sample has a total mercury concentration close to twice the expected value of 128 ppb. It is investigated to determine if a dilution factor or sample size error had been made in calculating the analysis result. The sample is run in duplicate obtaining the same result. The unheated sample has larger white particulates than the heated sample, and also has more of them. Perhaps there is some particulate bias which is affecting the results. Also, the Test Sample 8 heated sample shows a similar trend compared to the unheated sample, but not to the same extent as Test Sample 13. There is no tint color to the liquid but large flaky beige particles form in both the unheated and heated samples as shown in FIG. 71. After heating, the ORP of the Test Sample remains unchanged at 263+mV and the pH decreases slightly from 7.43 to 7.27. The persulfate concentration in the Test Sample decreases from 888 to less than 50 ppm.

Test Sample 14, with Hg, with $Na_2S_2O_3$, in 2010 Filtrate:

Test Sample 14 consisted of the addition of mercury and $Na_2S_2O_3$ with the 2010 Filtrate. The soluble mercury concentration measured in the unheated and heated Test Samples is 120 and 93.3 ppb, respectively. These values represent some loss of soluble mercury from the expected concentration of approximately 128 ppb. There is no precipitate observed in the heated Test Sample like there is for Test Sample 9 where $Na_2S_2O_3$ is also used, but in 1000 ppm persulfate in a synthetic solution. While not wishing to be bound to any one theory, a possible explanation why a precipitate does not form using the 2010 Filtrate but does with the synthetic solution may be tied to the soluble calcium concentration present in the Test Samples, 850 versus approximately 5650 ppm. The total mercury concentration measured in the heated Test Sample for Test Sample 9 is 93.3 ppb and is the same result as for the soluble mercury concentration measured in the heated sample for Test Sample 14. However, the expected soluble mercury concentration is 100 ppb for Test Sample 9 and 128 ppb for Test Sample 14. Based on the soluble mercury values for Test Sample 14 some of the mercury has been lost in the unheated sample (approximately 6 percent), and the loss is even greater in the heated sample (approximately 27 percent). While not wishing to be bound to any one theory, the losses can possibly be attributed to reduction of ionized mercury to the elemental state, and subsequent loss by volatilization.

Figure 72:
FIG. 72 is a photo comparing the heated and unheated of Test Sample 14.

There is no color change or precipitate observed in either Test Sample as shown in FIG. 72. After heating, the ORP of the Test Sample increases from 121 to 259+mV and the pH decreases from 6.63 to 4.83. The persulfate concentration in the Test Sample decreases from 888 to less than 50 ppm. Based on the persulfate titration determination is determined that there is an excess of $Na_2S_2O_3$ still in the heated sample. The excess is equivalent to 624 ppm of persulfate. This suggests a concentration of $Na_2S_2O_3$ less than 10.4 mM is necessary, probably closer to 6.1 mM.

Test Sample 15, with Hg, with $NH_2OH.HCl$ in 2010 Filtrate:

Test Sample 15 consists of the addition of mercury and $NH_2OH.HCl$ with the 2010 Filtrate. The soluble mercury concentration measured in the unheated and heated Test Samples is 115 and 119 ppb, respectively. These values represent some loss of soluble mercury from the expected concentration of 128 ppb. The mercury loss for the unheated sample was approximately 10 percent, and for the heated sample 7 percent. A total mercury analysis was not performed on either the unheated or heated sample, because no precipitate was observed. While not wishing to be bound to any one theory, the losses can possibly be attributed to reduction of ionized mercury to the elemental state, especially for this reducing agent and enhanced by heating, and subsequent loss by volatilization.

Figure 73:
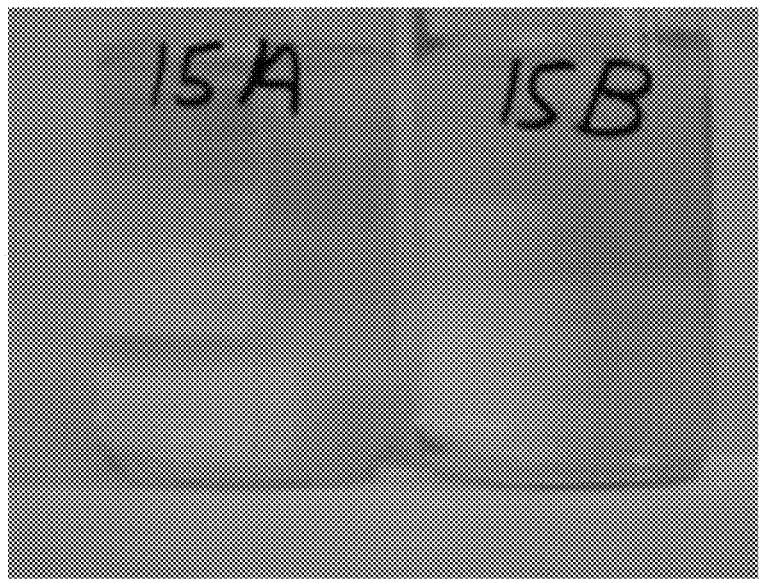
FIG. 73 is a photo comparing the heated and unheated of Test Sample 15.

There is no precipitate observed in either the unheated or heated samples as shown in FIG. 73. After heating, the ORP of the Test Sample increases from 393 to 461+mV and the pH decreases slightly from 3.00 to 2.07. The persulfate concentration in the Test Sample decreases from 888 to less than 50 ppm.

Figure 74:
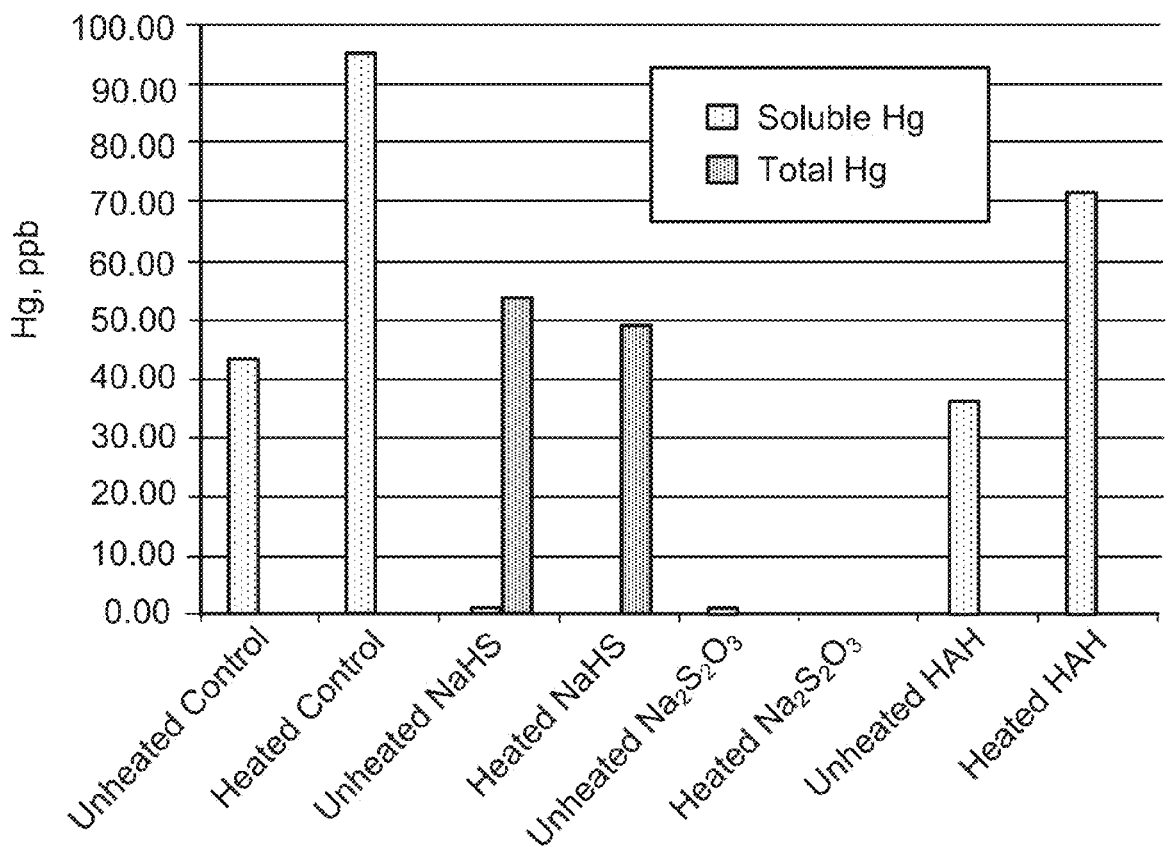
FIG. 74 is a graph comparing reducing agents without persulfate spiked with 100 ppb of mercury in the synthetic solution.
Figure 75:
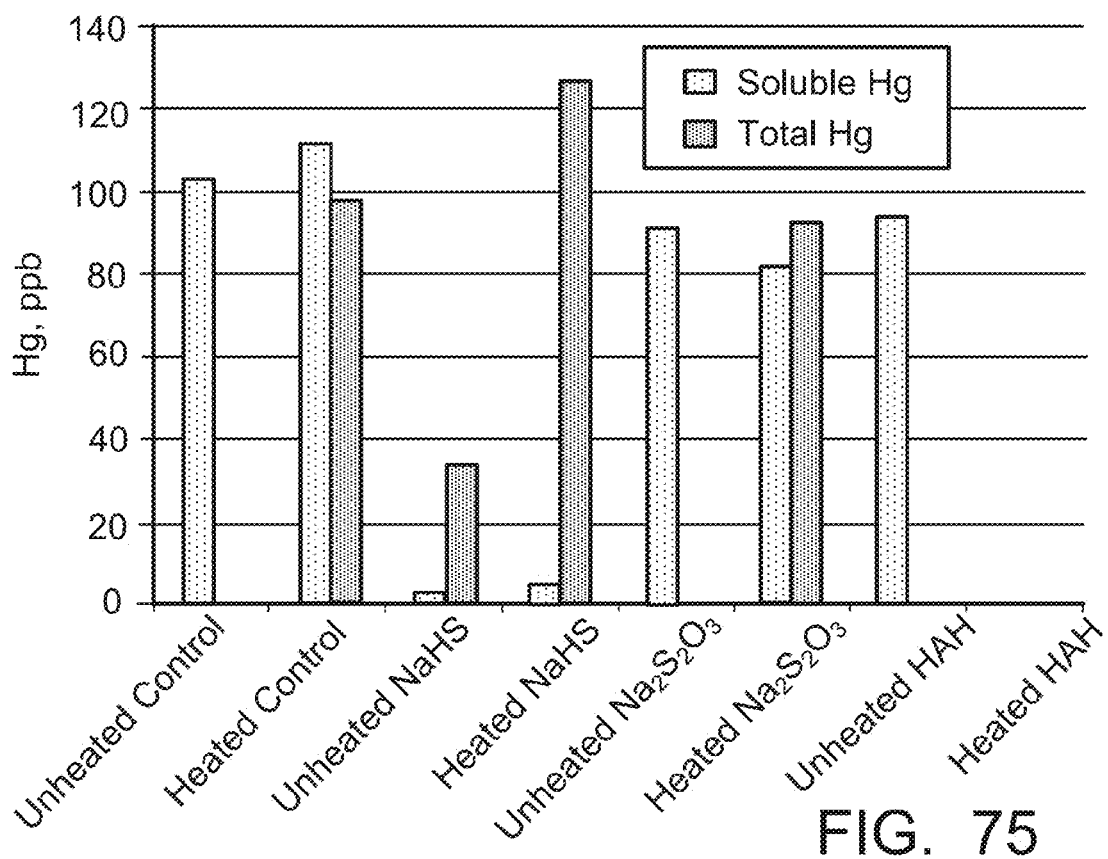
FIG. 75 is a graph comparing reducing agents with persulfate spiked with 100 ppb mercury in the synthetic solution.
Figure 76:
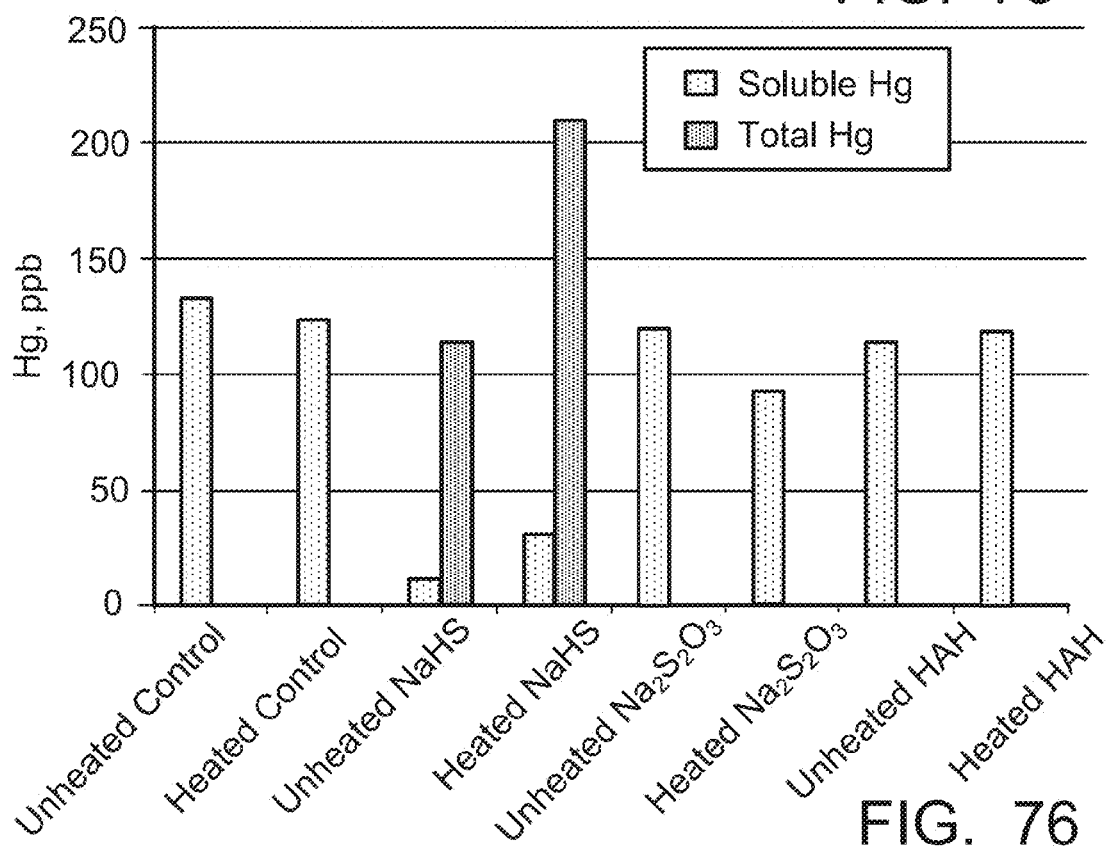
FIG. 76 is a graph comparing reducing agents with persulfate spiked with 100 ppb mercury in the 2010 Filtrate (28 ppb).

Comparison Results for Reducing Agents and their Effect on Mercury Re-Emission:

Specific observations for the Test Samples having a reducing agent at just one concentration are: (1) three reducing agents are evaluated without the presence of persulfate, with the addition of mercury, and in a synthetic solution, Test Samples 3 through 5. The Control Sample is spiked with mercury but has no reducing agent. The comparative results of various samples are shown in the graph of FIG. 74. A total mercury analysis is performed only on a sample where a precipitate is observed to form. Dissolved or soluble mercury is lost in all the samples. For the Control and Test Sample (Test Sample 5) containing HAH the measured soluble mercury concentration is higher in the heated versus unheated sample. Test Sample 3 containing NaHS has only trace levels of soluble mercury remaining in both the unheated and heated samples, and approximately 50 weight percent of the spiked mercury has precipitated, presumably, as HgS. Similarly, Test Sample 4 containing sodium thiosulfate has only trace levels of soluble mercury remaining in both the unheated and heated samples but also the measured total mercury concentrations are at trace levels. This suggests the spiked mercury is lost due to reduction of ionized mercury to the elemental state and subsequent loss by volatilization; (2) three reducing agents are evaluated in the presence of persulfate, with the addition of mercury, and in a synthetic solution, Test Samples 8 through 10. The comparative results are shown in the graph of FIG. 75. A total mercury analysis is performed only on a sample where a precipitate is observed to form. For the Control Sample (Test Sample 7) the measured soluble mercury concentration is close to the expected and spiked concentration (approximately 100 ppb). The measured soluble mercury concentration is higher in the heated sample compared to the unheated sample, and this trend is also observed for the previously discussed Control Sample (Test Sample 2). The measured soluble mercury concentration is higher in the heated sample containing persulfate, 112 versus 94.7 ppb. Possibly, the presence of persulfate, and higher ORP, tends to better preserve soluble or dissolved mercury. Test Sample 8 containing NaHS shows the majority of the spiked soluble mercury has precipitated in both the unheated and heated samples. This is based on the measured total mercury versus dissolved mercury concentrations. Also, the measured total mercury concentration is much higher in the heated sample. Compared to the Test Sample (Test Sample 3) that does not contain persulfate, the measured total mercury concentration is much higher in Test Sample 8. Since the concentration of sodium hydrosulfide is kept constant in both Test Samples (Test Samples 3 and 8), it is believed the reason for a higher measured total mercury concentration in Test Sample 8 is due to the majority of the reducing agent being consumed in the redox chemical reaction with persulfate allowing less sodium hydrosulfide to alter the oxidation state of mercury. Test Sample 9 containing sodium thiosulfate shows some loss of measured soluble mercury in the unheated sample, and the loss is greater in the heated sample. However, the measured soluble mercury concentration in the unheated sample is similar to the measured total mercury concentration in the heated sample where a precipitate is observed, 91.8 versus 93.3 ppb. Compared to the Test Sample (Test Sample 4) that does not contain persulfate, the measured dissolved and total mercury concentration is much higher in Test Sample 9. Since the concentration of sodium thiosulfate is kept constant in both Test Samples (Test Samples 4 and 9), it is believed the reason for a higher measured total mercury concentration is due to the majority of the reducing agent being consumed in the redox chemical reaction with persulfate allowing less sodium thiosulfate to alter the oxidation state of mercury. Test Sample 10 containing HAH shows some loss of measured soluble mercury in the unheated sample, but only a trace of mercury remained in the heated sample, 94.2 versus 1.12 ppb. Compared to the Test Sample (Test Sample 5) that does not contain persulfate, the measured dissolved mercury concentration is much higher in the unheated sample of Test Sample 10, 94.2 versus 36.2 ppb, but much lower in the heated sample, 1.12 versus 71.6 ppb. This suggests the spiked mercury concentration is affected by heating. The trend for HAH is opposite to that observed for sodium hydrosulfide and sodium thiosulfate in that a lower measured dissolved or total mercury concentration is obtained for the heated sample containing persulfate versus not containing persulfate; and (3) three reducing agents are evaluated in the presence of persulfate, with the addition of mercury, and in 2010 Filtrate, Test Samples 13 through 15. Comparative results are shown in the graph of FIG. 76. A total mercury analysis is performed only on a sample where a precipitate is observed to form. For the Control Sample (Test Sample 12) the measured soluble mercury concentration is greater in the unheated and heated samples, 133 and 125 ppb, than the expected and spiked concentration (approximately 100 ppb). However, based on the measured soluble mercury concentration in the non-spiked Hg control sample (Test Sample 11), approximately 28 ppb, the adjusted expected concentration is approximately 128 ppb and this value is in close agreement to what is measured in Test Sample 12. Test Sample 13 containing NaHS shows the majority of the spiked soluble mercury has precipitated in both the unheated and heated samples. This is based on the measured total mercury versus dissolved mercury concentrations. Also, the measured total mercury concentration is much higher in the heated sample but the difference is thought to be related to particulate bias which may be affecting the results. Compared to Test Sample 8, that also contained persulfate but in a synthetic solution, the measured total mercury concentration is much higher in the unheated sample for Test Sample 13, 115 versus 34.2 ppb. The absolute difference is much greater than the 28 ppb dissolved mercury measured in the 2010 Filtrate (Test Sample 11). However, the heated sample of Test Sample 13 has a measured total dissolved mercury concentration of 31.5 ppb compared to 5.8 ppb for Test Sample 8. Here, the absolute difference is 25.7 ppb which is close to the 28 ppb additional mercury found in the 2010 Filtrate. Test Sample 14 containing sodium thiosulfate shows some loss of measured soluble mercury in the unheated sample, and the loss is greater in the heated sample. Compared to Test Sample 9, that also contained persulfate but in a synthetic solution, the trend is the same. However, the weight percent loss of measured soluble mercury concentration in the unheated sample is less for Test Sample 14, 6.2 versus 8.2 weight percent, and greater for the heated sample, 27.1 versus 19.6 weight percent. While not wishing to be bound to any one theory, it is believed the reason for a higher weight percent loss of measured soluble mercury in the heated sample of Test Sample 14 is due to a higher concentration of non-reacted sodium thiosulfate. Since the concentration of sodium thiosulfate is kept constant in both Test Samples (Test Samples 14 and 9), and there is a lower concentration of persulfate in the 2010 Filtrate, 792 versus 888 ppm, the amount of reducing agent being consumed in the redox chemical reaction with persulfate is less for Test Sample 14 allowing more sodium thiosulfate to possibly alter the oxidation state of mercury. Test Sample 15 containing HAH shows some loss of measured soluble mercury in the unheated and heated samples, 115 and 119 ppb, respectively, compared to an expected concentration of approximately 128 ppb. Compared to Test Sample 10, that also contains persulfate but in a synthetic solution, the trend is the same for the unheated samples, but the heated sample for Test Sample 10 has much greater mercury loss than in the heated sample for Test Sample 15. The reason for the large difference in mercury loss is not clear. The calcium concentration is much higher in the synthetic solution than in the 2010 Filtrate, 5650 ppm versus 851 ppm measured. ORP and pH are similar for the heated samples. Also, a higher concentration of HAH is added to Test Sample 15 (12.1 mM) compared to Test Sample 10 (9.1 mM). The concentration of HAH added is based on the amount needed to fully react with the persulfate in the heated sample. The HAH concentrations are determined above when evaluating reducing agents.

Based on the results for this batch bench-scale study several conclusions are reached testing each reducing agent at just one concentration: (1) the Test Samples without the presence of persulfate, with the addition of mercury, and in a synthetic solution (Test Samples 3 through 5), have lower ORP values and greater mercury loss. Also, it suggests the concentration of reducing agent must be adjusted lower when persulfate is less or not present in order to prevent an excess of reducing agent that can potentially alter the oxidation state of mercury. The mercury loss can possibly be attributed to reduction of ionized mercury to the elemental state, enhanced by heating, and subsequent loss by volatilization; (2) for the Test Samples containing NaHS (Test Samples 3, 8, and 13), the majority of the spiked soluble Hg is in the precipitate that forms. This is based on the measured total mercury values for the samples compared with the measured soluble mercury values; and (3) preventing loss or re-emission of mercury may run opposite to the concentration of reducing agent needed to prevent precipitation of manganese or to favor the oxidation state of selenium as selenite, $Se(IV)O_3^{2-}$. This may require a delicate balance to find the desired reducing agent concentration to achieve the desired effect(s) in a given WFGD ART. It may require a combination of reducing agents, for example NaHS and $Na_2S_2O_3$. Since each WFGD ART combination can be slightly different, optimization may still be necessary for each individual scrubber unit.

Given the above, the present invention enables one to control one or more oxidizing compounds, agents and/or ions in an ART of a WFGD and thereby control, reduce and/or mitigate the ORP in an ART. In one embodiment, such oxidizing compounds, agents and/or ions include, but are not limited to, persulfate, permanganate, manganate, ozone hypochlorite, chlorate, nitric acid, iodine, bromine, chlorine, fluorine, or combinations of any two or more thereof, be they compounds or ions.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for controlling the oxidation-reduction potential in a recirculation tank, or an absorber recirculation tank, of a wet flue gas desulfurization unit, the method comprising the steps of:
   (i) supplying at least one reducing agent to a slurry, or a solution, portion of the recirculation tank, or the absorber recirculation tank, or at least one recirculation pump thereto so that the at least one reducing agent is supplied to the wet flue gas desulfurization unit recirculation tank or absorber recirculation tank; and
   (ii) permitting the at least one reducing agent to react with one or more oxidizing compounds and/or ions present in the slurry, or the solution, portion of the recirculation tank, or the absorber recirculation tank or the at least one recirculation pump thereto, so as to achieve a reduction in the oxidation-reduction potential of the slurry, or the solution, in the recirculation tank, or the absorber recirculation tank, or in the at least one recirculation pump thereto, or in a combination of the recirculation tank, or the absorber recirculation tank, and the at least one recirculation pump thereto so that an amount of at least one insoluble precipitate compound in the recirculation tank, or the absorber recirculation tank, is controlled, prevented, or eliminated by the addition of the at least one reducing agent,
   wherein the at least one reducing agent is selected from iron (II) sulfate ($FeSO_4$), phosphorous acid ($H_3PO_3$), iron (II) ammonium sulfate (($NH_4)_2Fe(SO_4)_2$), hydroxylamine hydrochloride ($HONH_2.HCl$), hypophosphorous acid ($H_3PO_2$), or a combination of any two or more thereof.

2. The method of claim 1, wherein the at least one reducing agent is hydroxylamine hydrochloride ($HONH_2.HCl$).

3. The method of claim 1, wherein the at least one reducing agent further permits control, prevention, or elimination of the precipitation of manganese from soluble manganese present in the slurry, or the solution, of the recirculation tank, or the absorber recirculation tank, of the wet flue gas desulfurization unit.

4. The method of claim 3, wherein the at least one reducing agent is hydroxylamine hydrochloride (HONH$_2$.HCl).

5. The method of claim 1, wherein the at least one reducing agent further permits control of the type of selenium species present in the slurry, or the solution, of the recirculation tank, or the absorber recirculation tank, of the wet flue gas desulfurization unit via an oxidation-reduction reaction.

6. The method of claim 5, wherein the at least one reducing agent is hydroxylamine hydrochloride (HONH$_2$.HCl).

7. The method of claim 5, wherein the at least one reducing agent permits an oxidation-reduction potential to exist in the slurry, or the solution, of the recirculation tank, or the absorber recirculation tank, of the wet flue gas desulfurization unit so as to favor the formation of Se(IV) O$_3^{2-}$ species.

8. The method of claim 1, wherein the at least one reducing agent further permits control of mercury re-emission in the wet flue gas desulfurization unit.

9. The method of claim 8, wherein the at least one reducing agent is hydroxylamine hydrochloride (HONH$_2$.HCl).

10. The method of claim 1, wherein mercury re-emission is controlled by a combination of the at least one reducing agent in combination with sodium hydrosulfide (NaHS).

11. The method of claim 1, wherein the oxidizing compound and/or ion is a persulfate and the at least one reducing agent is utilized in a concentration range of about 0.5 moles of the at least one reducing agent to every one mole of persulfate ions to 3 moles of the at least one reducing agent to every one mole of persulfate ions.

12. The method of claim 1, wherein the oxidizing compound and/or ion is a persulfate and the at least one reducing agent is utilized in a concentration range of about 0.75 moles of the at least one reducing agent to every one mole of persulfate ions to 2.5 moles of the at least one reducing agent to every one mole of persulfate ions.

13. The method of claim 1, wherein the oxidizing compound and/or ion is a persulfate and the at least one reducing agent is utilized in a concentration range of about 1 mole of the at least one reducing agent to every one mole of persulfate ions to 2.25 moles of the at least one reducing agent to every one mole of persulfate ions.

14. A method for controlling the oxidation-reduction potential in a recirculation tank, or an absorber recirculation tank, of a wet flue gas desulfurization unit, the method comprising the steps of:
(a) supplying at least one reducing agent to a slurry, or a solution, portion of the recirculation tank, or the absorber recirculation tank or at least one recirculation pump thereto so that the at least one reducing agent is supplied to the wet flue gas desulfurization unit recirculation tank or absorber recirculation tank;
(b) permitting the at least one reducing agent to react with one or more oxidizing compounds and/or ions present in the slurry, or the solution, portion of the recirculation tank, or the absorber recirculation tank or the at least one recirculation pump thereto, so as to achieve a reduction in the oxidation-reduction potential of the slurry, or the solution, in the recirculation tank, or the absorber recirculation tank, or in the at least one recirculation pump thereto, or in a combination of the recirculation tank, or the absorber recirculation tank, and the at least one recirculation pump thereto; and
(c) permitting the at least one reducing agent to further control, prevent, or eliminate the precipitation of manganese from soluble manganese present in the slurry, or the solution, of the recirculation tank, or the absorber recirculation tank, or in the at least one recirculation pump thereto, or in a combination of the recirculation tank, or the absorber recirculation tank, and the at least one recirculation pump thereto, of the wet flue gas desulfurization unit via control of the oxidation-reduction potential of the slurry, or the solution, in the recirculation tank, or the absorber recirculation tank, and/or in the at least one recirculation pump thereto of the wet flue gas desulfurization unit,
wherein the at least one reducing agent is selected from iron (II) sulfate (FeSO$_4$), phosphorous acid (H$_3$PO$_3$), iron (II) ammonium sulfate ((NH$_4$)$_2$Fe(SO$_4$)$_2$), hydroxylamine hydrochloride (HONH$_2$.HCl), hypophosphorous acid (H$_3$PO$_2$), or a combination of any two or more thereof.

15. The method of claim 14, wherein the at least one reducing agent is hydroxylamine hydrochloride (HONH$_2$.HCl).

16. The method of claim 14, wherein the at least one reducing agent further permits control of the type of selenium species present in the slurry, or the solution, of the recirculation tank, or the absorber recirculation tank, of the wet flue gas desulfurization unit via an oxidation-reduction reaction.

17. The method of claim 16, wherein the at least one reducing agent is hydroxylamine hydrochloride (HONH$_2$.HCl).

18. The method of claim 14, wherein the at least one reducing agent permits an oxidation-reduction potential to exist in the slurry, or the solution, of the recirculation tank, or the absorber recirculation tank, of the wet flue gas desulfurization unit so as to favor the formation of Se(IV) O$_3^{2-}$ species.

19. The method of claim 14, wherein the at least one reducing agent further permits control of mercury re-emission in the wet flue gas desulfurization unit.

20. The method of claim 19, wherein the at least one reducing agent is hydroxylamine hydrochloride (HONH$_2$.HCl).

21. The method of claim 14, wherein mercury re-emission is controlled by a combination of the at least one reducing agent in combination with sodium hydrosulfide (NaHS).

22. The method of claim 14, wherein the oxidizing compound and/or ion is a persulfate and the at least one reducing agent is utilized in a concentration range of about 0.5 moles of the at least one reducing agent to every one mole of persulfate ions to 3 moles of the at least one reducing agent to every one mole of persulfate ions.

23. The method of claim 14, wherein the oxidizing compound and/or ion is a persulfate and the at least one reducing agent is utilized in a concentration range of about 0.75 moles of the at least one reducing agent to every one mole of persulfate ions to 2.5 moles of the at least one reducing agent to every one mole of persulfate ions.

24. The method of claim 14, wherein the oxidizing compound and/or ion is a persulfate and the at least one reducing agent is utilized in a concentration range of about 1 mole of the at least one reducing agent to every one mole of persulfate ions to 2.25 moles of the at least one reducing agent to every one mole of persulfate ions.

25. A method for controlling the oxidation-reduction potential in a recirculation tank, or absorber recirculation tank, of a wet flue gas desulfurization unit, the method comprising the steps of:
- (I) supplying at least one reducing agent to a slurry, or a solution, portion of the recirculation tank, or the absorber recirculation tank or at least one recirculation pump thereto;
- (II) permitting the at least one reducing agent to react with one or more oxidizing compounds and/or ions present in the slurry, or the solution, portion of the recirculation tank, or the absorber recirculation tank or the at least one recirculation pump thereto, so as to achieve a reduction in the oxidation-reduction potential of the slurry, or the solution, in the recirculation tank, or the absorber recirculation tank, in the at least one recirculation pump thereto, or in a combination of the recirculation tank, or the absorber recirculation tank, and the at least one recirculation pump thereto;
- (III) permitting the at least one reducing agent to further control, prevent, or eliminate the precipitation of manganese from soluble manganese present in the slurry, or the solution, of the recirculation tank, or the absorber recirculation tank, or in the at least one recirculation pump thereto, or in a combination of the recirculation tank, or the absorber recirculation tank, and the at least one recirculation pump thereto, of the wet flue gas desulfurization unit via control of the oxidation-reduction potential of the slurry, or the solution, in the recirculation tank, or the absorber recirculation tank, and/or in the at least one recirculation pump thereto of the wet flue gas desulfurization unit; and
- (IV) permitting the at least one reducing agent to control mercury re-emission in the wet flue gas desulfurization unit via control of the oxidation-reduction potential in the slurry, or the solution, of the recirculation tank, or the absorber recirculation tank, of the wet flue gas desulfurization unit, wherein the at least one reducing agent is selected from iron (II) sulfate ($FeSO_4$), phosphorous acid ($H_3PO_3$), iron (II) ammonium sulfate (($NH_4)_2Fe(SO_4)_2$), hydroxylamine hydrochloride ($HONH_2.HCl$), hypophosphorous acid ($H_3PO_2$), or a combination of any two or more thereof.

26. The method of claim 25, wherein the at least one reducing agent is hydroxylamine hydrochloride ($HONH_2.HCl$).

27. The method of claim 25, wherein the at least one reducing agent further permits control of the type of selenium species present in the slurry, or the solution, of the recirculation tank, or the absorber recirculation tank, of the wet flue gas desulfurization unit via an oxidation-reduction reaction.

28. The method of claim 27, wherein the at least one reducing agent is hydroxylamine hydrochloride ($HONH_2.HCl$).

29. The method of claim 25, wherein the at least one reducing agent permits an oxidation-reduction potential to exist in the slurry, or the solution, of the recirculation tank, or the absorber recirculation tank, of the wet flue gas desulfurization unit so as to favor the formation of $Se(IV)O_3^{2-}$ species.

30. The method of claim 25, wherein mercury re-emission is controlled by a combination of the at least one reducing agent in combination with sodium hydrosulfide (NaHS).

31. The method of claim 25, wherein the oxidizing compound and/or ion is a persulfate and the at least one reducing agent is utilized in a concentration range of about 0.5 moles of the at least one reducing agent to every one mole of persulfate ions to 3 moles of the at least one reducing agent to every one mole of persulfate ions.

32. The method of claim 25, wherein the oxidizing compound and/or ion is a persulfate and the at least one reducing agent is utilized in a concentration range of about 0.75 moles of the at least one reducing agent to every one mole of persulfate ions to 2.5 moles of the at least one reducing agent to every one mole of persulfate ions.

33. The method of claim 25, wherein the oxidizing compound and/or ion is a persulfate and the at least one reducing agent is utilized in a concentration range of about 1 mole of the at least one reducing agent to every one mole of persulfate ions to 2.25 moles of the at least one reducing agent to every one mole of persulfate ions.

* * * * *